United States Patent
Cabot et al.

(10) Patent No.: US 12,130,938 B2
(45) Date of Patent: Oct. 29, 2024

(54) DATA PRODUCT RELEASE METHOD OR SYSTEM

(71) Applicant: PRIVITAR LIMITED, Cambridge (GB)

(72) Inventors: Charles Codman Cabot, Cambridge (GB); Kieron Francois Pascal Guinamard, Cambridge (GB); Jason Derek McFall, Cambridge (GB); Pierre-Andre Maugis, Cambridge (GB); Hector Page, Cambridge (GB); Benjamin Thomas Pickering, Cambridge (GB); Theresa Stadler, Cambridge (GB); Jo-anne Tay, Cambridge (GB); Suzanne Weller, Cambridge (GB)

(73) Assignee: PRIVITAR LIMITED, Cambridge (GB)

( * ) Notice: Subject to any disclaimer, the term of this patent is extended or adjusted under 35 U.S.C. 154(b) by 0 days.

(21) Appl. No.: 16/955,542

(22) PCT Filed: Dec. 18, 2018

(86) PCT No.: PCT/GB2018/053666
§ 371 (c)(1),
(2) Date: Jun. 18, 2020

(87) PCT Pub. No.: WO2019/122854
PCT Pub. Date: Jun. 27, 2019

(65) Prior Publication Data
US 2021/0012028 A1 Jan. 14, 2021

(30) Foreign Application Priority Data

Dec. 18, 2017 (GB) .................................. 1721189
Aug. 30, 2018 (GB) .................................. 1814105

(51) Int. Cl.
*G06F 21/62* (2013.01)
*G06F 9/54* (2006.01)
(Continued)

(52) U.S. Cl.
CPC .......... *G06F 21/6245* (2013.01); *G06F 9/547* (2013.01); *G06F 17/12* (2013.01);
(Continued)

(58) Field of Classification Search
CPC ...... G06F 21/6245; G06F 9/547; G06F 17/12; G06F 17/18; G06F 21/577; G06F 21/6227; G06F 21/6254
See application file for complete search history.

(56) References Cited

U.S. PATENT DOCUMENTS 10,325,114 B2 * 6/2019 Shen .................... G06F 21/6263
11,157,520 B2 * 10/2021 Dang ................... G06F 21/6254
(Continued)

FOREIGN PATENT DOCUMENTS

WO 2017187207 A1 11/2017

OTHER PUBLICATIONS

Liu et al, "Random Projection-Based Multiplicative Data Perturbation for Privacy Preserving Distributed Data Mining", IEEE Transactions on Knowledge and Data Engineering, Jan. 2006, pp. 92-106 (Year: 2006).*

(Continued)

*Primary Examiner* — Ashokkumar B Patel
*Assistant Examiner* — Forrest L Carey
(74) *Attorney, Agent, or Firm* — Saul Ewing LLP

(57) ABSTRACT

A computer implemented data product release method or system. The data product release is derived from a sensitive dataset using a privacy protection system such as a differentially private system. The privacy protection parameters, such as noise addition magnitude, are configurable as part of (Continued)

the data product release method or system to alter the balance between maintaining privacy of the sensitive dataset and making the data product release useful.

62 Claims, 20 Drawing Sheets

(51) Int. Cl.
   *G06F 17/12* (2006.01)
   *G06F 17/18* (2006.01)
   *G06F 21/57* (2013.01)

(52) U.S. Cl.
   CPC ............ *G06F 17/18* (2013.01); *G06F 21/577* (2013.01); *G06F 21/6227* (2013.01)

(56) References Cited

U.S. PATENT DOCUMENTS

| | | | | |
|---|---|---|---|---|
| 2007/0124268 | A1* | 5/2007 | Dwork | G06Q 50/26 |
| 2008/0154821 | A1* | 6/2008 | Poulin | G06Q 10/0631 |
| | | | | 706/21 |
| 2011/0107205 | A1* | 5/2011 | Chow | G06F 16/335 |
| | | | | 715/255 |
| 2014/0304825 | A1 | 10/2014 | Gianniotis et al. | |
| 2015/0235051 | A1* | 8/2015 | Fawaz | G06F 21/6245 |
| | | | | 726/26 |
| 2016/0140190 | A1* | 5/2016 | Moncrieff | G06F 16/248 |
| | | | | 707/722 |
| 2017/0169253 | A1* | 6/2017 | Curcio | G06F 21/6254 |
| 2017/0220938 | A1* | 8/2017 | Sainani | G06F 16/2428 |
| 2017/0329873 | A1* | 11/2017 | Eide | G06F 21/6254 |
| 2018/0004978 | A1* | 1/2018 | Hebert | G06F 21/6254 |
| 2018/0349638 | A1* | 12/2018 | Barraclough | H04L 9/3239 |
| 2019/0147188 | A1* | 5/2019 | Benaloh | H04L 9/0897 |
| | | | | 726/26 |
| 2020/0034348 | A1* | 1/2020 | Otsubo | G06F 21/6254 |
| 2020/0242466 | A1* | 7/2020 | Mohassel | G06F 21/6254 |

OTHER PUBLICATIONS

Dwork et al, "Exposed! A Survey of Attacks on Private Data", Reviews in Advance, Dec. 2016, pp. 12.1-12.24 (Year: 2016).*
Ghosh, Arpita, et al., "Universally Utility-maximizing Privacy Mechanisms", SIAM Journal on Computing, vol. 41, No. 6, pp. 1673-1693 XP055560594, Jan. 6, 2012.
International Search Report, dated Mar. 6, 2019, issued in International Application No. PCT/GB2018/053666.

* cited by examiner

| Gender | Department | SUM(MonthlyIncome) |
|---|---|---|
| Female | Sales | 1,317,732 |
|  | Research & Development | 2,468,689 |
|  | Human Resources | 145,280 |
| Male | Sales | 5,786,059 |
|  | Research & Development | 3,567,595 |
|  | Human Resources | 273,954 |

FIGURE 14

| Age Range | NEVER | RARELY | FREQUENTLY |
|---|---|---|---|
| 20 - 30 | 1 | 2 | 0 |

FIGURE 15

DATA PRODUCT RELEASE METHOD OR SYSTEM

CROSS REFERENCE TO RELATED APPLICATIONS

This application claims the priority of PCT/GB2018/053666, filed on Dec. 18, 2018, which claims priority to GB Application No. GB1721189.7, filed on Dec. 18, 2017, and GB Application No. GB1814105.1, filed on Aug. 30, 2018, the entire contents of each of which being fully incorporated herein by reference.

BACKGROUND OF THE INVENTION

1. Field of the Invention

The field of the invention relates to a computer implemented data product release method or system. More particularly, but not exclusively, it relates to a computer-implemented process for managing the privacy protection parameters of a data product release.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

Releasing aggregate statistics (for instance, contingency tables) about private datasets can, in some cases, lead to disclosure of private information about individuals. Often, it is not obvious how a set of aggregate statistics about groups of people can leak information about an individual and manual output checks fail to detect all of these unintended disclosures. Researchers have invented techniques for mitigating the risks of private information leakage. Two such techniques are suppression of statistics about small groups and addition of random noise to statistics.

Much less established are techniques for measuring the risk associated with releasing aggregate statistics. One way to assess risk is to use a theoretical privacy model such as differential privacy. Theoretical models give some metric of how safe the statistics are in terms of privacy, but they suffer from at least two problems. First, their metric is difficult to map to an intuitive understanding of privacy: what does epsilon (the main parameter of differential privacy) being 0.5 actually mean? Second, theoretical models consider worst case scenarios and thus can be impractically pessimistic about the amount of risk in a data release.

There is a need for alternative ways to measure the privacy risk of aggregate statistics.

Furthermore, privacy-preserving techniques to defend against private information disclosure come with a trade-off between the privacy protection achieved and a loss in data utility. For example, the suppression of statistics about small groups protects against direct private attribute disclosure but at the same time leads to a decrease in the information that can be released. It is thus important to assess the utility of the data that is released under privacy-preserving techniques. However, it is not always clear how to best measure utility loss or data distortion. In cases where the utility cost of distortion and data loss is not clearly defined a priori, there is a need for alternative ways to measure data utility of private aggregate statistics.

The present invention addresses the above vulnerabilities and also other problems not described above.

SUMMARY OF THE INVENTION

One aspect of the invention is a computer implemented data product release method in which the data product release is a bounded or fixed set of statistics that is pre-defined by a data holder and derived from a sensitive dataset using a privacy protection system such as a differentially private system; and in which the privacy protection parameters, are configurable as part of the data product release method or system to alter the balance between maintaining privacy of the sensitive dataset and making the data product release useful.

BRIEF DESCRIPTION OF THE FIGURES

Aspects of the invention will now be described, by way of example(s), with reference to the following Figures, which each show features of the invention:

FIG. 14 shows an example of a statistical release.

FIG. 15 shows an example of a row of a COUNT contingency table.

DETAILED DESCRIPTION

This Detailed Description section describes one implementation of the invention, called Lens or the Lens platform.

The Lens platform for privacy-preserving data products is a system that a data holder (e.g. a hospital) can use to release statistics (e.g. counts, sums, averages, medians) about their private data while protecting the private information of the individual data subjects who make up the private dataset. It ensures that no accidental disclosure of individual information occurs in the statistical release.

The data holder holds sensitive data and wishes to release statistics one time or periodically and, additionally, the statistics can take multiple forms: numbers, charts such as histograms or CDFs, or even synthetic data that reflects the desired statistics. Collectively, these outputs are referred to as types of 'data product', 'data product release', or 'data release'.

A data product relates to a bounded or fixed set of statistics that is predefined by a data holder and that is derived from a sensitive dataset. A data product release may include one or more of the following: aggregate statistics report, visualisation, infographic or dashboard or any other form of aggregate statistics summary. A data product may also be a machine learning model. A data product may also be released in the form of an API or synthetic microdata These data products have economic value—for instance, health data statistics can drive faster healthcare research, or payments data statistics can inform better business decisions. Lens is differentiated by its ability to usefully release data products from private datasets like health datasets or payments datasets, while ensuring that individual privacy is preserved.

Lens uses differentially private release mechanisms to implement adequate protection of the individual. Differential privacy is a characteristic of a data release mechanism that ensures that the release's information leakage about any individual is bounded. The bound is set by a parameter known as 'epsilon'. The lower the epsilon, the less information leakage, and the stronger the privacy guaranteed by differential privacy.

More about differential privacy can be found in Nissim et al.'s 2017 paper "Differential Privacy: A Primer for a Non-technical Audience."

Key features of this invention will be described in one of the following sections:
Section A: Overview of the Lens platform
Section B: Detailed Description of the Lens platform for creating privacy-preserving data products
Section A: Overview of the lens platform
1. Toolkit to Build Data Products When releasing statistical data, it is often difficult to know how high to set the privacy protection parameters in order to be safe, while still being useful. Lens includes features for calibrating the proper amount of noise addition needed to prevent privacy leakage.

Figure 1:
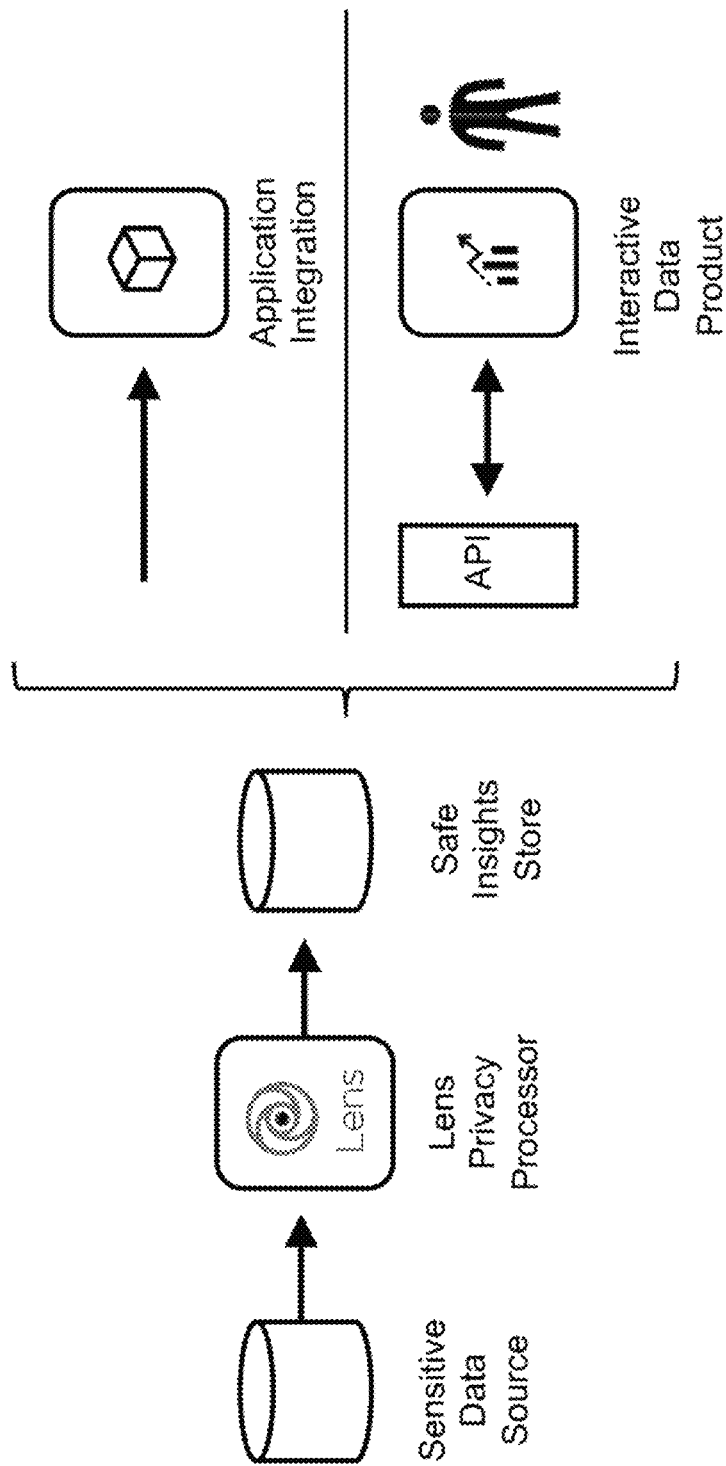
FIG. 1 shows a diagram with the key elements of the architecture of the System.

With reference to FIG. 1, key elements of the architecture of the system are shown. Lens provides a safe access to query sensitive data while preserving individual privacy. Lens processes the sensitive data and places approved safe aggregate statistics into a relational database called 'Safe Insights Store'. Statistical insights stored in the 'Safe Insights Store' power a broad range of applications or API, such as interactive visualisation, dashboards or reports.

Interactive 'Data Product' or 'Data Release' or 'Data Product release' allow an access to insights from the sensitive dataset to an end-user without providing an access to the raw data within the sensitive dataset.

Given an underlying sensitive dataset, Lens allows a 'Data Release' of safe aggregate statistics to be described, computed and made available for use external to Lens. Data Release means a set of statistics produced by the application of a number of predefined statistical filters, drill-downs, queries and aggregations made on the sensitive dataset.

'Safe' in this context means protected by a suite of privacy-enhancing techniques such as the addition of differentially private noise, as described in other sections of this specification.

The protection makes it difficult to reverse the aggregation and learn anything about any individual data subject in the sensitive dataset.

In order to produce a Data Release, Lens uses a description of the required processing of the sensitive data called a 'Data Product Specification'. This may either be produced by a data holder through the Lens user interface and stored by Lens, or it may be produced externally using other tools and input into the Lens system.

The Data Product Specification is used by Lens to derive a Data Release from any schema-compatible sensitive dataset. This includes a) repeated use of a single Data Product Specification on a dataset that evolves over time, or b) use of a Data Product Specification on multiple unrelated datasets.

A Data Product Specification comprises:
A representation of the underlying sensitive data schema. This may be a single table, or multiple tables (as in a relational database) joined using foreign-key relationships.
A set of pre-processing transformations performed on instances of the sensitive data schema, such as (but not limited to):
'Rectangularisation': operations to convert a multi-table schema into a single table, as discussed in Section B, Sub-Section 3.1
Binning of variables into more general variables (e.g. 37 binned to 35-40)
A description of which statistics are required in the Data Release, based on both the underlying data schema and the pre-processing transformations already performed. Including (but not limited to):
Sum, average, count, median, min/max etc
Linear regression models
A description of conditions under which to suppress statistics, such as:
Query set size restrictions (QSSR) that suppresses queries that concern a population size smaller than a configurable threshold (e.g. 5).
An indication of 'prioritisation' or other measure of importance in the statistics, to allow an expression of which statistics are most important for the intended data product use case. This allows Lens to take 'usefulness' into account when determining how to add noise to the statistics. For example, it may add less noise to statistics that are more important. An example is as follows:
For a gender equality study, statistics for average salary based on a gender drill-down may be flagged as 'important' and thus receive less noise addition than drill-downs based on location.
Query Sensitivity. See note below.
Free text human-written notes, descriptions or other requirements as appropriate to allow the specification to be understood at a later time.

In comparison to other privacy preserving techniques building differential privacy into interactive query interfaces, Lens builds differential privacy directly into data product release systems.

2. Sensitivity

Lens's approach to determining the sensitivity of a query is based on inspecting the raw data before the noise addition, as follows:

1. Query raw data to obtain the distribution of values for a desired query.
2. Identify outliers and clip the range or generalise values as necessary.
3. Use the clipped/generalised range as the sensitivity, and display this to the user for confirmation.

User confirmation is an essential step, because the true range of the data might not be present in the dataset, and external domain knowledge may be required to correctly specify sensitivity.

An end-user may also configure the range of the sensitive variables and potentially truncate or clamp outlier values beyond a certain range in order to improve the PUT of the data product.

An end-user may also configure how to generalize sensitive variables. For instance Age can be generalised into bins of 10 or categorical variables can be generalised via a user-defined map. Lens then enforces this generalization when generating the data release. This, in turn, improves the privacy-utility trade-off.

Generalising the range can be a privacy protection. For instance, snapping the range outwards to the nearest multiple of 10 can hide information about what the real maximum is (e.g. if a maximum of 100 is reported, the real maximum could be anything from 11-100).

This feature is also discussed in Section B, Sub-Section 4.

3. Producing a Data Release

The workflow detailed below includes the steps of gathering a Data Product Specification, analysing it, and returning one or several Data Product Specifications along with recommended noise additions and other settings for privacy and/or utility.

Data product specification include any user configurable data product related parameters.

The process is flexible enough to manage different datasets and to steer many types of users towards a good privacy utility tradeoff.

Given a Data Product Specification, there are several ways of producing a safe Data Release:

1. The Data Product Specification can be made available or transmitted to a human specialist (a 'Lens Expert'), who facilitates the process described below, or
2. An automated system can use the Data Product Specification directly to produce a safe Data Release.

In case (1), the process is as follows:

1. The Lens Expert receives the Data Product Specification, and inputs the specification into Lens tools as part of understanding the required Data Release.
2. The Lens Expert conducts an investigation into the feasibility and privacy-utility balance of the Data Product Specification and the resulting Data Release. The Lens Expert uses Abe for performing attacks and making distortion calculations. The Lens Expert can use the most up-to-date versions of these tools, without the Lens interface itself having to be updated.
3. The Lens Expert may now optionally decide to propose one or more alternative Data Product Specifications that they believe better meets the required use case. For example, different rectangularisation, binning or QSSR might be proposed. In some cases the Lens Expert may conclude that there is no good safe Data Release that adequately meets the use case, and so may choose to respond to the Data Product Specification with a negative response that details why this is the case, based on their investigation.
4. The Lens Expert uses Lens tools to produce a Detailed Report and performs the privacy transformations described in the Data Product Specification, and then applies noise addition as informed by their tests with Abe, to produce a Data Release for each of the proposed Data Product Specifications.
5. The Lens Expert places the Detailed Reports and Data Releases into the Lens software.
6. The Lens User is made aware that Detailed Reports are available.
7. The Lens User can review the Detailed Reports and decide which, if any, they deem suitable.
8. Based on the selection, Lens makes the chosen Data Release available for onward use.

A variation of the above is as follows:

In step (4), the Lens Expert does not produce Data Releases which are input to Lens.

Only the Detailed Reports are produced and input.

Between step (7) and (8), based on the selection made by the Lens user in step (7), Lens uses the selected Detailed Report and the sensitive dataset directly, to compute a Data Release with no interaction from the Lens Expert.

As this processing may take some time, the Lens software indicates to the user that processing is underway. In the meantime, if a previous data release for the same data product is actively being used, such as via an API, this previous release will remain available until the new release is approved and activated In case (2), the process is similar but with automation replacing the Lens Expert:

1. The Lens software analyses the Data Product Specification and may produce a set of recommended alternatives.
2. For each of these, Lens produces a Detailed Report and a Data Release, by directly processing the sensitive dataset
3. The Lens User is made aware that Detailed Reports are available.
4. The Lens User can review the Detailed Reports and decide which, if any, they deem suitable.
5. Based on the selection, Lens makes the chosen Data Release available for onward use.

4. Detailed Report

Following from (1) and (2), the Lens software displays to the user one or more Detailed Reports, based on the Data Product Specifications. This is a rich summary of the effect of the differentially private noise addition that allows a user to determine whether or not the noisy statistics can be taken into use.

The report provides a detailed, yet understandable picture of the privacy-utility characteristics of an intended data release.

It is separated into sections:

Privacy Recommendation
Attack Summary
Utility Recommendation
Utility Summary

The Privacy Recommendation is a glanceable yes/no indicator presented to a user that displays whether the Abe-recommended noise level satisfactorily protects against attacks. The criterion for a 'yes' result depends on which attacks were performed, and whether the noise added was sufficient to defend the dataset. For example, in a situation where differencing attacks were used, a 'yes' result would be returned only if all the discovered attacks were defeated by the noise added. As a solver attack example, a 'yes' result would be returned only if the dataset could not be guessed more than x % correctly, for some appropriate pre-configured value of x.

The Attack Summary contains the summary output from the different types of deterministic and probabilistic attack Lens has performed. For example:

Differencing attack. A list of individuals is presented whose raw data values would have been exposed were they not protected by the addition of noise. The entries in the list contain the raw data values, and a summary of the attack that revealed the value.

Solver attack. A summary is presented of the effect of noise on the ability of an attacker to reconstruct the dataset, compared to a known baseline (e.g. always guessing 'Female' for gender, if gender were the private variable. This should succeed about 50% of the time on samples of worldwide populations, because it is commonly known that the male-female ratio is around 50-50). For example, it is possible to display that the addition of noise has reduced the ability of an attacker from reconstructing 90% of records, to 52%, where the baseline is 50%. The change here is a measure of how successfully Lens has defeated the attack.

The effectiveness of defending against attack depends on Lens having a model of baseline risk. This means that any increase in protection should be understood relative to the background knowledge an attacker may have.

The Utility Recommendation is a glanceable yes/no indicator presented to a user that displays whether the noise level preserves sufficient utility in the statistics. Lens can support different heuristics to determine whether to show 'yes':

A threshold approach based on the distribution of distortions of noisy statistics as compared with their values before noise addition. The threshold may be expressed as 'no more than x % of statistics has a distortion>y %'.

A threshold approach as above, but rather than a simple percentage distortion threshold, a threshold based on the sample error. Such a heuristic is expressed as 'no more than x % of statistics has a distortion>z*sample error'

An approach that respects which statistics are most valuable to the user and places more weight on these values when computing the overall recommendation. More noise is tolerated in the less valuable statistics. This relies on the Lens User having specified during the development of the Data Product Specification which statistics are most valuable. Lens can provide UI features to allow this to be expressed.

A threshold approach based on high-level insights in the statistics, using the Eagle system described in Section B, Sub-Section 1.5. Before computing the Detailed Report, Lens extracts a list of features of the statistics before noise addition. This includes general trends, min/max values, etc. A similar list of features can also be extracted after the addition of noise, and the Utility Recommendation can be based on imposing a threshold on the proportion of insights still evident in the noisy statistics.

The Utility Summary shows the effect on utility of noise addition, measured by computing the distortion of each statistic relative to its raw value, and visualising the distribution of the distortion values.

Figure 2:
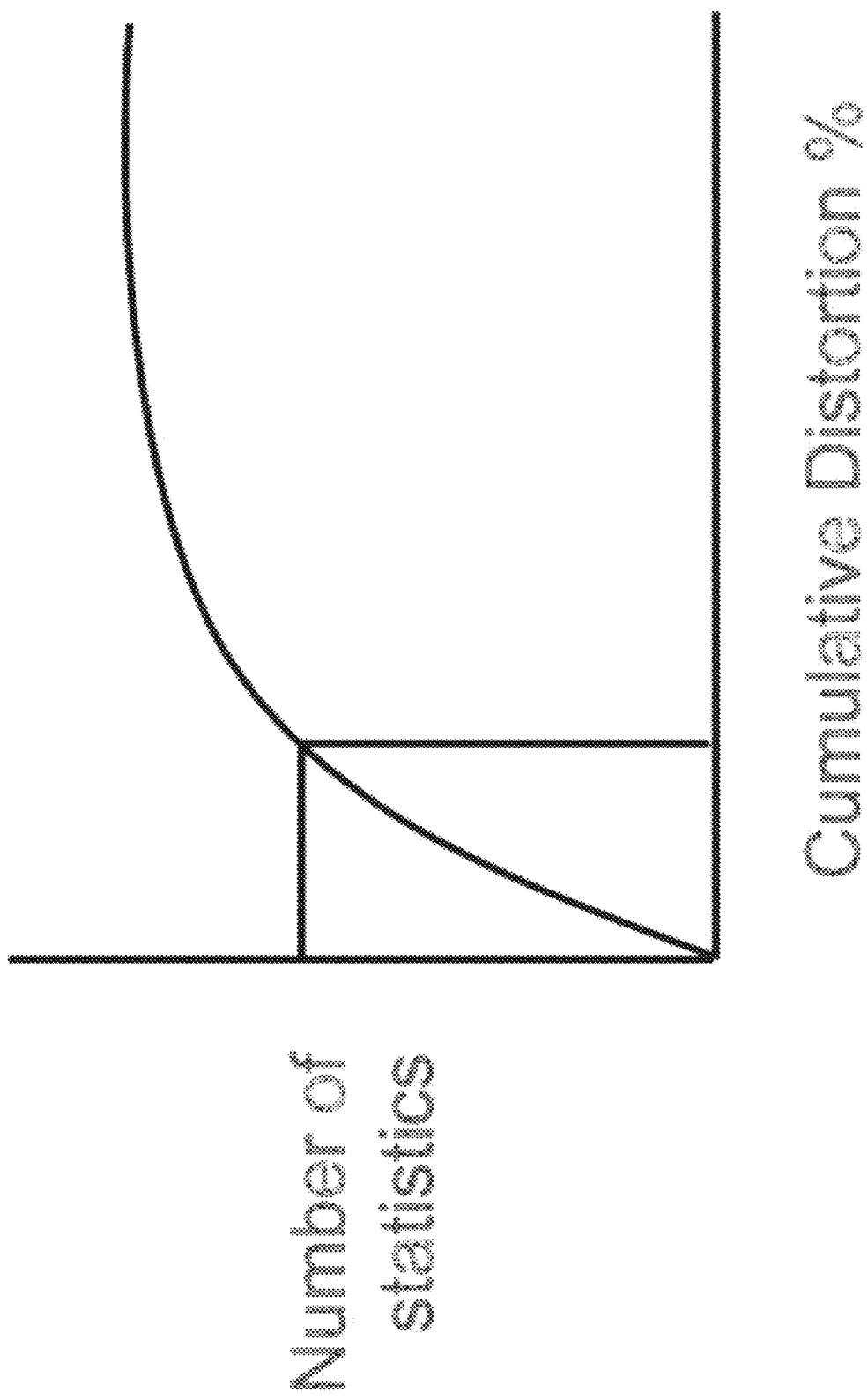
FIG. 2 shows a plot of the number of statistics as a function of cumulative distortion.

The distortion can be visualised using standard techniques such as:
1. Box plot.
2. Histogram. For example, this might allows the user to see that 90% of statistics were distorted between 0-5%, and 10% of statistics were distorted by more than 5%.
3. Cumulative distribution of distortion. By plotting distortion cumulatively, it is easier for a user to see the proportion of statistics distorted by more than a given amount. An example is displayed in FIG. 2 where the number of statistics is plotted as a function of cumulative distortion. The curve allows the number of statistics distorted by more than a threshold percentage to be read from the y-axis.

The purpose of these approaches is to enable the user to understand in an overall sense how the statistics have been changed by the noise addition, and thus their suitability for the intended data product. The user must decide on the basis of the utility summary and recommendation whether the release is ultimately suitable.

The Detailed Report contains all the information the user can use to determine whether they wish to approve or reject the statistics at the suggested noise level.

If the safe statistics are approved, the release can be made available for onward use in a data product. This is done by placing the safe aggregate statistics into a relational database referred-to as a 'Safe Insights Store'. Standard database technology is employed to give the maximum scope for onward use of the data.

5. Visualisation of Noise/Accuracy

Noise can be visualised directly on charts representing the statistics themselves. This can be shown as error bars, displayed by computing a confidence interval of the applied noise distribution, and applying it to a bar chart displaying the raw (non-noisy) statistic. Several statistics can be displayed on the same chart, each with error bars, allowing comparison between the noisy values.

Figure 3:
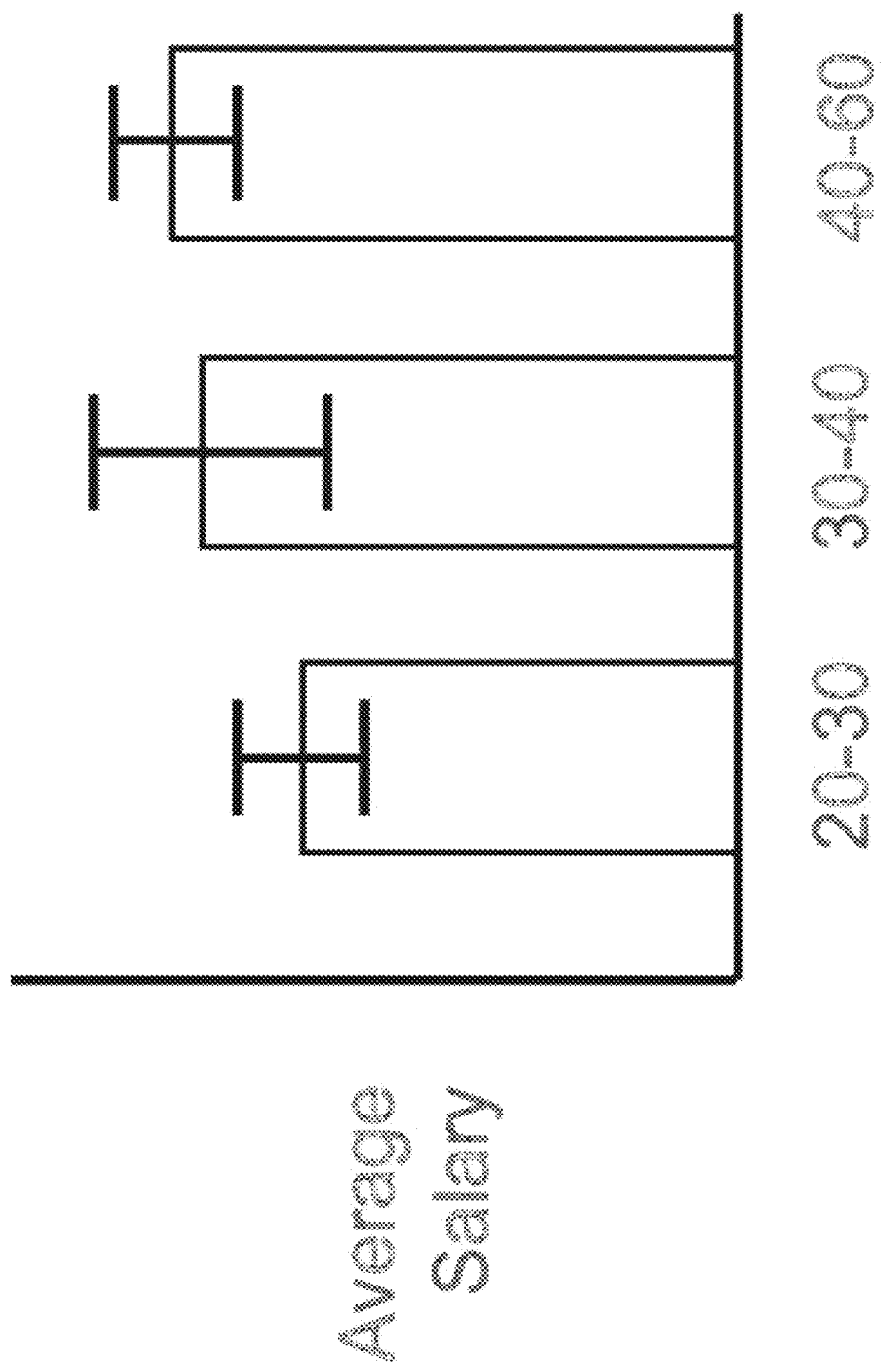
FIG. 3 shows a diagram with an example of visualisation of the applied noise distribution.

FIG. 3. shows a diagram with an example of visualisation of the applied noise distribution. In this diagram a sensitive value is shown (average salary), along with a breakdown by age range. The raw statistic is displayed as a bar chart, overlaid with error bars visualising the amount of noise added probabilistically in the corresponding data release.

Unified Visualisations and Control of Privacy and Utility:

Lens can support visualisations of privacy and utility together, and these visualisations can be used in an interactive manner to allow a user to override Lens's automatic choice of noise amount and determine their own privacy-utility balance. Two such visualisations are described below:
1. % A Attacks Defeated against % Statistics Preserved curve;
2. Attacks Defended and Insights Preserved by Noise Level chart.

These are described with examples below:

% Attacks Defeated against % Statistics Preserved curve

Figure 4:
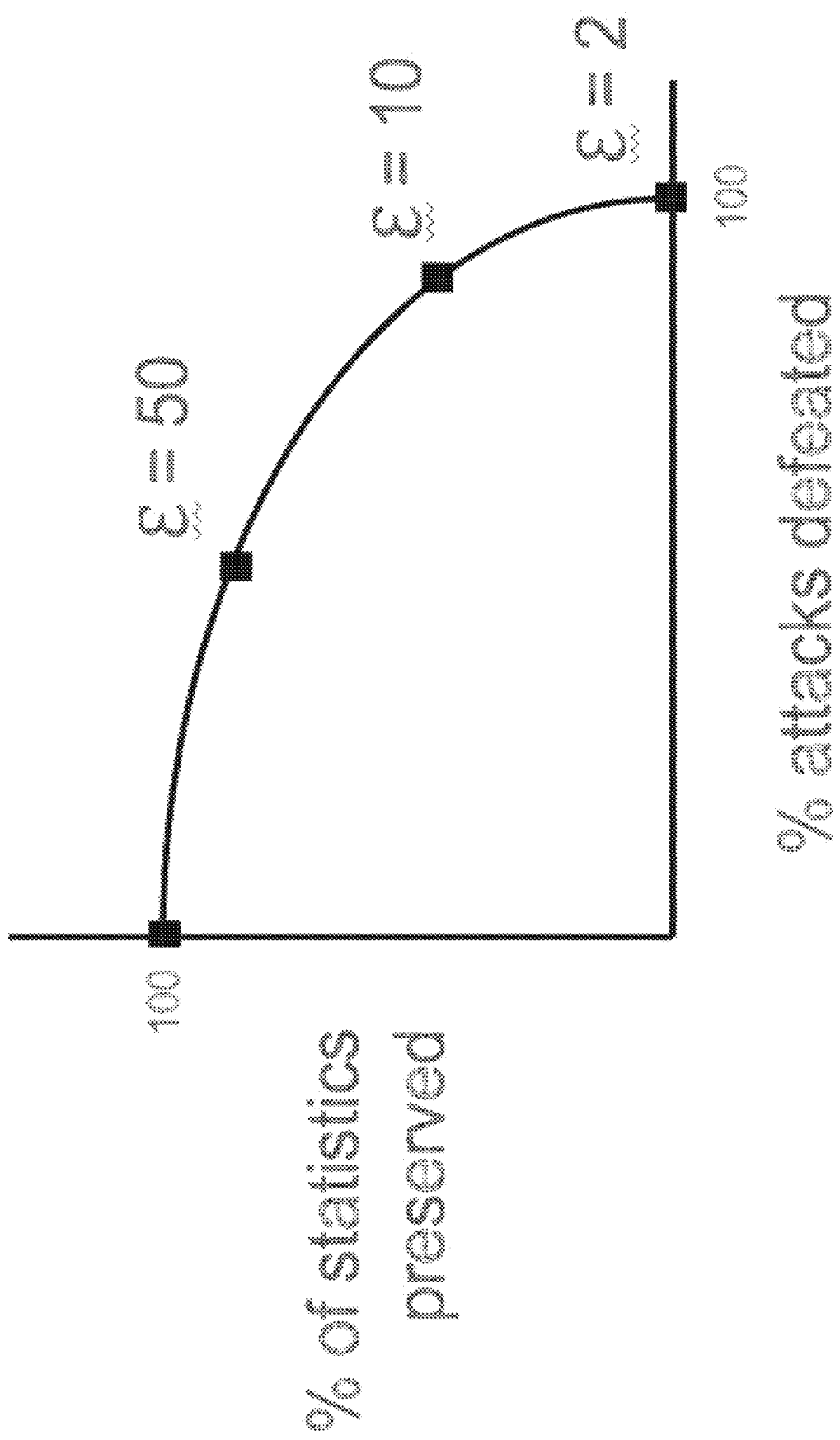
FIG. 4 shows an example of a curve of attacks defeated against statistics preserved.

As shown in FIG. 4, in this curve, Lens displays the effect of various noise amounts (in this case, the value of epsilon) on attacks defeated and statistics preserved ('preserved' here meaning not distorted by more than a threshold amount).

By selecting a node along the curve, the user can specify a noise amount at the expense of preserving statistics. This is a visual way for a user to understand how explicitly choosing a noise level affects utility.

Attacks Defended and Insights Preserved by noise level chart:

In this diagram, two bar charts placed vertically indicate the effect of choosing a certain amount of noise on the number of attacks that are defended against and the number of insights that are preserved.

The chosen amount of noise is indicated by the dotted vertical line. If the display is being used as an interactive control, it slides along the x-axis to control the noise level. As the line moves to the left (less noise), it is clear to the user that fewer attacks will be defended against, as the applied noise is less than the required amount to defend against each, as denoted by the bars on the upper bar chart.

Figure 5:
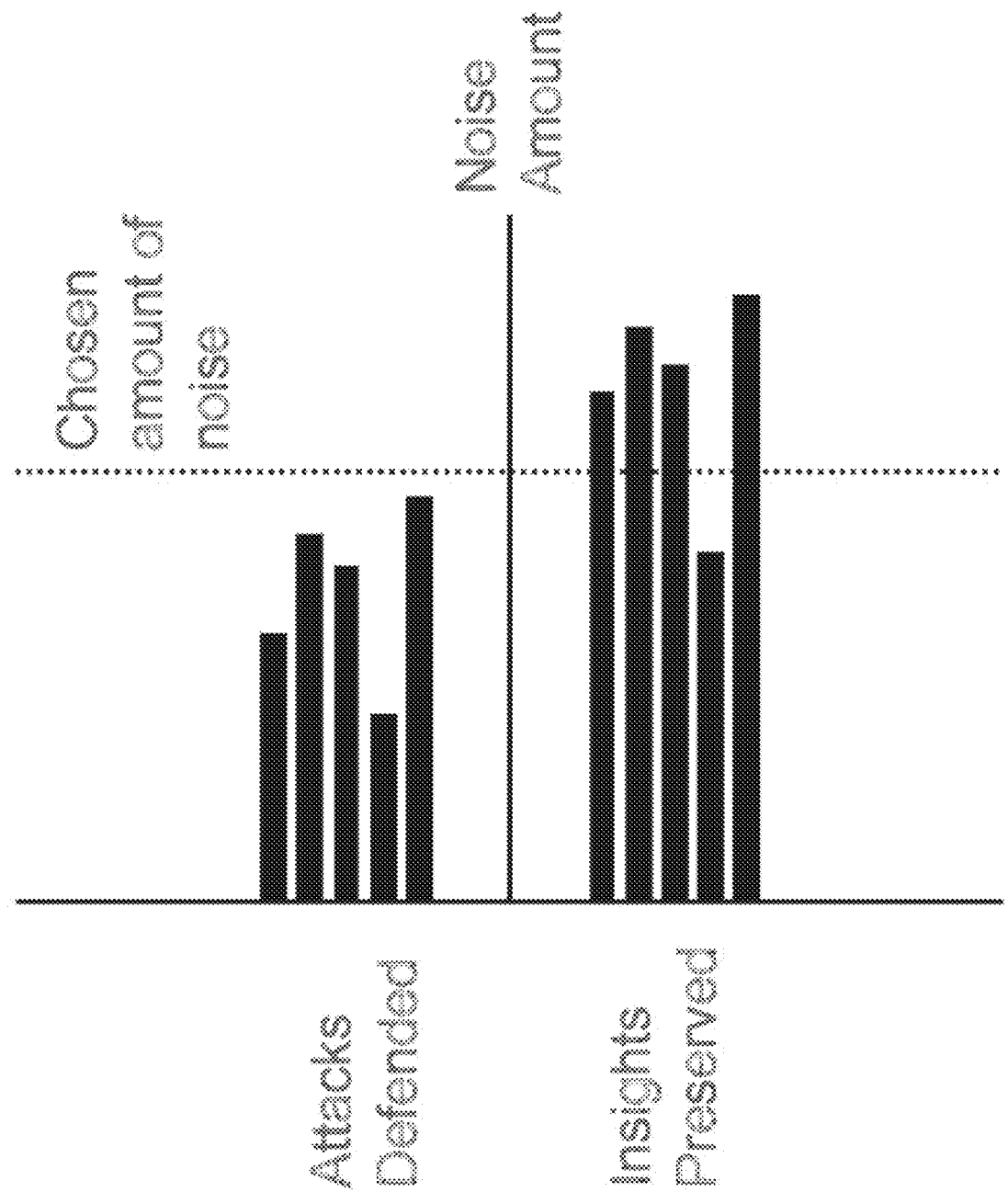
FIG. 5 shows a vertical bar chart with the attacks defeated and insights preserved as a function of the amount of noise are shown.

As the line moves the to the right (more noise), fewer insights are preserved after noise addition. 'Insights' here means interesting features extracted automatically by Lens, measured before and after noise addition as a measure of change in utility. With reference to FIG. 5, a vertical bar chart to visualise the attacks defeated and insights preserved as a function of the amount of noise are shown. As the noise level increases, more insights will be lost, as denoted by the bars in the lower chart.

By selecting a noise level in this way, the user can understand the compromise between defending against privacy attacks and retaining usefulness in the dataset. The user can use this display to set their own compromise.

6. Data Product Improvement Recommendations

Given a Data Product Specification that has resulted in a Detailed Report, Lens can suggest improvements to the Data Product Specification that give a better privacy-utility trade off. These improvements might be suggested either by the Lens Expert or automatically by Lens itself.

If a user decides to implement some or all of the recommendations, a new Data Product Specification and a new Detailed Report is prepared that describes the changes and summarises the new privacy-utility trade off respectively.

Lens guides end-users on how to modify a data product to have a better PUT. As an example, if a data holder wants to release data products that are unable to protect privacy, such as if someone wants to release square foot by square foot population counts every second. In that case, Lens guides the data holder towards trying to release aggregate statistics that are intrinsically more privacy friendly. Privacy utility trade-off are determined either using Lens or directly from some quick heuristics. If the trade-off does not meet the user or data holder requirements, modifications to the data product specifications are suggested, such as: reducing the dimensionality of the tables, reducing the frequency of releases, generalizing the data, suppressing outliers, etc.

Further examples of recommendations are as follows:

Generalise a numerical variable by binning into bins of a certain size.

Generalise categorical variables by grouping into similar, related or hierarchical categories. In the hierarchical case, generalisation can be performed by using an external hierarchical definition to promote a value to a broader category.

Modify the Data Product Specification to include histograms about numerical variables rather than averages.

Apply a QSSR threshold to suppress statistics based on low counts.

Clamp or suppress outliers.

Suppress release of some unimportant drilldowns. By default Lens may compute a multi-dimensional 'cube' of drilldowns (for example, age bracket times gender times income bracket). A recommendation may be to only release 2-dimensional tables, rather than n-dimensional. This is an effective way to limit the number of statistics that are released, which in turn will requires less noise overall.

End-users may also configure any parameters of a Data Product Specification via a graphical user interface. The system may then automatically display recommendations based on any updated parameter of the Data Product Specification. For example, the end-user may input a QSSR value that yields to fewer statistics being attacked and the system may find the same privacy level that can be achieved with less noise. As an end-user update the different QSSRs, the system displays the noise recommendation for each QSSR. An end-user may then automatically find that there is no benefit to releasing statistics with a query set size below a certain threshold.

New techniques for producing recommendations will become available over time. Lens can provide a generic user interface for reviewing a proposed improvement, and allowing the user to apply it to a pending Data Product Specification. In each case, a new Detailed Report is prepared to allow the effect of applying the recommendation to be understood.

7. Lens API

When a Data Release has been approved, it is available for external use outside Lens. There are two ways the values in the Data Release can be made available from the Safe Insights Store:

1. API access. Lens exposes an API that can be used by external data products to retrieve the values from a specific Data Release from the Safe Insights Store. This API is expressed in terms of the corresponding Data Product Specification, meaning that values for drill-downs, queries and filters expressed there are supplied in the API call and reflected in the values returned.

2. Direct database access. To support low-level, efficient access to the values in a Data Release, it is also permitted to access the Safe Insights Store database directly. This will be accomplished using standard database technologies such as JDBC.

8. Benchmarking Against an Organisation's Clear Data

Lens supports a 'benchmarking' use case where safe aggregate statistics in the Safe Insights Store can be compared against some raw data that contributed to the aggregate. Importantly, the raw data values are released only under an authenticated model where access permission is verified.

For example, if a data product has been defined that computes an average transaction value computed using data taken from a set of retail companies, it is interesting for any one of those companies to compare their own raw value against the safe aggregate. Each company can 'log in' to an authenticated section of the data product, thus authorising access to their own raw values. The Lens API can then return both the aggregate and the raw value, allowing for visualisations where the two can be compared.

The same process may apply to a drilled-down subset of records, for example to compare raw against an aggregate for a demographic category or time window.

9. Repeated Releases

Lens supports scenarios where data evolves and new, updated Data Release(s) based on the new state are appropriate. This may either be due to a periodic refresh of the sensitive dataset from a 'master' business system, or a change in scope in the dataset, such as the inclusion of more entities.

Hence Lens allows companies to manage a periodically refreshing data product, while making sure it is privacy protected.

During the production of a new Data Release by the mechanisms described above, the existing 'current' Data Release remains available from the Safe Insights Store and via the API. The action of approving a pending Data Release causes the current release to be 'archived', and for the pending release to become the new current release. It is always possible to access the Detailed Report for any archived Data Release via the Lens UI, and to determine the dates between which any Data Release and Detailed Report were current and in use.

Unequal Noise on Repeated Releases

As described in this specification, where multiple Data Releases are made based on the same entities, attacks on those entities are possible. To mitigate this, for a given Data Release, Lens can determine a noise level that protects entities for an assumed number of future releases.

Lens supports two strategies for distributing noise between current and future releases:
1. Ration noise: based on a number of releases to protect, ration the noise addition such that the noise added to the current release and each future release is expected to be roughly the same, and all attacks are expected to be defended against. When it's time for each new Data Release, the calculations are re-checked with the new data and the rationing is updated. This process is discussed in Section B, Sub-Section 1.7.3. Each statistic in each Data Release receives the same amount of budget. In this scenario, Lens may produce a warning if a release requires drastically more noise than previous releases to achieve the same privacy. This is an important feature of Lens, as changes in data may otherwise produce unexpected risks.
2. Treat releases independently: in this approach, each release is protected independently. While simpler, this approach does not account for attacks that leverage multiple releases. As such, approach 1 is safer.

These strategies can coexist with the equal/weighted distribution of budget per release, which is done for the purposes of prioritising utility of more important statistics, and is discussed above.

10. Understand Sampling Error

Some statistics may be intrinsically uncertain and often there is no need to pay too much attention to such statistics. However noise often distorts these statistics heavily. In that case, distortion is compared to sampling error to provide a useful picture of the distortion involved, as sampling error highlights intrinsically uncertain statistics.

Raw data processed by Lens typically represents a sample of a wider population, and therefore any statistics computed on this raw data are subject to a sampling error. Lens adds differentially private noise onto such statistics as required to protect against attacks.

For a given data product configuration and sample dataset, Lens can compare magnitudes of the noise and the sample error and derive interesting conclusions that can be displayed on the utility report.

If the magnitude of the noise is much less than the sample error, as a ratio, then this is an indication that the degradation to utility caused by noise addition is acceptable, as the statistics were already uncertain to a larger amount due to the sampling error. Lens can display this conclusion on the detailed report.

If the magnitude of the noise is similar to the sampling error, this still indicates a good utility compromise because the uncertainty of the statistics is not significantly changed as compared to the raw underlying statistics because of the sampling error. Lens can display this conclusion on the detailed report.

If the magnitude of the noise is much greater than the sampling error, users should use the other information presented on the utility report to determine if the data release can be reasonably used.

11. Use case example with aggregate statistics from clothing retail shops

Lens provides an intuitive set of tools for data holders to manage the privacy protections of an original dataset while maintaining the utility of the data and to determine appropriate privacy parameters, such as differential privacy parameters.

The following screenshots show examples of data releases of aggregate statistics from clothing retail shops.

Figure 6:
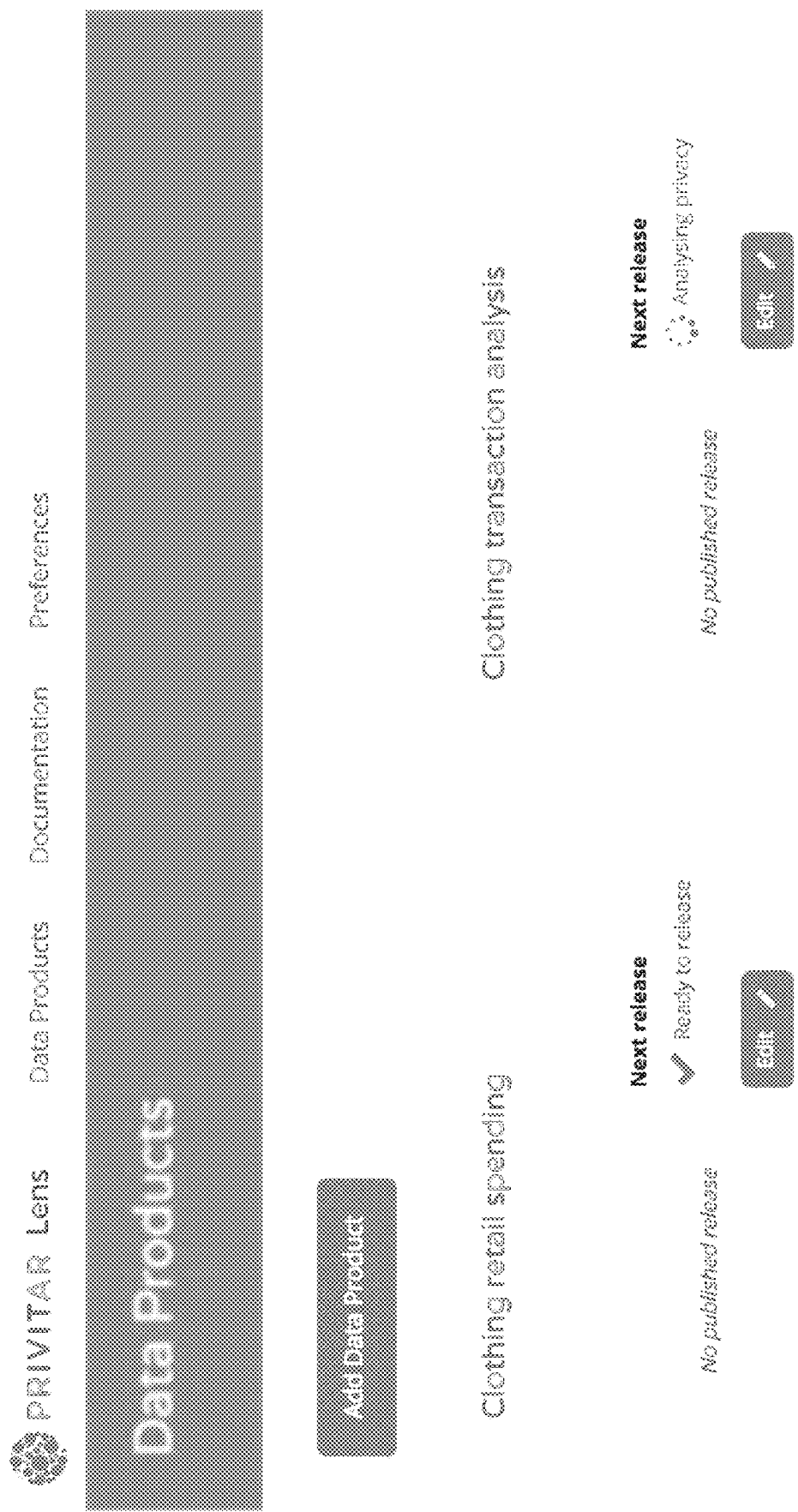
FIG. 6 shows a screenshot with an example of a user interface enabling a data owner to create privacy preserving data products.

FIG. 6 shows a screenshot with an example of a user interface enabling a data owner to create privacy preserving Data Products.

Figure 7:
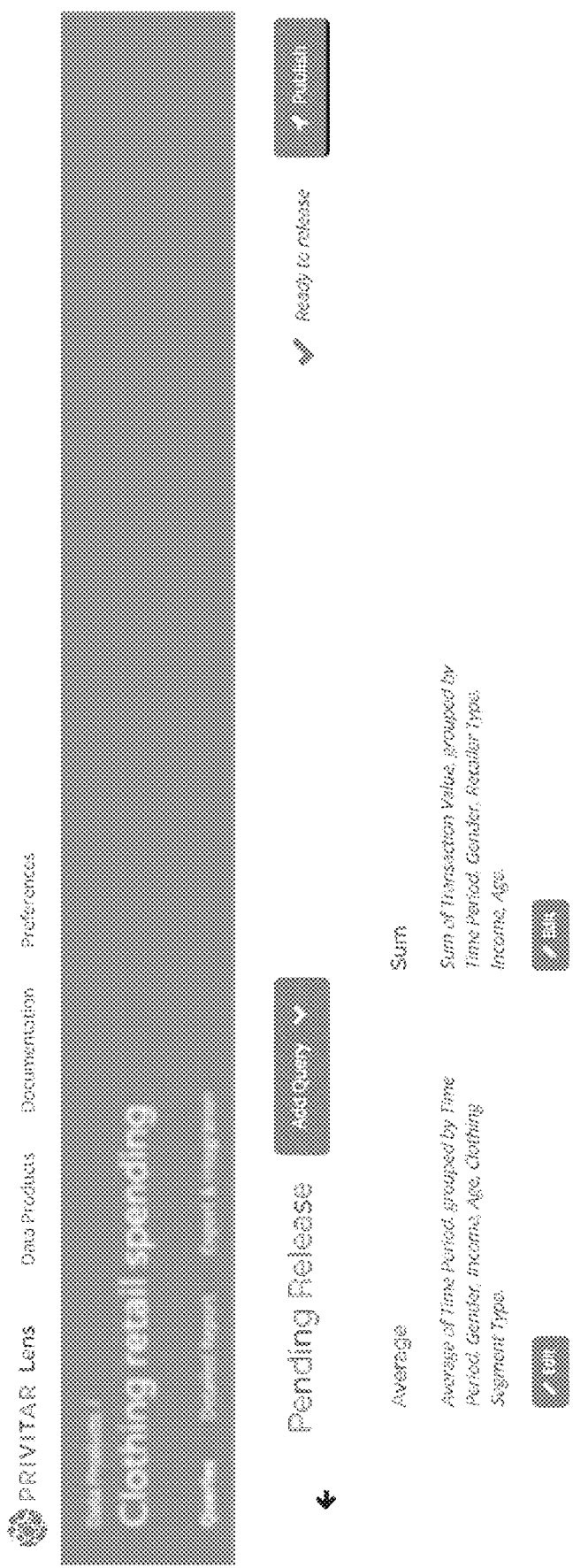
FIG. 7 shows a summary of queries for a pending release.

FIG. 7 displays a summary of queries, including an AVERAGE and a SUM query, for a pending release. The system displays when the Data Product is ready to be released.

Figure 8:
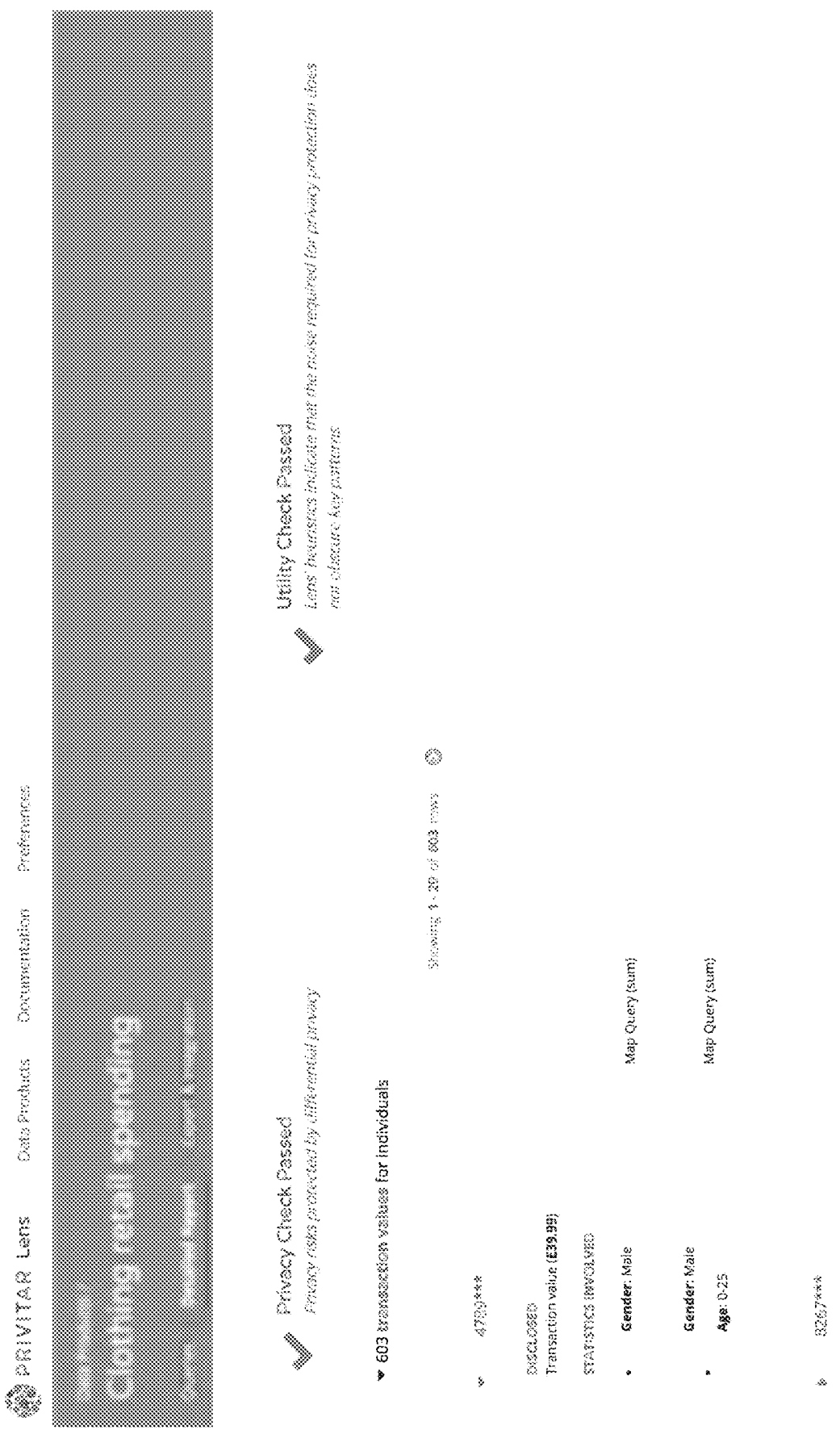
FIG. 8 shows a detailed report for a pending data product release.

FIG. 8 displays a detailed report for a pending Data Release.

Figure 9:
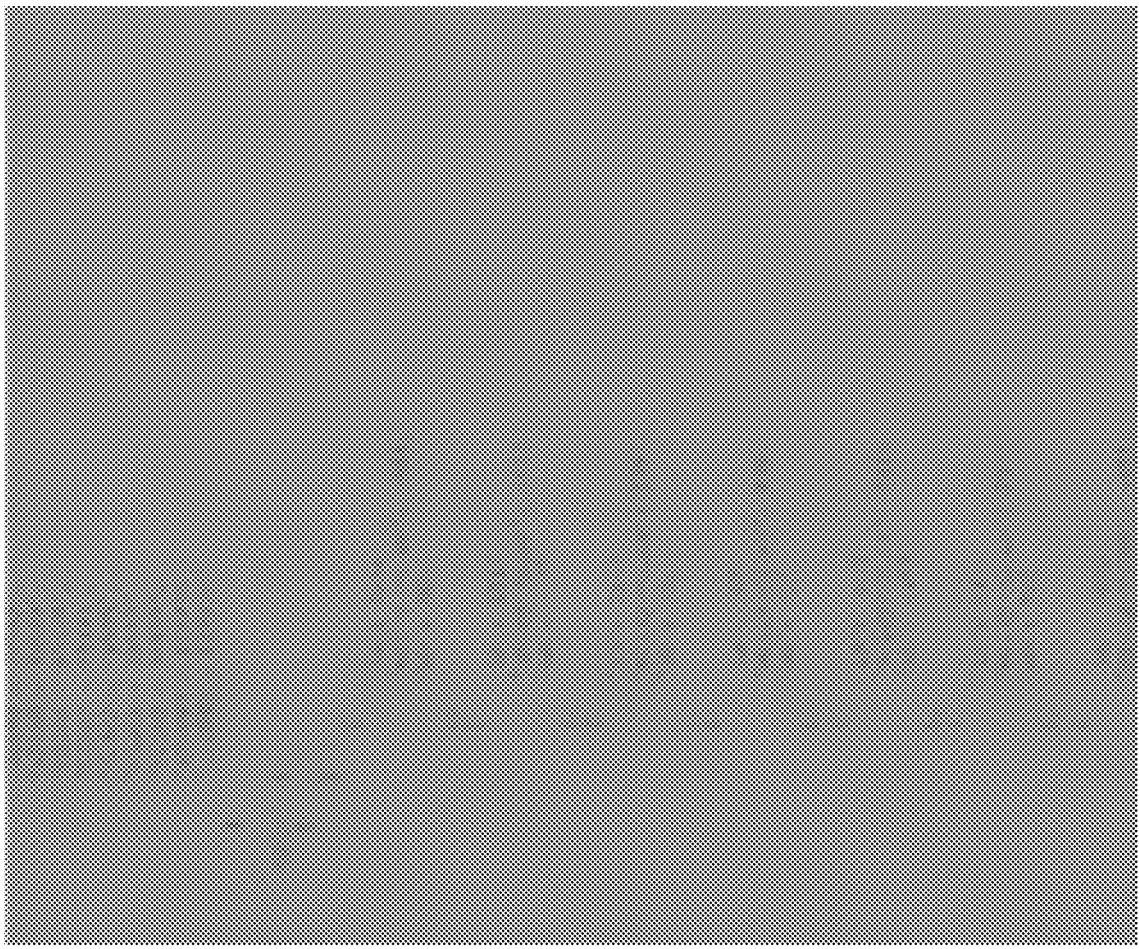
FIG. 9 shows data product values for a specific query.

FIG. 9 displays example of a Data Product specification as a Json

Data holders are able to drill down for more details in multiple dimensions, for example based on demographic information or behavioural information, while simultaneously preserving privacy.

Figure 10:
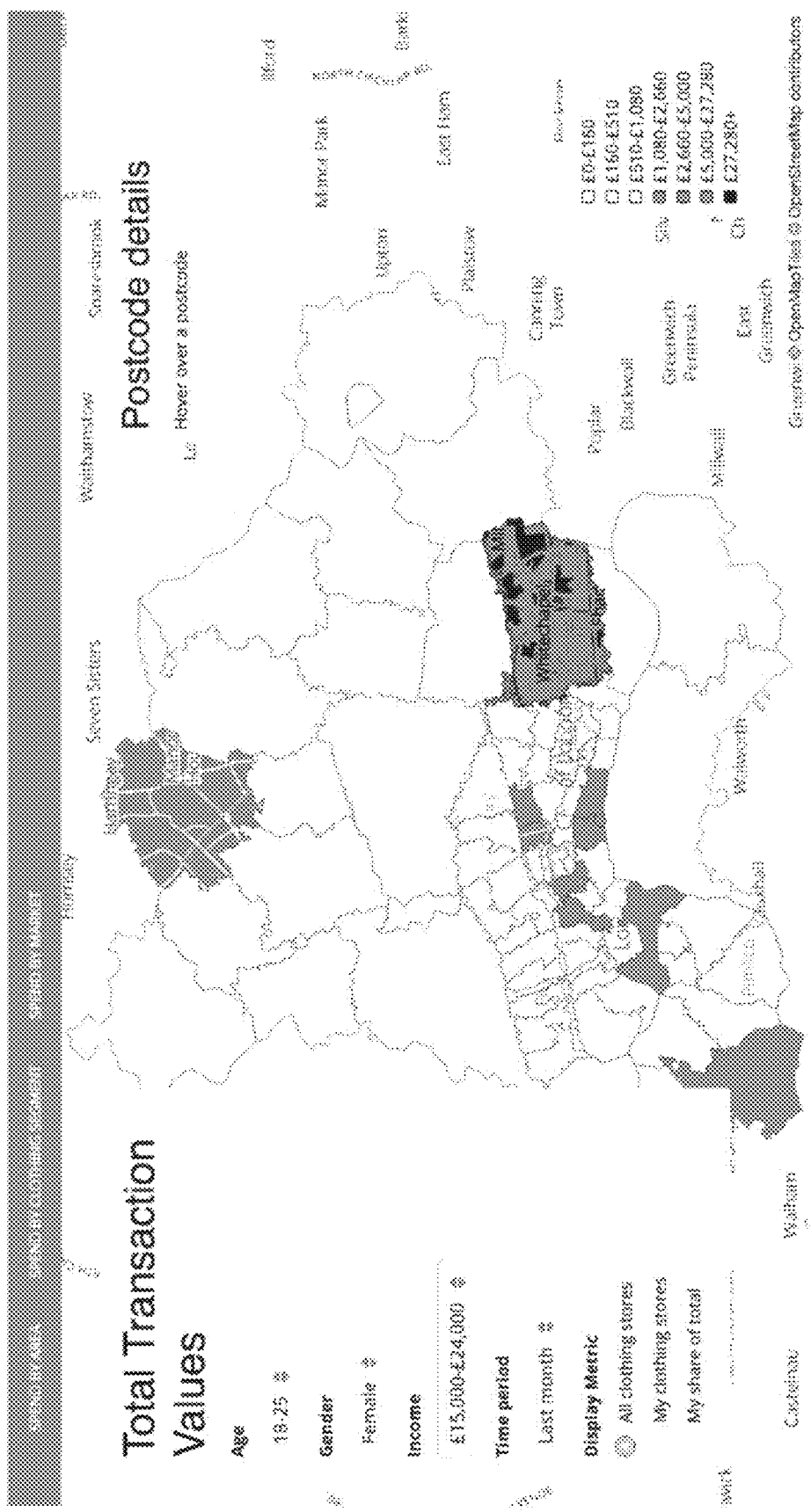
FIG. 10 shows a map illustrating retail shops transaction details by area.
Figure 11:
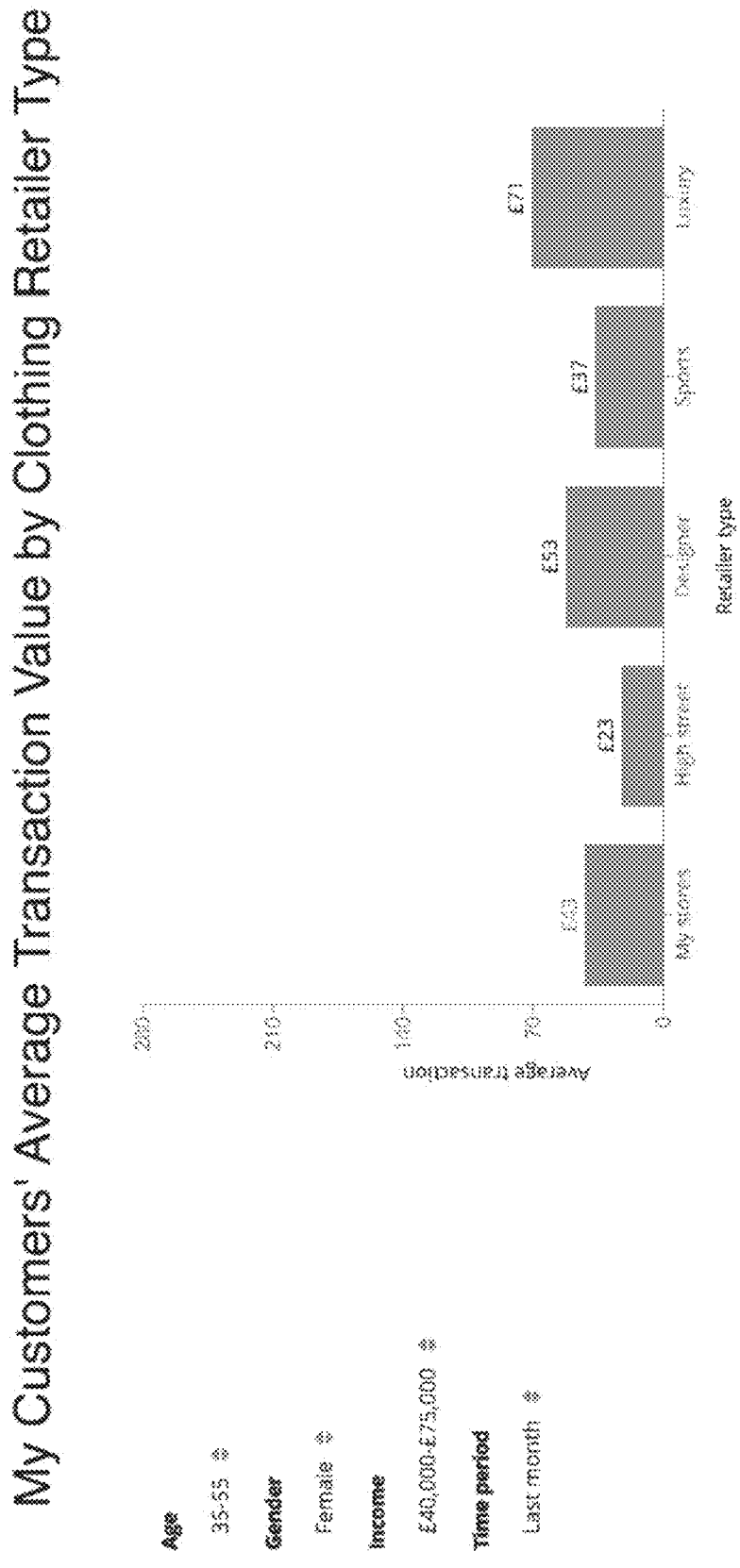
FIG. 11 shows an histogram with transaction details by clothing segments.
Figure 12:
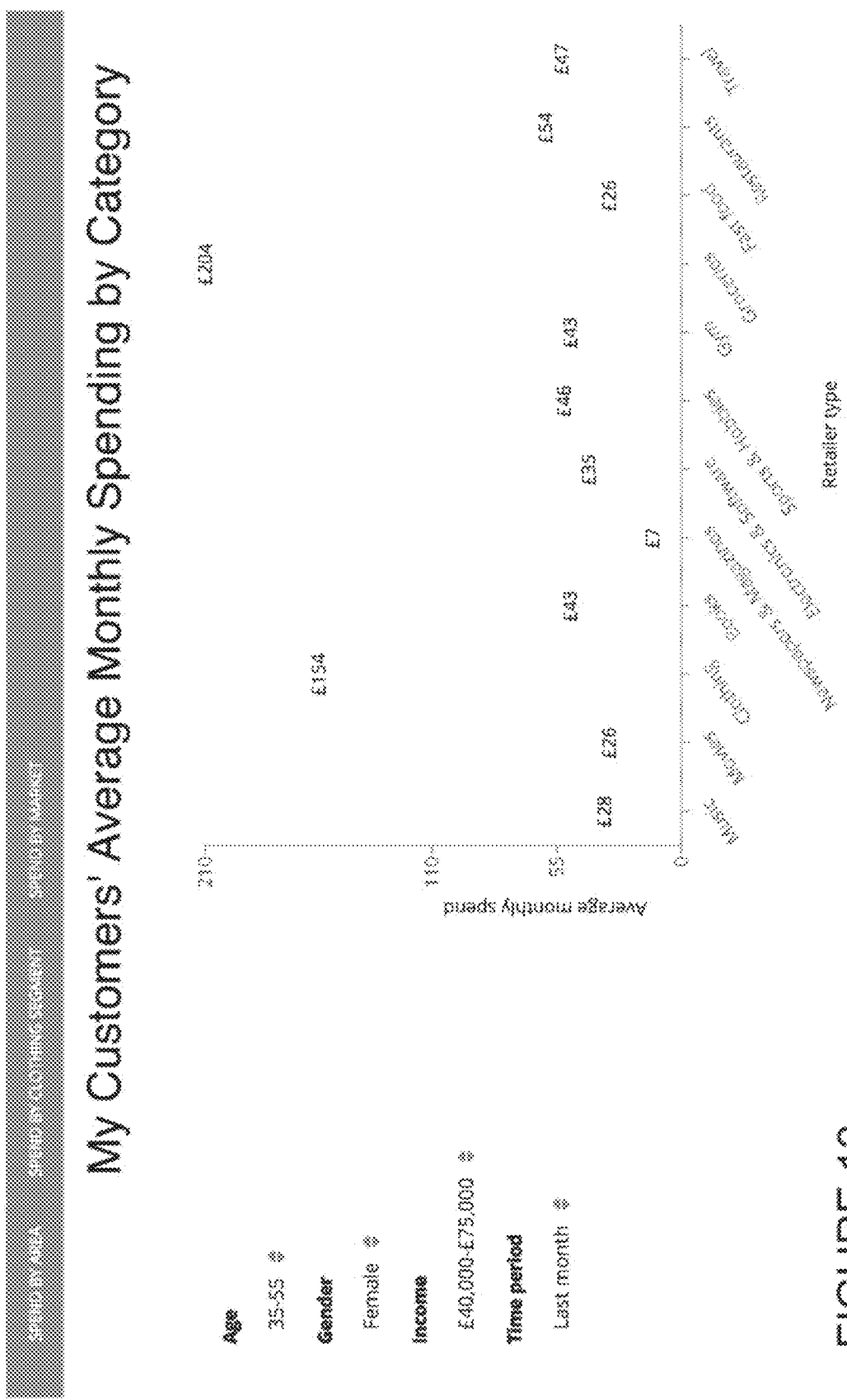
FIG. 12 shows an histogram of customer's average monthly spending by market.

FIG. 10. displays the total transaction values by area. FIG. 11. is an histogram of average transaction values by clothing segments. FIG. 12 is an histogram of customer's average monthly spending by market. The information can be further drilled down such as by age, gender, income, or time period.

Section B: Detailed Description of the Lens platform for creating privacy-preserving data products Lens contains the following key innovative features:
1. A process to choose the right strength of epsilon for a data product. The process is driven by automated adversarial testing and analysis.
2. Features to support a data product from a dataset that contains multiple private attributes per person (e.g. an HR dataset with both sick pay and disciplinary records).
3. Features to support a data product from a transactional or time-series dataset.
4. A process for guiding the user to set "sensitivity," an important concept in differential privacy.
5. An option to release either aggregate statistics or synthetic data that reflects those statistics.
6. Features to give privacy protection to one or multiple entities (e.g., people and companies).
7. A set of heuristic methods to quickly (but without 100% accuracy) judge whether statistical releases are safe.

1. Setting "Epsilon"—the Amount of Noise Added to Statistics—Via Automated Adversarial Testing and Analysis Lens uses noise addition to ensure that statistical releases do not lead to disclosures about an individual. It uses differentially private noise addition mechanisms such as the Laplace mechanism. When using these mechanisms, the amount of noise is controlled by a parameter called epsilon.

Lens contains a system to set epsilon through adversarial testing and utility testing. This section describes this adversarial testing and utility testing system. The system is a principled way to choose epsilon in order to balance privacy risk versus analytic utility.

A penetration engine system automatically runs a set of predefined privacy attacks on a set of statistical tables and determines the privacy risk associated with the potential release of the set of statistical table. By automating a number of attacks, conducting a comprehensive penetration testing is easily performed. Automating the adversarial testing is much faster and more repeatable as compared to manual testing. In addition, it is more reliable and quantitative than previous privacy penetration systems.

The penetration engine also manages the privacy parameter epsilon by estimating if the multiple attacks are likely to succeed and choosing epsilon such that all the attacks fail.

Note that while this section mainly refers to epsilon, epsilon-differential privacy, and the Laplace mechanism, the section applies similarly to two other variants of differential privacy: approximate differential privacy and concentrated differential privacy, both of which can use the Gaussian mechanism. These variants are well known in the field of differential privacy research. This same point about cross-applicability is true for the other sections as well.

1.1 Background on Privacy Risk of Releasing Aggregate Statistics

Releasing aggregate statistics (for instance, contingency tables) about private datasets can, in some cases, lead to disclosure of private information about individuals. Often, it is not obvious how a set of aggregate statistics about groups of people can leak information about an individual and manual output checks fail to detect all of these unintended disclosures. Researchers have invented techniques for mitigating the risks of private information leakage. Two such techniques are suppression of statistics about small groups and addition of random noise to statistics.

Much less established are techniques for measuring the risk associated with releasing aggregate statistics. One way to assess risk is to use a theoretical privacy model such as differential privacy. Theoretical models give some metric of how safe the statistics are in terms of privacy, but they suffer from two problems. First, their metric is difficult to map to an intuitive understanding of privacy: what does epsilon (the main parameter of differential privacy) being 0.5 actually mean? Second, theoretical models consider worst case scenarios and thus can be impractically pessimistic about the amount of risk in a data release.

There is a need for alternative ways to measure the privacy risk of aggregate statistics.

Furthermore, privacy-preserving techniques to defend against private information disclosure come with a trade-off between the privacy protection achieved and a loss in data utility. For example, the suppression of statistics about small groups protects against direct private attribute disclosure but at the same time leads to a decrease in the information that can be released. It is thus important to assess the utility of the data that is released under privacy-preserving techniques. However, it is not always clear how to best measure utility loss or data distortion. In cases where the utility cost of distortion and data loss is not clearly defined a priori, there is a need for alternative ways to measure data utility of private aggregate statistics.

Using adversarial testing to test defenses is a methodology that may be easily understood. However it remains difficult to test a large number of attacks and there is a risk of over fitting one's defenses to the attacks that are only attempted during testing.

In comparison, differential privacy is agnostic to attack type. However, as described above, understanding how to set epsilon is a difficult task.

Lens combines the benefit of adversarial testing approach and privacy protection techniques, such as differential privacy.

1.2 Overall Purpose of the Adversarial Testing and Analysis System

Figure 13:
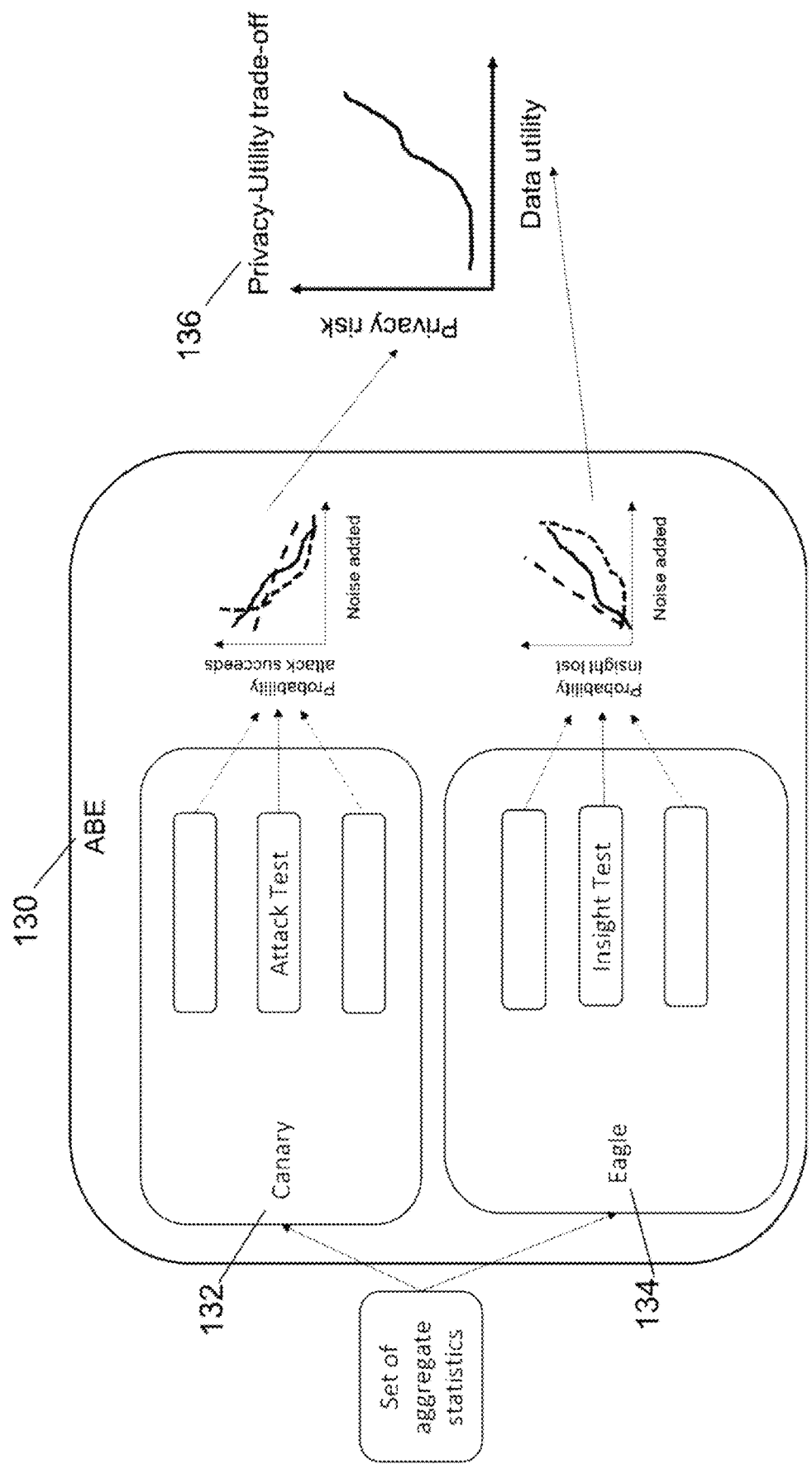
FIG. 13 shows the three components of this system—Abe, Canary, and Eagle.

FIG. 13 shows three components of this system—Abe 130, Canary 132, and Eagle-134—each have different, but related, purposes.

Eagle 134 is focused on measuring the utility of a statistical release. It extracts high-level conclusions from a set of aggregate statistics. These conclusions are what human analysts might draw from looking at the statistics. For instance, they might be of the form, "People of variable X=x are most likely to have variable Y=y", or, "There is a correlation between variable X and variable Y".

Canary 132 is focused on detecting the risk of private information about individuals being disclosed. Canary models different types of adversaries and runs a set of privacy attacks on a given statistical release. The Canary attacks are ways of combining information from a set of statistics to determine one person's private attribute. For instance, one attack on a SUM table might be to subtract the value of one cell from the value of another cell. If the groups associated with the two cells differ by one person, this attack reveals that person's private value. The Canary attacks output some measure of private attribute disclosure risk for the set of aggregate statistics. For example, the SUM attack outputs a list of individuals whose private value can be learned from the aggregate data.

Canary and Eagle each have standalone usefulness as well as being useful for Abe 130.

Abe assesses the privacy-utility trade-off 136 of various privacy-preservation techniques. Most privacy-preservation techniques are parameterised—for instance, small count suppression is parameterised by the threshold below which to suppress a count. For any given privacy-preservation technique, such as differential privacy, Abe selects a parameter that, if possible:

preserves the high-level conclusions of the originalables. This step uses the output of Eagle.
  defends against all known privacy attacks. This step uses the output of Canary.

It may be the case that there is no parameter that simultaneously gives good privacy and utility. In this case, Abe detects this fact and can report it to the user.

Abe, Canary, and Eagle have a few key qualities that make them a valuable technology.

Measuring utility loss in the absence of a clear cost function: Privacy mechanisms generally introduce distortion to data or suppress data. Measuring the impact of this on the data's utility is always a challenge. Distortion metrics (like root mean squared error) can be used, but that implies that the user knows how to interpret distortion. Abe, using Eagle, in addition to performing standard distortion metrics such as root mean squared error, performs a higher-level approach of testing that the key insights derived from the data are preserved. In some scenarios, distortion of data does not matter if the same insights are derived from the distorted data as the raw data. Eagle can be configured to capture many different types of insight.
  Real-world risk measures: It can be hard to determine how much privacy risk is latent in a statistical data release, even when a model like k-anonymity or differential privacy is used. Abe, in combination with the Canary attacks, uses an approach analogous to penetration testing in cyber security. It attacks the statistics as best it can, and records how well it did. This is an interpretable and useful way of measuring privacy risk.

1.3 Input Data

All components analyse aggregate statistics and/or the row-level data that generated them. Aggregate statistics can be best described as the result of a statistical SQL-like query of the form AGGREGATE(privateVariable) GROUPBY (attribute1 & attribute2 & ...)

AGGREGATE may include SUM, COUNT, AVERAGE, or MEDIAN. This can for example be a COUNT query over a statistical database for all people in the dataset with a certain set of attributes such as:

COUNT(*) GROUPBY(gender & payGrade)

Or a SUM query over a private value such as:

SUM(MonthlyIncome) GROUPBY(gender & department)

Computing the result of these queries over a database produces many aggregate statistics which have the structure as shown in FIG. 14.

This is an example of the type of data release that ens outputs—and that Eagle and Canary operate on.

1.4 Encoding Aggregate Information as Equations

A programmatic way of expressing the information about each individual is needed. Statistics, such as sums and counts, are linear functions of individual values, and can be expressed through a system of linear equations Many Canary attacks need the aggregate information to be summarised as a set of linear equations of some form. The next sections describe how the different types of aggregate statistics are represented.

1.4.1 Encoding SUM and AVG Tables

Consider sum tables that display sums of a private attribute for various groups of people. For instance, a table might display the total salary at a company for each department. In this case, each person's private attribute is a continuous value and the system encodes it as a variable. For instance, if there are 10 people in the sample population, their private attributes are represented by variables v1, ..., v10. An attack aims to recover the exact value for each variable in the population (for instance, v1=35000, v2=75000, etc.). Now, each cell in the SUM table corresponds to a group of people and can be converted to a linear equation. For instance, if a cell corresponds to persons 2, 5, and 7, and says that the sum of the private attributes is 99, we have the equation:

$$v2+v5+v7=99$$

We refer to each statistic in a table as a "cell", "aggregate query", "aggregate", or "statistic".

For sum tables, all information from the aggregates is summarised in one system of linear equations:

$$A \cdot v = d$$

If, for example, we release m sums about n people, A is a m×n matrix of 0s and 1s, where each row represents a sum and marks individuals who are included in the sum as 1 and other individuals as 0. The vector v is an n-dimensional column vector that represents the value of the private attribute for each individual. The vector d is of length m and has the values of the sums as its entries.

AVERAGE tables can be re-expressed as SUM tables. In the case of AVERAGE queries, sometimes all the dimensions of the table are known background variables, and the unknown private attribute is the variable being AVERAGE'd. Given this background knowledge, the count of each cell is known, and thus count can be multiplied by the average to get the sum. In this way, the AVERAGE table can be reduced to the SUM table case and solved by the method for SUM tables.

By knowing the size of every query set, such as from background knowledge on all people and on all of the group by variables, back and forth calculations between AVERAGEs and SUMs can be performed.

1.4.2 Encoding COUNT Tables

Encoding COUNT tables, also known as contingency tables, works as follows.

One-hot encoding is used to split categorical variables into several binary variables and a set of equations is used to express each statistic. Another set of equations is then used to express that each person is associated with only one category.

The assumption is that the COUNT table has N dimensions, and N−1 of them are attributes that are publicly known. For example, with N=2, there may be a 2-dimensional contingency table of counts by age and drug use, that would have age ranges {0-10, 10-20, ...} on one axis and drug use {NEVER, RARELY, FREQUENTLY} on the other axis. Age is assumed to be a known attribute, while drug use is assumed to be an unknown and private attribute.

Canary one-hot encodes the private categorical variable, so for a private categorical variable with 3 categories, each person has 3 associated variables that can take a value of 0 or 1—let's call these $v_{1:x}$, $v_{1:y}$, and $v_{i:z}$—which correspond to whether the person labelled 1 belongs to category x, y, or z, respectively, and that are such that $$v_{i:x}+v_{i:y}+v_{i:z}=1,$$

which intuitively means that each person can only be part of one category. In the drug-use use case this would be:

$$v_{i:NEVER}+v_{i:RARELY}+v_{i:FREQUENTLY}=1.$$

Then, Canary encodes the information from the COUNT contingency table. Say that it is known that one row of cells (for instance, the row of cells where age range is 20-30) consists of three people, persons 4, 9, and 19, but is unknown which private attribute category they fall into. If that row looks as shown in the table in FIG. 15.

Canary encodes this into three equations, one per cell, using the same variables as before:

$$v_{4:NEVER}v_{9:NEVER}v_{19:NEVER}=1$$

$$v_{4:RARELY}v_{9:RARELY}v_{19:RARELY}=2$$

$$v_{4:FREQUENTLY}v_{9:FREQUENTLY}v_{19:FREQUENTLY}=0$$

For COUNT tables, all information is summarised in these equations, with the additional constraint that all variables must be either 0 or 1. Solving these equations, so recovering the values of all variables $v_{1:x}$, $v_{1:y}$, $v_{1:z}$, $v_{2:x}$, $v_{2:y}$ ..., $v_{n:z}$ is a well-known computer science problem known as zero-one integer linear programming (Crowder, Harlan, Ellis L. Johnson, and Manfred Padberg. "Solving large-scale zero-one linear programming problems." *Operations Research* 31.5 (1983): 803-834) and an appropriate solver can be used to find the vulnerable variables in the dataset based on the set of linear equations.

Other COUNT attacks that use this equation structure are also discussed below.

1.4.3 Encoding Tables Where Sensitive Value is Part of the GROUPBY

Consider the case where one of the variables according to which the groupby is made as well as the variable being counted or summed are both private. For instance, in the example above, if both age and drug-use were private values that must be protected. Then, age would not be known, and we could not write the equations above.

We resolve this issue by flattening the private variables into one single private variable, this so as to return to the more standard case where only one variable is secret. The flattening method we use consists in one-hot encoding every possible combination of secrets: say the first secret takes values a or b, and the second secret takes value x or y, then the flattened private variable would take values (a, x), (a, y), (b, x), (b, y); in the example above if age was also private, then the private value would consists of the pair (age, drug use), and therefore could be (20-30, NEVER).

After flattening of the secrets, we return to the standard case of a categorical variable, which can be addressed as in the paragraph above. It is to be noted that in case one of the secret is a continuous variable, say a salary, flattening must be performed with care. Indeed, if the flattening is applied directly, then the obtained categorical variable could take a very large number of different values, to the point where each private value is observed only for one individual (no two persons in the database has the exact same salary down to the last digit.) Such a private column would not be protectable. Therefore we advocate reducing the precision of continuous variables, or binning continuous variables, before flattening them.

1.5 Eagle

Eagle is a program that processes a set of released statistics (e.g. contingency tables) and outputs a set of high-level conclusions or insights. These insights are findings that a human analyst might extract from the data, for instance, in the table above, that the company invests the most in paying male sales people. Insights can be encoded as sentences or as structured data (e.g. {"finding_type": "max_val", "values": {"gender": "female", "eyes": "brown"}}).

Testing whether the high-level conclusions or key insight of the original sensitive dataset are preserved enables to determine how the distortion of statistics has impacted their usefulness or utility. This is done from assessing whether the same high-level conclusions of the original sensitive dataset can be drawn from the perturbed statistics. Phrasing utility in terms of conclusions drawn gets closer to the realities of the business value of data products.

All the high-level conclusions are encoded into a program such that utility testing can be performed automatically. A representative general set of 'conclusions' can be run on any table.

Some types of high-level conclusions that Eagle finds are:
- maximum value
- correlated variable
- difference of group means
- temporal patterns Maximum value. Eagle iterates over each contingency table and looks for the maximal value in the contingency table. It has a threshold t (between 0 and 1) and only records the maximal value if the second highest value is less than t times the maximal value. For instance, if the cell with the highest value was cell X and had the value 10, and the cell with the second highest value had the value 8, and t was 0.9, Eagle would record the conclusion that the maximal cell was cell X. However, if t were 0.7, it would not record this finding.

Eagle may also calculate the maximum value in the contingency table when one of the variables is fixed. For instance, if the contingency table is counts of medical conditions by gender, it may note the maximum medical condition/gender pair, the most frequent medical condition for each gender, and the most frequent gender for each medical condition.

Correlated variables. If one of the factors by which the data is grouped is numerical, for example Age, Eagle tests whether there is a strong positive or negative correlation between this attribute and the private value. This test is only performed on SUM or AVG tables. Eagle calculates the Pearson's correlation coefficient which measures the linear dependency between two variables. A finding is only recorded if the correlation coefficient is above a certain threshold.

Difference of group means. For tables that contain the average private value for each group, Eagle evaluates whether there are any statistically significant differences between the group means. For a given table it performs a One- or Two-way Analysis of Variance (ANOVA) hypothesis test and calculates the p-value as a measure of statistical significance and the eta-squared as a measure of effect size. Two different insights can be recorded as a result of this test:

There is a clear difference between the mean private value of the groups, if p is smaller than a given alpha level and the effect size is larger than a given level. For example, Cohen "Statistical Power Analysis", Jacob Cohen, Current Directions in Psychological Science Vol 1, Issue 3, pp. 98-101, First Published Jun. 1, 1992 https://doi.org/10.1111/1467-8721.ep10768783 proposes 0.25 as a threshold for a medium or large effect size.

There is no clear difference between the mean private value of the groups, if these conditions (high statistical significance and large effect size) are not both met.

Temporal patterns. When provided with tables representing the same statistics across time periods, Eagle can detect temporal patterns in the data. These include, for a given statistic, whether there is a particular upwards or downwards trend, whether the distribution across multiple groups is constant over time, and whether there are any outliers in a given time series. For instance, one example finding is that total spending statistics increased yearly for 8 straight years. Another is that the ratio of spending between men and women stayed about the same for 10 straight years.

Eagle can extract any type of insights that can be formulated in the same structure as the examples given above. Additional insights can be derived from the results of other statistical tests, such as Chi-squared tests for independence, or statements about ranked lists.

Different users may have different conclusions that they care about. End-users are therefore allowed to specify their own bespoke conclusions that are pertinent to their use case.

Lastly, users may submit their own conclusions to be tested. These conclusions can be inputted in the form of submitting a piece of code (e.g. Python code), for instance. The system handles user-submitted conclusions like its built-in conclusions.

1.6 Canary

Canary is a system that automatically evaluates risks of privacy breaches from a data release. Canary processes a set of released statistics (e.g. contingency tables) and outputs information about the risk of individuals' private values being disclosed through a set of privacy attacks. A privacy attack is a function that take as input a set of aggregate statistics and outputs a guess of the private value for one, some, or all individuals in the dataset.

Canary contains a suite of attack algorithms. Some privacy attack algorithms return additional information about the attack. Example attacks and outputs may be:

Direct cell lookup: The most trivial attack. If there is a SUM table and there is a cell that reflects a singleton (group of size one), then returning the value of that cell directly is an accurate guess of that person's private value. On top of that, the attacker can learn this value with 100% confidence and the individual can be marked as 'vulnerable'. The term 'vulnerable' means able to be fully determined by the attack (note that this means in the case where the statistics are raw—not protected by noise addition).

Differencing attacks: If there are some SUM tables and there are two cells (in different tables) that reflect groups X and Y respectively, and the groups X and Y differ by only one person, then returning the value in Y minus the value in X is an accurate guess of that person's private value. There are more complicated forms of differencing attacks with more than two cells.

A large group of attack functions are kept together in a suite and stored in an attack library. The attacks are also standardised in order to make it easy to add one or more attacks to the suite at any point.

Attack functions are run to automatically guess sensitive data from aggregate statistics. By expressing statistics as a set of linear equations over the variable being aggregated, solvers can find valid solutions (i.e. values of the sensitive variables consistent with the statistics). The outputs of the attack functions are then used for the purpose of setting epsilon.

When there are combinations of statistics that leave a sensitive variable fully determined, the solver is able find the exact value of the sensitive variable. The guesses are compared with the real values and, a person is said to be vulnerable to an attack when there is a match. Constraints on the range of the sensitive variable can also be added right into the solver.

The following sections describe a number of different attacks.

1.6.1 Differencing Attack Scanner for Sums, Averages, Counts, and Medians

Differencing attacks are a common type of privacy attack on aggregate statistics. Differencing attacks are found by sorting the statistics by query set size and only checking for differencing attacks in statistics whose query set sizes differs by one. This is more efficient than naively checking every pair of statistics for a differencing attack. After we find a differencing attack, we can update the query sets to remove the vulnerable individual. This removal may reveal further differencing attacks on others.

The process of finding differencing attacks has been automated, as described below.

The differencing attack scanner searches a given statistical release to find groups which differ by a single individual. This allows the formation of a "difference of one" attack, whereby an individual's private value can be disclosed.

Difference of one attacks are best illustrated by example with SUM tables. If the linear equations (as described in section 1.3) associated with two separate cells are $$v1+v2+v3+v4=x$$

$$v1+v2+v3=y$$

then we can clearly deduce that $$v4=x-y$$

For raw statistical releases without application of any differential privacy mechanism such as addition of Laplace noise, this approach is recursive in the sense that now v4 has been found another two equations might now become solvable via subtraction of v4. Consider two more linear equations from the same statistical release $$v4+v5+v6+v7+v8+v9=a$$

$$v5+v6+v7+v8=b$$

Knowledge of v4 allows us to alter the first equation $$v5+v6+v7+v8+v9=a-v4$$

This in turn allows us to construct another difference of one attack $$v9=a-b-v4$$

The differencing attack scanner searches the system of equations associated with a given statistical release for linear equations that differ by a single individual. When operating on raw statistics, it then removes individuals and their values from the system of equations and re-scans for difference of one attacks. This approach is also applied to equations derived from AVERAGE contingency tables, as these equations can be re-expressed as sums (as outlined in section 1.4.1).

The difference of one scanner can also work on COUNT tables, as COUNT statistics are also represented as linear equations, where the right-hand side of the equation represents the count of individuals in a given categorisation. Expression of COUNT tables as a system of equations is outlined in more detail in section 1.4.2.

MEDIAN statistics are also vulnerable to difference of one attacks, although the information such attacks yield is limits on a private variable's value rather than the exact value itself. Instead of a linear equation, a given median equation can be considered simply as a set of variables. Consider the medians:

$$MEDIAN\{v1,v2,v3,v4\}=x$$

$$MEDIAN\{v1,v2,v3\}=y$$

In this case, if x>y we can state that the set difference v4>y. Similarly, if x<y we can state that v4<y.

Crucially, it should be noted that a difference of one attack on MEDIAN statistics is not recursive, in the sense described above, even with raw statistical releases. This is because, continuing with the above examples, v4 cannot now be removed from other sets (i.e. median statistics) in which it is present and another new set of differences of one cannot be found.

The difference of one scanner is implemented efficiently within Canary by ordering all given statistics by their Query Set Size (i.e. the number of variables that contribute to a given statistic), also referred to as QSS. For a given reference statistic the set difference is taken with all other statistics who have a QSS difference of 1 relative to this reference. If this set difference contains a single variable, then a difference of one has been found. The above rules for differences of one are applied depending on the type of statistics released.

For AVERAGE, SUM, and COUNT statistics operating on raw statistical releases the scanner removes all found variables from the system of equations and re-scan. This recursive process terminates once no new differences of one are found. For raw MEDIAN statistics, or any noisy statistics, the scanner terminates after the first scan through all statistics. The scanner then returns all the derived variables (for AVERAGE, SUM, and COUNT statistics) or the found limits on variables (for MEDIAN statistics). The scanner can also return the attack that derived each variable as a set difference, or as a chain of set differences.

This difference of one scanner can be used in a variety of ways, either as a speedy method of illustrating easily interpretable attacks on a statistical release, or as an initialization phase for an iterative attacking approach.

Risk measure output by the difference of one scanner algorithm.

The algorithm is:
1. Turn sum tables into system of equations
2. Scan for differences of one.
3. Remove differences of one if applicable, and re-scan.

This algorithm returns the set of variables susceptible to a difference of one attack, or chain of differences of one if applicable. It also returns the resulting estimated value $v_i$, or range for estimated value, for each variable found vulnerable.

1.6.2 Iterative Least Squares-Based Attack on Sum Tables

To find individuals at risk through more complex differencing attacks for a given set of sum tables, Canary needs to solve a system of linear equations.

Finding individuals at risk of their secret being disclosed through the summary statistics published, amounts to finding all variables $v_i$ whose value is fully determined by the set of equations (called 'vulnerables'). Fully determined variables are equivalent to private attributes which can be attacked by looking at the SUM tables alone; the information in the aggregate statistics is sufficient to fully determine the private attributes expressed by these variables.

The Canary least-squares SUM attack algorithm searches for the least-squares solution of the linear system $$\hat{v} = min_v \|A \cdot v - d\|^2$$

with an iterative linear solver and returns this best guess solution for all variables in the dataset.

Iterative solvers do not solve the system directly but start with a first approximation to the solution and compute iteratively a sequence of (hopefully increasingly better) approximations. Several parameters define the condition under which the iteration terminates and how close the obtained solution is to the true solution. Often, the system of equations gathered from all sum tables is underdetermined because the number of statistics is likely to be smaller than the number of variable in the dataset. If this type of linear solver is given an underdetermined system, it outputs one solution to the equations, which is the solution which minimises the L2-norm of the distance $A \cdot v - d$.

Using this type of solver, it is possible to find the variables in the dataset whose value is fully constrained in the following way:
1. Use the solver to generate a solution to the system of equations.
2. Iterate through the variables, and compare the solution's value with the real value (looked up from the raw data).
3. If the solution's value is the same as the real value, we say that this value is fully determined by the system of equations. Note that we might not want to use strict equality—because the solver is not always exact, we might want to consider values as the same if their difference is less than a threshold (e.g. 0.000001).

It's worth noting that this method can return false positives. If a variable is not fully determined by the system, there is a chance that the solver arbitrarily selected a value that happened to coincide with its real value. For this reason, Canary has methods to handle false positives, discussed below.

Alternatively, Canary can run this attack while skipping the step of identifying which variables are fully constrained. Instead, it can simply offer a guess for every variable. If used in this way, Lens can add in range constraints to the solver. For instance, if the sensitive variable has a range of 0 to 10, Lens puts $0 \le v\_i \le 10$ for all v_i into the solver.

An alternative using the orthogonality equation. If there are many statistics published about the same dataset (m>n), Canary needs to solve an overdetermined system to attack the statistics. In these cases, the least-squares solution can be computed by solving the orthogonality equation $$(A^T \cdot A) \cdot v = A^T \cdot d.$$

In this approach, the system is transformed into a symmetric system of dimensionality m×m which can then be solved using fast numerical solvers. This approach can be only used in cases where ($A^T \cdot A$) is a non-singular matrix and invertible, which is a consequence of m being suitably large relative to n.

Risk measure output by the iterative least-squares attack algorithm.

The attack algorithm is:
1. Turn sum tables into system of equations
2. Solve system of equations, either by running iterative solver or solving orthogonality equation, getting a potential solution for each private attribute.

This algorithm returns the guess $v_i$ for all variables found vulnerable.

1.6.3 Pseudoinverse-Based Attack on Sum Tables

Another Canary attack algorithm also finds the least-squares solution to the observed system, but the attack works in a different way. It uses the pseudo-inverse of the system of equations matrix A.

The pseudo-inverse attack uses linear algebra to calculate the combination of statistics (i.e. a formula) that leads to the most accurate guess of a person's sensitive value (even when the statistics have noise added). This allows not only to find all individuals who are vulnerable to differencing attacks, but to also determine specific differencing attacks, which can be displayed as examples of privacy attacks.

Solving by computing the pseudo-inverse. One way to find the least-squares solution $\hat{v}$ that minimises the error norm, is to compute the Moore-Penrose pseudo-inverse of the matrix A, often denoted as $A^+$. This approach works for both under- and overdetermined systems.

$A^{\pm}$ can be approximated through the singular value decomposition (SVD) of a matrix $A = USV^T$ as $A^+ = VS^{-1}U^T$. After $A^+$ has been computed the vulnerable variables can be identified as the diagonal entries of the matrix $B = A^+ \cdot A$ which are 1, or close to 1 within some numerical error tolerance.

The matrix $A^+$ provides a description of the privacy attack on the set of statistics d. Each row in $A^+$ describes the linear combination of the rows of A (i.e., the released sums) that recovers one variable's private value.

Using this type of solver, it is possible to find the variables in the dataset whose value is fully constrained in the following way:
1. Compute an approximation of the pseudo-inverse of the matrix A.
2. Compute the matrix product $B = A^+ \cdot A$ and find the diagonal entries in B that are 1. These are the indices of the variables that are uniquely determined by the system of equations.

The concrete privacy attacks on the vulnerable variables are encoded in the pseudo-inverse and this method thus provides a way to not only detect individuals at risk but to recover the attacks themselves—the formulas that compute the sensitive value from the published statistics. Furthermore, the attack function can directly be applied to any new statistical release that is based on the same query, i.e. any m-dimensional results vector d without any further computational effort.

Because the pseudo-inverse is approximated through its SVD, numerical inaccuracies can lead to some of the diagonal entries of V being close to 1 even though the corresponding variable is not fully determined by the set of equations. Thus, the results can be optionally double checked to ensure there are no false positives.

Risk measure output by the pseudo-inverse attack algorithm. The attack algorithm is:
1. Turn sum tables in a system of equations.
2. Multiply the attack matrix $A^+$ by the vector of statistics d described by the set of contingency tables to get a potential solution for all variables.

This algorithm returns the guess $v_i$ for all variables found vulnerable, and the list of vulnerable variables.

1.6.3.1 Using the SVD the Reduce Computational Complexity of the Pseudo-Inverse Attack If the matrix A under consideration is very large, it may be impossible to compute its pseudoinverse $A^+$ in a reasonable amount of time. It is therefore important to try and reduce the computational burden of the operation. We do so by computing the SVD of A. Specifically, we first compute the SVD of A—which is a simpler and faster operation that computing the pseudoinverse—and second, we use the SVD to only compute the rows of $A^+$ able to perform an attack. We now describe each of the steps in turn:
1. We compute the SVD of A; i.e., U,S and V such that $A=USV^T$.
2. We observe that rowssum (V*V) (where * denotes the matrix entry-wise product) recovers the diagonal of B, and allows us to immediately locate the vulnerable variables. Let Z be the vector of indices of vulnerable variables.
3. Recall that the attacks are the rows of $A^+$ with index in Z. Therefore, we need only compute these rows. With V [Z] the rows of V labelled in Z we have that $A^+[Z]=V[Z]S^{-1}U^T$. This significantly reduces the number of computations needed.
4. Then, the outputs of the approach are the same as for the pseudo-inverse attacks presented previously, and therefore can be used in the same fashion.

1.6.3.2 Using the GROUPBY Structure for Efficient SVD Computation

The unique structure of the linear system of equation under study can be used to enable parallel computation on very large databases. Computation of an attack may also be improved from using the underlying query structure. The underlying structure of the query is used to break down the large system into sub-systems that can be solved separately and then merged.

In case of massive datasets and releases, no standard library can perform SVD. In that case we make use of the GROUPBY structure of A. Specifically, all the rows of A corresponding to a given GROUPBY are orthogonal (their inner products are zero), so that the SVD of that block of A is very simple to perform.

Therefore, we first perform the SVD for each GROUPBY, and then merge the SVD sequentially. To merge the SVDs, we proceed in two steps. First we produce the QR decomposition of the stacked right singular vectors. This yields us, at very little computational cost since QR does not require any optimisation, an orthogonal matrix Q, a right triangular matrix R and the rank r of the system. Then, by keeping the rfirst singular values and vectors of R we can reconstruct the SVD of the stacked singular vectors, and ultimately the SVD of A.

The stacking may be done in parallel (by merging the GROUPBY-s 2 by 2, and then merging again until completion), recursively (by adding the GROUPBY-s one by one to an increasing stack) or in bulk (merging all of them at once). The most efficient strategy depends on the capacity of the system: the bulk method is optimal but requires a lot of memory, the parallel method requires parallel sessions to be most useful, but it has high communication overhead. The recursive method is suboptimal but only requires one session which limits the memory consumption.

1.6.3.3 Using the QR Decomposition to Reduce Computational Complexity of the Pseudo-Inverse Attack All the previously presented scheme impersonate the attacker and only use the knowledge available to the attacker. However, to make the attacking system more efficient, we can use our knowledge of the secret V to reduce computational cost.

Doing so would proceed as follows:
1. Get the QR decomposition of the equation matrix.
2. Use backward substitution, through the triangular component of the QR decomposition, to get v',the least square solution of the equation Av=d.
3. Match v' with true vector of secret values. The entries that match are deemed vulnerable. This is the step a real attacker could not perform.
4. For each vulnerable row i, use backward substitution as in step 2, to solve the equation $aA=e_i$, where $e_i$ is the vector equal to 0 everywhere but at index i where it is equal to 1. Call $a_i$ the obtained solution. Then $a_i$ is the attack vector, the i-th row of $A^+$.

Note that this approach may also be parallelized as in section 1.6.3.2.

1.6.3.4 Using the Solvers to Produce Optimal Pseudo-Inverse Attack

Given a data product, and the existence of a differencing attack, a guess of a secret can be produced. As noise addition is used, this guess is also random. In this section is described a method to find the differencing attack able to produce a guess with as little variability as possible.

The method described below finds the most accurate— minimum variance—differencing attack, and looks for the optimal attack to a data product, rather than just attacking a data product. The method makes use of the different level of variability present in each released noisy statistics in an optimal way.

Through the attack vector $a_i$ we obtain a guess, $a_i \cdot d$. As d is random, $a_i \cdot d$ is random as well. The accuracy of the attack may be measured by the variance of $a_i \cdot d$, var($a_i \cdot d$). Now, for any z such that $z \cdot A=0$, we have that $(a_i+z) \cdot A=e_i$, so that $a_i+z$ is another attack vector. To make the attack as accurate as possible, we are looking for z such that $z \cdot A=0$ and var$((a_i+z) \cdot d)$ is as small as possible. Relying on a linear solver, the approach then unfolds as follows (we use the same notation as in the previous section):
1. Find a vulnerable row fusing any method in 1.6.3.
2. Minimize var(a·d) under the constraint that $a \cdot A=e_i$ using a linear problem solver.
3. Return the Optimal Attack $a_i$.

1.6.3.5 Using Rank Revealing QR Decomposition to Produce Optimal Pseudo-Inverse Attack Finding the minimum variance attack is a very computationally intensive task, impossible to scale to large data product, and too time consuming to be used easily for the purpose of privacy risk assessment when building a data product. A faster, scalable, solution is needed for reasonable usability.

The method described in this section manages to overcome the technical hurdle though a revealing QR factorization technique which makes solving any systems much faster, and more scalable.

There is incentive to make finding the optimal attacks as efficient as possible, especially as we will need to repeat the procedure multiple times: for each vulnerable rows i, but for each putative noise addition mechanisms to find how noise should be added to d so that the resulting minimum variance attack is not too accurate.

It is possible to improve efficiency by relying on a rank revealing QR decomposition of the equation matrix. Rank revealing QR decomposition (or factorization) is a standard procedure available in most available linear algebra software. Such a decomposition will reorganise the columns of the R component of the QR such that all z such that $zR=0$ have their first entries being 0 (with r the rank of the equation matrix, the r first entry of z need to be 0). This reduces computations a lot by making it easy to satisfy the constraint $z \cdot A=0$. Then, the process is as follows:
4. Produce rank revealing QR of the equation matrix A.
5. Find a vulnerable row i using QR as described above in 1.6.3.3.
6. Produce base attack a using QR as described above in 1.6.3.3. 7. Call V the variance-covariance matrix of d. Then our problem may be restated as finding z that minimizes $f(z)=(a+z)V(a+z)^T$. This is achieved by solving for the first derivative of $f(z)$ being 0, which consists in solving a linear system, and therefore can be achieved using the QR decomposition as described above in 1.6.3.3.

1.6.4 Symbolic Solver Attack on SUM Tables

One of Canary's privacy attackers uses a symbolic system-of-equations solver approach. A symbolic solver takes a system of linear equations and produces expressions for each variable. Hence the symbolic server is able to tell when a variable is fully determined and what its value is. For instance, it may say that v2 equals: "99−v5−v7". Canary processes these expressions to identify linearly related groups of variables (variables whose expressions depend on the values of other variables in the group), and fully determined variables (variables marked as vulnerable through a differencing attack). The symbolic solver also deliver groups of interrelated variables, and the equations that relate them (e.g. v1=100−v2).

This approach to solving systems of equations, referred to as Gauss-Jordan elimination in the scientific literature, does not scale well to large systems of equations.

Canary's symbolic solver attack can do an additional step to locate variables that are not determined exactly, but are determined to be in a small enough interval that they still constitute a privacy risk. For example, if someone can determine from the released statistics that your salary is between 62,000 and 62,500 that will likely feel like as much of a privacy breach as if they learned your salary exactly. To detect these variables, Canary uses a Monte Carlo approach in order to explore the possibilities that each variable can take. As the step function of the Monte Carlo process, one variable is modified and the equations are used to calculate how it impacts the other variables. At the end of the Monte Carlo process information about the distribution of each individual variable is available. Variables that only fall in a very narrow range may constitute a privacy risk.

Within each related groups of variables (discussed above), Canary executes the following Monte Carlo process:
1. Initialization step: Assign the variables to their real value
2. Select one variable and increase or decrease it (the rule for doing this can be customised; e.g. it can be to add a random choice of {+5, −5} or a random selection from the interval [−10, 10], or from the interval [−x, x] where x is a fixed percentage of the value or the variable range)
3. Use the symbolic equations to adjust another variable in the related group in the opposite direction (thus preserving the linear relationship)
4. Test whether any constraints have been violated. A constraint might be that the private variable must be greater than 0 and less than 1,000,000. If a constraint has been violated, reverse back to step 2 and try again. If no constraint has been violated, execute the change and repeat from step 2.

This process (steps 2-4) can be continued, creating a sequence of states. These states can be sampled to approximate a distribution of all the variables. The variables whose distributions are bounded in a small interval are then considered vulnerable.

Risk measure output by the symbolic solver attack algorithm.

The attack algorithm is:
1. Turn sum tables into system of symbolic equations.
2. Solve system by Gauss Jordan elimination.
3. (Optional) Check for variables which are determined within a small interval.

For each variable found vulnerable, the algorithm returns the estimated value (or value interval if from step 3), and the combination of statistics that determines it. The algorithm can optionally also return variables which are determined within a small interval, and what the interval is.

1.6.5 Attacks on COUNT Tables as a Constrained Optimisation Problem

Because count tables can also be expressed as linear equations, solvers may be used to attack them.

In the case of COUNTs, a private variable's value is one out of several, possible categories. For example, the sensitive attribute may be whether an individual takes a certain drug or not the private value is one out of {Never, Rarely, Frequently} and an attacker is trying to learn which of these categories the variable is.

Canary's COUNT attacks, as its SUM attack algorithms, summarise all information from COUNT tables in a linear system of equations (see section 1.4.2) but then, different from the SUM attacks, constrain the solution space, in which they search for a variable's value, to {0,1}. To see this, let us denote by v the matrix of private values. In our example, we have that for all i, $v_i$, the i-th row of v, takes the form $[v_{i:NEVER}, v_{i:RARELY}, v_{i:FREQUENTLY}]$. Then, with $v_{NEVER}$, $v_{RARELY}$, $v_{FREQUENTLY}$ the columns of v, the queries:

COUNT(*)GROUPBY($v_{NEVER}$ & Age), and

SUM($v_{NEVER}$)GROUPBY(Age), are the same. Therefore, with A the equation matrix associated with the latter query, and d the count contingency table to be released, we have:

$Av=d.$

Therefore, attacking counts can be thought of solving the following constrained system:

$$\arg\min_{v \in \{0,1\}^{\eta \times c}\ s.t.\ v \cdot 1 = 1} \|Av - d\|,$$

where c is the number of possible category (e.g., c=3 in our drug use example.)

The Canary COUNT attackers use a range of techniques that obtain a solution to variants of this problem in a reasonable time. Some of the attacks recover only the private values of variables which are fully determined, others try to guess as many values correctly as possible.

1.6.5.1 A Remark on the Norms Used

Note that we do not specify the norm used in the equations above, and we use a range of possible norms; i.e., the $\|\cdot\|$ represents any norm or pseudo-norm, but especially the $L_p$ norms, for p=0, 1 and 2. In the setting of noise addition, it is important to remark that if the noise added is either Laplace or Gaussian, then using the $L_1$ and $L_2$ norm respectively corresponds to using properly specified Maximum-Likelihood, thereby making the proposed optimization schemes below approximations of the Cramer-Rao efficiency lower bound (no unbiased estimator can be more accurate.)

1.6.6 Discrete-Solver-Based Attack on COUNT Tables

The first and simplest approach to attacking COUNT tables, is to solve the problem directly with an appropriate integer linear programming solver. Several algorithm libraries offer this possibility.

Risk measure returned by the discrete-solver attack method.

The attack algorithm is:
1. Encode set of COUNT tables as a system of equations.
2. Run through discrete solver.

The attack algorithm returns a guess for each variable that
1. Is of the proper form; i.e., a vector such that each entry is in {0,1} and the entries of which sum to 1.
2. Is such that $\|A \cdot v - d\|$ is small.

Although generic, and very powerful for small systems, the drawbacks of such an attack are that it does not scale to large problems, and that we cannot know which of these guesses are accurate. Alternative Canary COUNT attackers address both of these issues.

1.6.7 Pseudoinverse-Based Attack on COUNT Tables

Another Canary attack on COUNT tables proceeds the same way as the pseudo-inverse based Canary SUM attack. This attack algorithms ignores the constraint that a variable's private value can only be in {0,1}.

Risk Measure Returned by this COUNT Pseudoinverse Attack Algorithm.

The attack algorithm is:
1. Encode set of COUNT tables as a system of equations.
2. Multiply the attack matrix $A^+$ by the vector of statistics d described by the set of contingency tables to get a potential solution for all variables.
3. Most of these potential solutions will not be in {0,1}, or even remotely close, however, by construction of A+, the vulnerable variables will be (or very close, up to matrix inversion precision).
4. For all variables found vulnerable (as determined by an identical method to that presented above for SUM table pseudoinverse attacks), round guesses to closest value in {0,1}.

The algorithm returns a list of all variables found vulnerable, and a guess of the private value for each of these vulnerable variables.

1.6.8 Saturated-Rows Attack on Count Tables

The following two observations are made. First, an attacker knows how many secret values are summed in order to compute a statistic. Second, the attacker knows the maximum and minimum values the secret may take. With these two information, an attacker is able to deduce the maximum and minimum value a statistic may take. If the published statistic is close to the maximum value, then, it is likely that each secret values used to compute the statistic are close the maximum value as well, or conversely for the minimum value.

The discrete solver attack outputs correct guesses for a large proportion of the dataset. It largely relies on the fact that private values can only be 0 or 1 to make good guesses. Its major drawbacks are that it can not handle large systems or give a measure of confidence in the guess for a variable's value that it returns. In contrast, the pseudoinverse-based approach outputs only guesses for fully determined variables known to be vulnerable.

The pseudoinverse-based approach ignores the constraints on the possible private values a variable can take and thus risks to miss vulnerabilities. These constraints reduce the number of possible solutions, and therefore allow for an attacker to make much more accurate guesses.

Another Canary COUNT attack algorithm, the saturated rows attack algorithm, thus aims to combine the power of the discrete attacker, making use of the solution space constraints, with the ability of the pseudo-inverse based attack to handle larger systems. The saturated rows attack algorithm proceeds in the following way: First, it locates saturated cells:

We say a cell is positively saturated if the count it contains is equal to the query set size; i.e., if the sum of the entries of the equation matrix is equal to the released count. Then, it must be that all the private values in that query are equal to 1.

We say a cell is negatively saturated if the count it contains is equal to 0 and the query set size is not equal to 0. Then, all the variables considered in that query must have a private value of 0.

The algorithm then removes all variables whose private values could be determined with the saturation method from the observed system and applies the pseudo-inverse attack to the remaining system to recover unknown variables.

Risk measure returned by the saturated rows COUNT attack algorithm.

The attack algorithm is:
1. Encode set of COUNT tables as a system of equations.
2. Parse the cells and detect the positively and negatively saturated cells.
3. If saturated entries were found, possibly apply pseudoinverse-attack as follows:
   a. Subtract from d the contribution of the deduced private values through the saturated cells.
   b. Remove from A the rows and columns corresponding to the cells and private values that were found to be saturated, yielding A'.
   c. Look for vulnerable variables using the pseudoinverse of A'.
   d. If new vulnerables are found, return to step 1., otherwise terminate.

The algorithm returns a list of all variables found vulnerable via saturated cells, along with guesses for their private values. The algorithm also returns a list of vulnerable variables and corresponding private value guesses generated by the pseudoinverse portion of the attack.

1.6.9 Consistency-Check Based Attack for COUNT Tables

Another COUNT attack algorithm further refines the quality of guesses for variables' private values by determining impossible solutions. To do so, it fixes one of the private values which is equivalent to adding an extra constraint to the system. Instead of solving the original system, for a given variable i and putative private value s for variable i, it then tests whether there exist v such that: $A \cdot v = d$, $v \in \{0,1\}^{n \times c}$, $v \cdot 1 = 1$ and $v_i = s$. That is, the solver must test whether the system is still consistent when fixing a given private value to a specific solution.

Checking whether such a solution exists is a functionality offered by most convex optimisation software, and is much faster than actually solving the system, so that it may be implemented iteratively to span the whole set of possible solutions for reasonably-sized systems.

The key advantage of this attack method is that in cases where d is truthful (i.e. accurate statistics are released, and no noise was added) then it produces only accurate guesses. Also, note that to make this test faster, it is possible (as we describe in the following paragraph) to relax the condition from $v \in \{0,1\}^{n \times c}$ to $v \in [0,1]^{n \times c}$. That is, instead of constraining the system to solution with values equal to 0 or 1, we instead constrain the system with any real values greater than 0 and smaller than 1.

Risk measure returned by the consistency-check attack algorithm.

The attack algorithm is:
1. Perform "Saturated-rows attack on count tables."
2. For each variable i and putative solution s, test whether such a solution is possible. If only one solution s is possible for any variable i, we have deduced that the private value of variable i must be s, and therefore we have to update the system accordingly:
   a. Subtract from d the contribution of the deduced private values.
   b. Remove from A the rows and columns corresponding to the cells and private values saturated respectively, yielding A'.
   c. Return to step 1. With A' replacing A.
3. If no solution can be determined for any variable, terminate.

The algorithm returns a list of all vulnerable variables which can be guessed accurately and their corresponding private values.

1.6.10 Linearly-Constrained-Solver Based Attack on COUNT Tables

Another possibility is to soften the constraints imposed upon the problem from $v \in \{0,1\}^{n \times c}$ to $v \in [0,1]^{n \times c}$; i.e., instead of constraining the system to solution with values equal to 0 or 1, we instead constrain the system with any real values greater than 0 and smaller than 1. Each guess produced is then rounded to the nearest integer.

The key computational advantage in doing so is that then the system falls into the class of convex optimisation. Most scientific computing software offers very efficient solvers for such problems. However, so as to address very large systems, we present the constraint relaxation in two forms, that respectively solves for all the columns of v at the same time, or in sequence.

Risk measure returned by the linearly-constrained solver attack algorithm. The attack algorithm is:
1. Encode set of COUNT tables as a system of equations.
2. If the system is small, solve the full system; minimise $\|A \cdot v - d\|$ under the constraint that $v \in [0,1]^{n \times c}$, $v \cdot 1 = 1$.
3. If the system is too large to be handled by the first case, solve for each column separately; i.e., denoting by a subscript the columns, independently for each $j=1, 2, \ldots, c$ minimise $\|A \cdot v_j d_j\|$ under the constraint that $v_j \in [0,1]^n$.
4. In both cases we obtain an estimate $\tilde{v} \in [0,1]^{n \times c}$. We hard threshold that estimator to obtain $\hat{v}$; i.e., for each variable i and column j, $\hat{v}_{ij} = 1$ if $\tilde{v}_{ij} = \max_j \{\tilde{v}_{ij}\}$, and 0 otherwise.

The algorithm returns a guess for the private values of each variable.

1.6.11 Measuring the Accuracy of the COUNT Attacker's Guess

The system measures or estimates how accurate a COUNT attack is at guessing the correct value of an individual record.

The heuristic is that a stable guess, which is coherent with the release, is more likely to be true than otherwise. We first consider stability to adding or removing accessible information. Because the information is conveyed by the released statistics, how likely, and by how much, does a guess change is considered, if an attack is applied using only a subset of the released statistics. By performing this multiple times, using a different but random subset at each repetition, we see how stable the guess is. The uncertainty of an attacker is therefore taken into account.

Although very powerful, after noise addition, all the solver-based attacks listed above do not readily yield a metric on how accurate, or likely to be true, the proposed guesses are. Note that the solver based attacks do not include approaches using the pseudo-inverse, which contrastingly offer immediate measure of guess quality. We offer three solutions:
1. Locate which guesses are accurate by using the pseudoinverse as described above. This approach locates which variables can be inferred from the statistical release d with accuracy. This is a conservative view, as the fact that counts are discrete makes them much easier to guess, so that many more guesses are accurate than are listed as fully-determined from the pseudoinverse.
2. Measure how stable the guesses are to changing the available information. This is to say, measure the probability of the guess being different if only a fraction of the release d is observed.
3. Another way to measure stability is to quantify how changing the guess would impact the fit. Consider the gradient of the objective function; i.e., the first derivative of the objective function with respect to the unknown variable v (this gradient is different depending on the norm used for the optimization.) If the proposed solution is 1 and the gradient is negative, this solution is deemed as stable, as only by increasing the guess may we reduce the error. Conversely, if the guess is 0 and the gradient is positive, then the solution is deemed stable. The gradient is used to determine by how much the overall ability of the guess to replicate the observed release changes with perturbing a given entry of the guess. In addition, the gradient informs on the guess stability by estimating how worst it makes the overall fit to change the guess value.

1.6.12 False Positive Checking

Detecting false positive allows avoiding the overestimation of the level of privacy risk and flags some potential attacks that would actually lead to false guesses.

Some attacks, such as the SUM iterative least-squares attacks, risk false positives—i.e. they can say variables are vulnerable when they are not. There is a double-checking process included in the system in response to this risk.

In order to check whether a proposed privacy attack is able to accurately recover a secret, an additional equation is simulated and inconsistency checks are performed. The inconsistency checks can also be carried out for large systems.

To verify that an attack exists, one of the following methods can be used:
1. Add a new equation to the system of equations that constrains a supposedly vulnerable variable to a value different to the solution returned for that row in step two. For instance, if the solution said that v17=88, add a new equation to the system that is "v17=89". Augment of vector of statistics d accordingly.
2. Do one of the following:
   a. Use the iterative solver to solve the augmented system. The solver returns whether the system was deemed inconsistent or not. If the system is still consistent, we know that the value was in fact not vulnerable; it was a false positive.
   b. Calculate the rank of the left-hand side of the system (the matrix A) and the rank of the augmented matrix (A|d), which is a matrix of size m×(n+1) which is built by adding the vector of statistics d to the right-hand-side of A. If the rank of A is smaller than the rank of (A|d), by the Rouche-Capelli theorem, the variable in the last equation was not fully determined by the A.

If this row's value was fully constrained by the rest of the equations before, adding such a new linear constraint renders the system inconsistent because it contradicts the rest of the constraints. Thus, no solution to this new set of equations exists. If adding such a constraint does not render the system inconsistent it means that the row's value was not fully constrained by the rest of the equations and thus the attack on it was a false positive. If needed, Canary performs such a consistency check for each row that was deemed vulnerable in step two and can in this way verify which of them are truly at risk.

1.6.13 Multi-Objective Optimisation (MOO) Attacks

Another approach to adversarial testing within the Canary system is based on Multi Objective Optimisation (MOO) gradient descent methodology and is known as Canary-MOO. As described below, Canary-MOO constructs a set of estimated variables and iteratively updates these estimates based on error between released statistics and the same statistics calculated on these estimates. The error of each released statistic/estimated statistic pair is treated as an objective to be minimized (i.e. the aim is for error to be reduced within each pair).

The algorithm is based around iteratively updating an estimated set of private values in a manner which minimises errors between the released aggregate queries and the same queries performed on the estimated private values. Unlike for example Canary-PINV, Canary-MOO makes a "best guess" at the values of private variables which are not fully determined by the system of equations, and is able to process a broader range of aggregations types; both singly and in combination.

Canary-MOO initialises a vector of estimated private values v as a uniform distribution on the average of the true private values $\hat{v}$. It is assumed that this average value is either known to the adversary or that she can make an educated guess at it. General background knowledge can optionally be incorporated at this stage by adjusting the uniform initialisation to take into account known distributions of private values in relationship to quasi-identifiers. For example if $\hat{v}$ is a vector of salaries, and it is known that Managers earn more than average, whilst Janitors earn less than average, all $\hat{v}_i$ belonging to individuals who are Managers are increased by a small amount, and all those those belonging to Janitors are decreased by a small amount. Specific background knowledge can also be incorporated at the initialisation stage, by setting a specific $\hat{v}_i$ to a known value. General background knowledge about limits on the values of specific variables can be incorporated into the gradient descent process itself.

Additionally, $\hat{v}$ can be initialised with a small amount of random Gaussian noise, allowing multiple Canary-MOO runs from different initialisation states to provide a measure of confidence in the results as follows $$\hat{v}_i \hat{v}_i + G$$

where G denotes an iid random variable drawn from a Gaussian distribution with G denotes an iid random variable drawn from a Gaussian distribution with μ=0 and $$\sigma = \frac{\sum v}{100|v|}.$$

Other values than 100 could also be used.

Following initialisation, the MOO algorithm iteratively performs the following process:
1. Perform queries on the $\hat{v}$ data to get estimated aggregate statistics $\hat{d}$.
2. Calculate error between $\hat{d}$ and released aggregates d.
3. Update $\hat{v}$ on the basis of errors.
4. Normalise $\hat{v}$ such that the mean is equal to mean of original private values.
5. Threshold any $\hat{v}$ that falls below the minimum or above the maximum of the original private values.
6. (Optional) Threshold any specific $\hat{v}$ according to background knowledge on specific variable limits.

The algorithm can be configured to terminate once $\hat{v}$ no longer changes significantly, once all private variables have stably been determined to a set threshold percentage of their true values, or once a maximum number of iterations (e.g. a number that a reasonable adversary might use) has passed.

Figure 16:
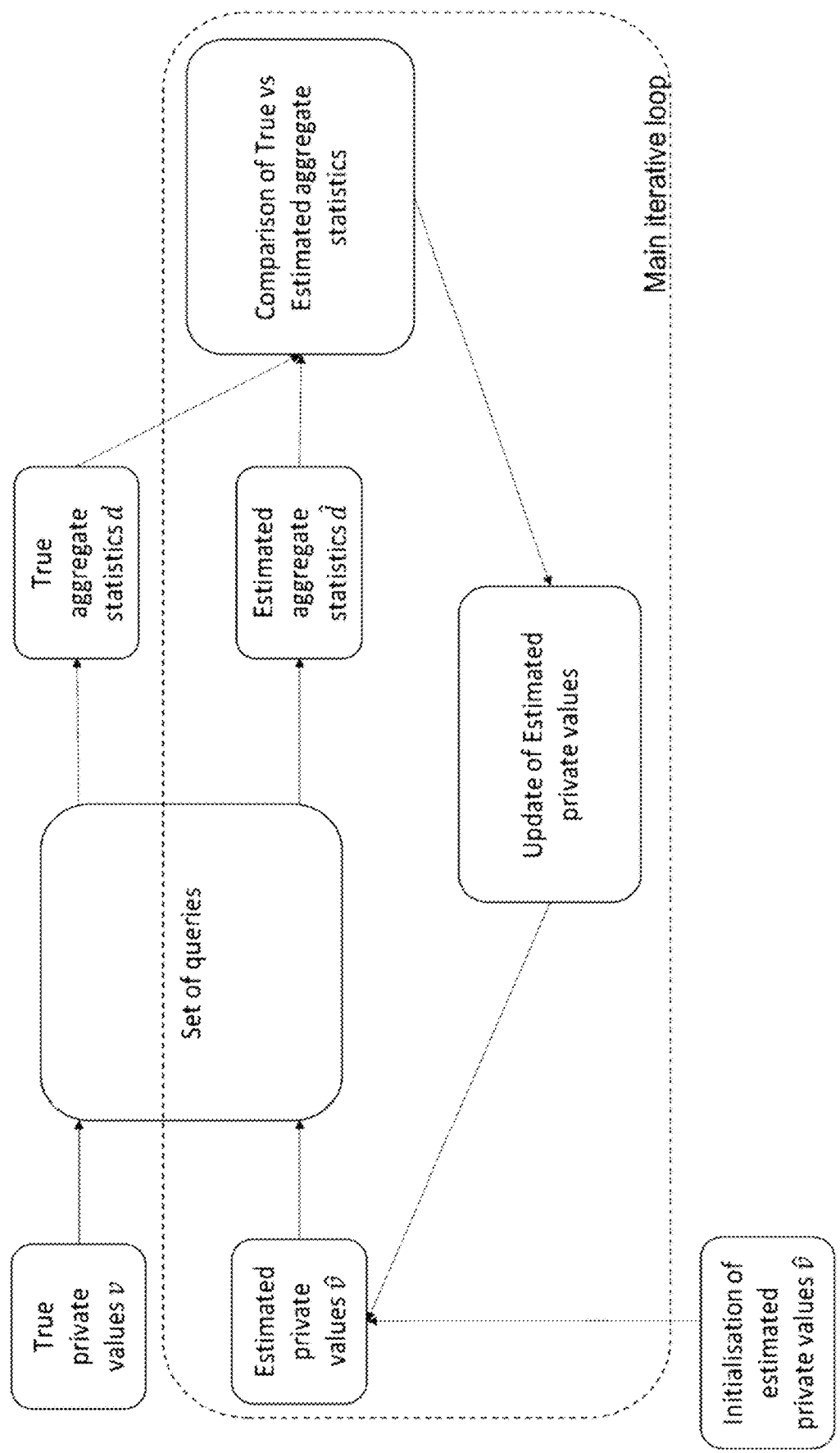
FIG. 16 shows a diagram of a risk measure algorithm.

Risk measure returned by Canary-MOO:

FIG. 16 shows a diagram of a risk measure algorithm. The algorithm, including all variants described below, returns a guess for the private value corresponding to every variable.

The specific implementation of multi-objective optimisation is highly customisable and flexible, with the possibility to incorporate gradient descents based on different types of statistics separately, more heuristic update rules, and initialisation strategies (e.g. initialising some values to outputs of other attacks as in 1.6.13.7).

1.6.13.1 Batch Updating with SUM Statistics

Batch updating multi-objective optimisation is used towards guessing sensitive variables from a set of released statistics.

The efficiency of multi-objective optimisation when processing SUM aggregate statistics is improved by making use of multiple error terms simultaneously to update estimates of variables. Instead of updating based only on a single objective (i.e. on the basis of one error for one released and estimated statistic pair), the error of any arbitrary number of pairs is considered at once. Errors are scaled relative to their target proportion to avoid one error for a large value dominating the batch update. For every variable, the scaled errors are averaged and used to update each variable at once.

Updating $\hat{v}$ on the basis of errors is implemented via batch update, where batch size B can be anything from 1 to m (where m is the number of aggregate statistics released). In the case where B=1, the algorithm selects the maximum error statistic, and updates on this basis. $\hat{v}$ update on the basis of errors is implemented via batch update, where batch size B can be anything from 1 to m (where m is the number of aggregate statistics released). In the case where B=1, the algorithm selects the maximum error statistic, and updates on this basis.

In the case where B<m, the algorithm selects the top B most erroneous statistics and updates on the basis of B errors. For reasons of computational efficiency in situations where batch size B<m the algorithm only considers those elements of $\hat{v}$ which participate in an aggregate statistic present in the batch. In the cases where B=m, no selection of statistics is made on the basis of error, and the update instead considers all statistics at once.

Crucial to batch updating is the concept that all errors must be scaled by their target statistic. This prevents errors which are numerically larger, but proportionally less severe, from dominating $\hat{v}$ update.

For SUM statistics, the batch update rule with B=m is implemented as B=m is implemented as $$\hat{v}_i = \hat{v}_i + \sum_j \left( \frac{\hat{d}_j - d_j}{\hat{d}_j} \right) A_i \Big/ \sum_j A_i$$

where j indexes the m aggregate statistics, i indexes n private variables, and $A_i$ indicates a vector slice of the equation matrix for private variable i. This update rule can intuitively be thought of as updating $\hat{v}_i$ by the average scaled error across all statistics. This is done by first scaling errors by their target statistics, then multiplying each of these scaled errors by 1 or 0 depending on whether $\hat{v}_i$ is present in that statistic as indicated by $A_i$. The summed scaled errors are divided by the total number of statistics in which $\hat{v}_i$ participates, $\Sigma_j A_i$, averaging the update. For smaller batches, the vector of statistic membership $A_j$ can be temporally modified for all statistics whose scaled error is not one of the top B largest in magnitude, setting their entries to 0.

1.6.13.2 Batch Updating for AVG Statistics

Canary-MOO is capable of recasting AVG statistics as SUM statistics, and including them in SUM statistic batch updates. This is done simply by converting AVG to SUM by multiplying the AVG statistic by its query set size:

$$SUM = AVG \sum_i A_{AVG} SUM = AVG \sum_i A_{AVG}$$

where $A_{AVG}$ is an n-dimensional vector of 1 s and 0 s indicating which elements of contribute to the AVG statistic. This vector can be appended to A, and the new SUM statistic can be appended to d. In this manner, AVGs are considered identically to SUMs. $A_{AVG}$ is an n-dimensional vector of 1 s and 0 s indicating which elements of contribute to the AVG statistic.

1.6.13.3 Batch Updating for MEDIAN Statistics

The efficiency of multi-objective optimisation when processing MEDIAN aggregate statistics is improved by making use of multiple error terms simultaneously to update estimates of variables. This is done by linearising updates from non-linear median statistics by considering only those variables contributing directly to the median. MEDIAN statistics only carry information about the central values in a set of variables. Thus, the same batch update rule as for SUM and AVG statistics is employed, but only the central values (the median for odd sets of variables, the two central values for even sets) are updated.

A number of specific update rules have been developed for median statistics, which represent a particular class of non-linear statistic. MEDIAN statistics pose a more complex problem than AVG and SUM statistics, because errors in the median value do not provide the same class of specific information: rather than conveying information about all members of a query set, MEDIAN errors simply convey where the partition should lie in order to split the query set in two. For this reason, the default option for MEDIAN statistics in is the same batch update rule as used for SUM statistics, with a minor modification: only the median value (for odd QSS query sets) or values either side of the median (for even QSS query sets) are updated. This can be implemented as an operation on the query matrix A, by temporarily setting all non-median entries to 0 for a given $A_j$, where $A_j$ represents the current median query. In this manner, only the median entry is updated, as it is temporarily the only variable contributing to the statistic. This matches the intuition that knowing the median is incorrect conveys limited information about those members of the query set not directly involved in determining the numerical value of the median itself.

1.6.13.4 Noisy Gradient Descent

The convergence of multi-objective optimisation is improved when processing noisy statistics by adding a cooling factor based on the noise distribution in a gradient descent process. A cooling factor proportional to the noise added to released statistics is incorporated into gradient descent, to help prevent noise from dominating the gradient descent process.

Given that Canary-MOO will often be used to estimate privacy risk with noisy data, the algorithm can modify iterative updates to be scaled by a factor of $$\frac{1}{\lambda},$$

where $\lambda$ is defined as $$\frac{GS}{\varepsilon}$$

where GS is the global sensitivity (this term is from the differential privacy literature) of the statistics. This 'cooling factor' allows gradient descent to take into account noisy statistics, converging on a stable solution that is not dominated by noise.

1.6.13.5 Specific Usage of Medians: The Median Snapper

Median statistics are a difficult statistic for an optimisation strategy to make use of, as they are non-linear functions of the variables. However, median statistics convey large amounts of information about the variables, which can be used in other ways. The median of odd numbers of variables corresponds to the value of one of the variables themselves. Thus, in situations where an estimate for the values of each variable in an odd group is given, the variable closest to the known median is "snapped" to the value of this median. This technique can be used during gradient descent to aid optimisation, or as a post-processing step. This snapper may be used for example in combination with any one of 1.6.13.1, 1.6.13.2, 1.6.13.3 or 1.6.13.6.

In cases where Canary-MOO is fed median statistics, a particular approach can be used for statistics in which the number of variables contributing to each statistic, known as query set size (QSS), is an odd number. For these statistics, the released true median directly corresponds to one of the values in the query set. Canary-MOO makes use of this by iterating over each odd-QSS median statistic, finding the $\hat{v}_i$ value corresponding to the $\hat{d}$ median, and "snapping" this $\hat{v}_i$ value to the released median. This process can be performed after iteration has terminated, or can be performed repeatedly at a regular interval as part of the iterative process.

1.6.13.6 Canary-MOO with Multiple Query Types—The "Grab Bag" Approach

Statistics of multiple aggregation types about the same sensitive values may be effectively attacked.

The flexibility of Canary-MOO allows updates to effectively be drawn from a variety of query types, provided an appropriate updated rule is provided. If necessary, the algorithm can provide the option of inputting custom update rules in addition to those already presented for SUM, AVG, and MEDIAN. Using the approach indicated above (Batch Updating for Average Statistics), non-SUM queries can be represented by a statistic $d_j$ and an n-dimensional vector $A_j$ which can be appended to the existing m-dimensional vector of statistics d and the equation matrix A respectively. Provided that each of the m columns of A is associated with a query type and corresponding update rule (either user-specified or hard coded), Canary-MOO can be presented with a set of aggregate statistics, and can generate an $\hat{d}$ which iteratively approaches the true private values by considering the most erroneous statistic(s) either individually or as part of a batch update, and using the provided update rules that correspond to the type of the statistic(s).

This allows information from multiple types of aggregated statistics to be used simultaneously, collectively improving the estimate of sensitive variables. Any combination of any type of statistics can be considered as long as, for each statistics, an update rule is provided.

1.6.13.7 Combinations of Attacks Using Canary-MOO

Combining different attackers may improve collective attack strength.

Some attacks only guess values for a subset of variables that can be derived with high certainty. Using the results of such attacks, such as from discovered variables from 1.6.1 or fully determined variables from 1.6.3, the optimisation of an attack's guess for variables, which remain unknown, can be improved. This is done by initialising the optimiser's starting state to include known variables from other attacks.

Canary-MOO can integrate with other parts of Canary. In particular, due to the flexible initialisation of $\hat{v}$, Canary-MOO can be initialised with the output estimated private variables from any other attack such as Canary-PINV (section 1.5.2), or a simple difference of one scanner (Quick Heuristics). Known variables can be removed from SUM and AVG equations to which they contribute, if this has not already been achieved by the difference of one scanner. If variables are only known to within some limits (e.g. from a difference of one attack using median statistics) these limits can be incorporated into the gradient descent process.

1.6.14 Modelling Background Information

Canary can also encode an adversary's background knowledge directly into the set of linear equations.

There are different types of auxiliary information the adversary might have, that Canary can encode:

Percentage of private attributes known: An adversary might have access to the private values of a subset of all individuals. This, for example, might be the case if data is gathered across departments and the attacker has access to the data for her own apartment but wants to learn private attributes of all people in other departments. For SUM tables, this type of background knowledge is encoded as additional linear equations in the system. The additional equations fix a variable's value to its true value, for example v1=18200.

Common knowledge about a group of people: An adversary might have specific knowledge about groups of people, either because she is part of the group or because of "common facts". For example, she might know that a Manager's monthly salary will always be in the 5k-10k range. For sum tables, this type of background knowledge is encoded as inequality constraints, for example 5000<v2<10000.

Rankings, min and max: An adversary might know a ranking of the private values such as which people earn more than others or she might know that the target's private value is the maximum or minimum of all values. This additional information makes it easier to extract an individual's value. This type of background knowledge is encoded as additional linear or inequality constraints, for example v10<v1<v7 or v1>vX for all X in the dataset 1.7 Abe Abe is a system that can be used to explore the privacy-utility trade-off of privacy-preserving techniques for aggregate statistics such as noise addition. It can be used to compare different techniques or different privacy parameter sets for a given data privacy mechanism.

Abe integrates with Eagle and Canary. For a particular privacy technique and parameterization of that technique, Abe tests whether all interesting insights that Eagle can extract from a set of statistics still hold true. At the same time, Abe tests whether all the individuals who were at risk in the raw release are protected. Thus, Abe simultaneously assesses privacy and utility.

As input, Abe takes a set of aggregate statistics or statistical queries, a privacy-preservation technique (for example, a noise addition function), and a list of different sets of privacy parameters for this privacy function (for example, a list of noise scale values).

For each privacy function and set of privacy parameters, Abe assesses how well aggregate statistics produced through the data privacy mechanism with a given parameter setting preserve data insights (utility test) and how likely the aggregates still expose individual's private data (attack test).

Alternatively, Abe can output a privacy parameter (e.g. epsilon in the case of differential private mechanisms) that satisfies some criterion: for instance, the highest epsilon such that all attacks are defended against.

The Findings Tester module in Abe tests whether all insights, such as "The largest number of people in group X have attribute Y", are also found true in the private statistics. As an example, if the privacy-preserving function that is tested is noise addition and in the raw statistics the SUM (salary) of all employees was highest in the sales department, Abe's Findings Tester module tests whether with a certain amount of noise added this still holds true when looking at the noisy SUMs.

Abe can also take a simpler approach to measuring utility, and simply calculate distortion statistics (e.g. root mean squared error, mean average error) for various settings of the privacy parameter.

Distortion metrics about the noise are also displayed to an end-user. Measures such as root mean squared error and mean average error are used to capture the amount that the data has been perturbed.

The Attack System module in Abe tests whether all privacy attacks have been defended against. This step uses Canary's privacy attacks. Abe tests how accurately the set of privacy attacks can recover individual's private data from the private statistics compared to the raw statistics. For example, if one of Canary's SUM attackers could learn an individual's salary with a 100% accuracy and confidence from a set of raw SUM tables, Abe, using Canary, tests how accurate the attacker's guess about this individual's secret are from the noisy SUM tables.

Lens measures both the privacy impact and utility impact of various epsilon settings and can be used to present a variety of detailed, real-world, understandable information about the consequences of various epsilon settings both on privacy and utility. The system captures and displays all this information automatically.

Epsilon may be set using a number of user configurable rules.

As an example, the system may be configured to determine the highest epsilon consistent with defeating all the attacks. Hence, if the set of multiple different attacks applied to the data product release constitute a representative set, there is enough protection for the sensitive dataset to be safe while maximising the utility of the data product release.

As another example, the system may also be configured to determine the substantially lowest epsilon such that utility of the data product release is preserved. Thus all findings in the data product release will be preserved while maximising the privacy of the sensitive.

1.7.1 Determining Whether an Attack has Succeeded

How Abe decides whether a privacy-preserving function successfully defended against the attack depends on the type of privacy attack. Abe relies on some definitions of attack success and what constitutes a data breach. For example, for continuous, private variables, such as salaries, the rule that defines a "correct guess" can be whether the guessed value is within a configurable range of the real value (e.g. within 10%). It can also be whether the difference between the real value and the guessed value is less than a certain amount, or whether the real value and the guessed value are within a certain proximity to each other in the cumulative distribution function (taken over the dataset). For categorical variables, it tests whether the right category was guessed.

The following sections describe in more detail Abe's Attack testing process for different types of privacy attacks on different aggregates.

1.7.1.1 When is an Attack Thwarted

Figure 17:
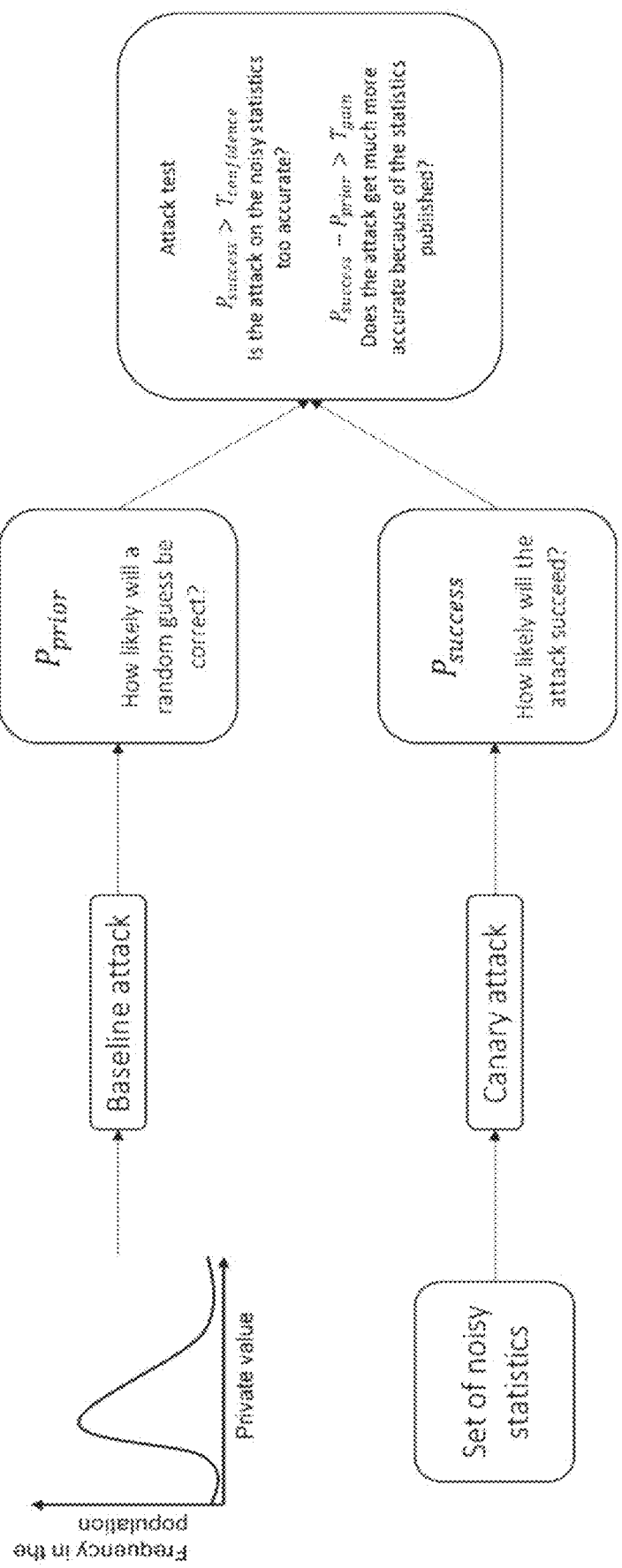
FIG. 17 shows a diagram illustrating the rules for testing an attack and determining if an attack is successful.

FIG. 17 shows a diagram illustrating the rules for testing an attack and determining if an attack is successful. Abe contains rules about when, for example at which level of noise, an attack is thwarted and when it is not.

There are two methods for finding the privacy-parameter threshold for thwarting an attack but both rely on the same definition of an attack success.

An attack may be said to be successful if the probability that the attack guesses a private value correctly from the noisy statistics is above an absolute threshold $T_{confidence}$, so if the attacker is very likely to make a good guess, and if there's a significantly higher chance that the attacker makes a good guess compared to a baseline prior to observing the statistics $$\text{success=True} \Longleftrightarrow P_{success} > T_{confidence} \ \& \ P_{success} - P_{prior} > T_{gain}$$

An alternative definition of attack success replaces the $P_{success} - P_{prior} > T_{gain}$ condition with $P_{success}/P_{prior} > T_{gainratio}$.

Variable-focused method. In this method, there is a list of variable that are targeted. This list may be outputted by the attack itself (see 1.6.3 for instance), or it may be simply a list of all variables.

In the variable-focused method, we test for each variable independently whether the attack is likely to lead to a privacy breach. The method takes into account both absolute confidence and change in confidence. A check is applied on each individual entity (i.e. each sensitive variable) and an attack is considered successful on that individual if the relative and absolute conditions are met.

To test for attack success, Abe's Attack module proceeds in the following way:
1. We conduct a baseline attack on the private variable. This is a configurable naïve method for guessing about the private variable (See section 1.7.1.2). The baseline attack gives a probability that the attack succeeds without the statistics being published and is called $P_{prior}$.
2. We measure the probability that the real attack on the private statistics outputs a guess close to the true value. This probability we call $P_{success}$.
3. We compare these measures to our thresholds
   a. $P_{success} - P_{prior} > T_{gain}$?
   b. $P_{success} > T_{confidence}$?

and if both of these conditions are fulfilled, we mark this variable as still vulnerable with this parameter setting.

As an example, let us say we sample from the distribution of the private variable in the dataset and this baseline attack guesses one individual's private value correctly $P_{prior} = 20\%$ of time. We then find that the Canary SUM-PINV attack on a noisy version of some SUM tables guesses correctly $P_{success} = 85\%$ of the time. We say that an attack constitutes a privacy breach if the attacker gets at least $T_{gain} = 20\%$ better at guessing the private value after we publish the statistics and it's only a risk if that then results in a correct guess in $T_{confidence} = 80\%$ of the time. So in this case we would find that the attack on the noisy statistics on the private value is a risk and the noise is not sufficient to thwart the attack.

Bulk method. In this method, we do not consider each row individually. Instead, we consider how many variables the attack got correct overall. All the vulnerable variables are therefore considered together and the method determines what proportion of the group of variables would be guessed correctly.

Again, we can use a baseline method, as above, and see what percentage of variable it gets correct $P_{prior}$.

We can then see what percentage of the variable the real attack gets correct (as a function of the privacy-parameter), call this $P_{success}$.

Now, we again compare the baseline and the attack percentages with a relative and an absolute threshold to decide whether the attack is successful. These thresholds may be set to the same or different values as the thresholds in the variable-focused method.

Take for example a situation where we want to test whether the noise from a DP mechanism is high enough to protect a release of COUNT tables. The COUNT tables are a breakdown of patient's drug usage by other demographic attributes which are publicly known and the private category, a person's drug usage, has three different categories {NEVER, RARELY, FREQUENTLY}. We might first set our baseline to $P_{prior}$=33% because if an attacker would need to guess a person's category without any further information than that these three categories exists, in one out of three times she would get it right. We then run Canary's discrete-solver COUNT attack on a noisy version of the COUNT tables we want to publish. The COUNT attack results in $P_{success}$=60% of variable guessed correctly. As for the row-based method we then compare these percentages with our relative and absolute threshold and decide whether the attack overall has been successful.

Note on the relative and absolute threshold. The relative $T_{gain}$ and absolute threshold $T_{confidence}$ are user-configurable system parameters. For both methods, note that it may sometimes be appropriate to set the absolute threshold $T_{confidence}$ to 0. Take, for instance, a case where the release will fall into the hands of a potentially malicious insurance company, who wants to learn people's secrets in order to adjust their premiums. In this case, any meaningful improvement in guessing compared to a baseline method seems to be a problem. Thus, in this case, it may be advisable to set the absolute threshold to 0 and use the relative threshold only.

1.7.1.2 Baseline Approaches for Guessing Private Values

For the relative thresholds, a baseline to compare to is needed. This baseline represents how confident an attacker is at guessing the person's value if that person's data were not included in the dataset.

A baseline guess component is built and several baseline guessing strategies may be implemented, such as sampling randomly from the distribution, or just guessing the most likely value every time.

The baseline $P_{prior}$ measures how confidently the attacker could determine an individual private value without the statistics published. There are different ways in which this prior guess can be defined.

One way is to uniformly sample an individual's private value from the original dataset i times and measure how often out of the i samples the guess would have been correct.

Alternatively, one can formalise a Bayesian prior over the private attribute based on general background knowledge. For example, the distribution of salaries in different European countries can be inferred from official statistics (Eurostat Income distribution statistics:http://ec.europa.eu/eurostat/web/income-and-living-conditions/data/database) and an attacker trying to guess a person's salary in the absence of any specific information about this person is likely to use this external information to make a reasonable guess.

One can also provide Abe with a hard-coded list of prior confidence values for each entity in the dataset or with a list of prior guesses. This list can be based on an attacker's profile. For example, an employee working in the Human Resources department of a company trying to learn everybody else's salary from the aggregate statistics, might have high confidence about their direct colleague's income but less confidence about the rest of the company. This functionality can be useful in cases where one wants to protect against very specific risks or publish statistics for a constrained user group only.

1.7.1.3 Sampling-Based Method for Determining Probability of Attack Success

Abe uses Canary's set of attacks to test whether a parameter setting of a data privacy mechanism sufficiently reduces the risk of a breach or not. The different attacks come with different methods to test for attack success. For all privacy attacks, there is a general mechanism to test for attack success. This method samples the statistics several times independently and evaluates how often the attack out of the total number of trials was successful. The percentage of the time that the attack guesses correctly determines the confidence in the attack.

For example, to test whether the noise added by a Differentially Private release mechanism with a certain E was sufficient to defend against a symbolic solver attack on SUM tables, Abe samples i different noisy releases with this ε, attack these i different versions of the noisy tables and for each of them test whether the guess for a row was correct (as defined above in 1.7.1). Dividing correct guesses by total guesses then results in the attack's estimated success rate $P_{success}$ on each vulnerable row for the ε-value tested.

1.7.1.4 Computing the Relationship Between Noise and Attack Success

By modeling the attack as a linear combination of random variables, the probability of an attack to be successful can be calculated (where successful is defined for continuous variables as within a certain range around the real value). In comparison, determining attack success by regenerating noise and attacking repeatedly is not as fast or accurate.

Abe's attack testing module can be used to test the effectiveness of noise addition on stopping attacks. However, for certain Canary attacks, there are alternative ways to assess attack success. These are explained in the following sections.

To identify privacy risks in SUM or AVG tables, Canary summarises all information available to the attacker in a system of linear equations $$A \cdot \vec{v} = d$$

With the vector of statistics $\vec{d} = [d_1^1, \ldots, d_m^q]$ where q is the number of queries that produce the total of m statistics in all q tables.

The PINV version of Canary computes the pseudo-inverse $A^+$ of the query matrix A and returns the row indices i of the matrix $A^+$ where $$\vec{a_i} A = \vec{1}_i$$

$\vec{1}_i$ is a vector of all 0 s except for entry i=1. If above relationship holds for the ith row, it means that the private value $v_i$ is fully determined by the set of statistics.

Lens produces differentially private, noisy statistics to protect these vulnerable variables. If a Laplace mechanism is used to generate a differentially private release, the vector of noisy statistics can be described as $$\vec{d} = [d_1^1 + \eta_1^1, \ldots, d_m^q + \eta_m^q]$$

The $\eta_j^k$ are the noise values independently drawn from Laplace distributions with mean 0 and scale $\lambda_k$ $$\eta_j^k \sim Laplace(\lambda_k)$$
$$\lambda_k = \frac{GS_k}{\varepsilon_k}$$

The noise added by a Laplace mechanism to each statistic $d_j^k$ is scaled by the global sensitivity of the query $GS_k$ and the privacy parameter $\varepsilon_k$. In the most common case, all statistics in $\vec{d}$ come from the same aggregation and have a constant sensitivity and in the simplest case the privacy budget, measured by $\varepsilon_k$ is split equally across queries, so that ε and GS are constants. To simplify notation, one can omit the query index k and use j to index the statistics in $\vec{d}$ and the noisy values $\eta_j \sim \text{Laplace}(\lambda_j)$ Abe aims to find the E that adds enough noise to the statistics to defend against all attacks identified by Canary. With the above described analysis of the attacks on SUM and AVG tables there are the following ways to find a suitable $\varepsilon$.

Gaussian Approximation of Attack Likelihood

The PINV-attacks returned by Canary produce a guess $\tilde{v}_i$ for an individual's private value $v_i$ from a set of noisy statistics $\tilde{d}$ by applying the attack vector $\vec{a}_i$ $$\tilde{v}_i = \vec{a}_i \cdot \vec{d} = v_i + \eta$$

So, the attack on the noisy statistics results in a noisy guess that is the true value $v_i$ plus a RV $\eta$. $\eta$ is the weighted sum of j independent Laplace variables $\eta_j$ with $$e[\eta_j] = 0$$

$$\text{Var}[\eta_j] = 2\lambda_j^2$$

e distribution of $\eta$ is not trivial to compute analytically. However, the moment generating function of $\eta$ is known and thus the first and second order moment of $\eta$ can be computed $$E[\eta] = E\left[\sum_j a_j \cdot \eta_j\right] = \sum_j a_j \cdot E[\eta_j] = 0$$

And $$\text{Var}[\eta] = \text{Var}\left[\sum_j a_j \cdot \eta_j\right] = 2|a_i|_2^2 \sum_j \frac{GS_j^2}{\varepsilon_j^2}$$

$|a_i|_2$ is the L2 norm of the attack vector on row i and in the case where all statistics in $\vec{d}$ come from queries with constant query sensitivity GS and the same $\varepsilon$ the variance in the attacker's guess becomes:

$$\text{Var}[\eta] = \frac{2|a_i|_2^2 GS^2}{\varepsilon^2}$$

One way to measure attack success, in this special case, is to compute the cumulative probability that the attacker makes an accurate guess about value $v_i$, i.e. the likelihood that the noise $\eta$ is smaller than a certain error tolerance. In this case, Abe computes the percentage that the real attack succeeds as:

$$P_{success} = P[-\alpha \cdot v_i \leq \eta \leq \alpha \cdot v_i]$$
$$= P[|\eta| \leq |\alpha \cdot v_i|]$$

Even though it is hard to analytically derive the probability density, and thus also cumulative distribution, function of $\eta$ there exists a good approximation of the distribution of a sum of several Laplace RVs.

For a large number of Laplace RVs added up, the sum of these approximately follows a Gaussian distribution $$\eta \sim N(\mu, \sigma^2)$$
$$\mu = E[\eta] = 0$$
$$\sigma^2 = \text{Var}[\eta] = \frac{2|a_i|_2^2 GS^2}{\varepsilon^2}$$

The approximation by a Normal distribution becomes better the larger the number of statistics m and thus Laplace RVs summed up.

Under this Gaussian distribution approximation, the probability of attack success, i.e. that the attacker's noisy guess is within some a-accuracy around the true value $v_i$, can be computed analytically as:

$$P[|\tilde{v}_i - v_i| \leq |\alpha \cdot v_i|] = P[|\eta| \leq |\alpha \cdot v_i|] = erf\left[\frac{\alpha v_i}{\sqrt{2}\,\sigma}\right]$$

Where erf is the error function and $$\sigma = \sqrt{\text{Var}[\eta]} = \frac{\sqrt{2}\,|a|_2 GS}{\varepsilon}.$$

$|\eta|$ follows a half-normal distribution and Abe uses its cumulative distribution function $\Phi_{|\eta|}$ to approximate $P_{success}$ for each of the attacks $\vec{a}_i$ found. Abe uses the same baseline comparison and absolute confidence thresholds as described above to decide whether an attack is likely to succeed given a value for $\varepsilon$.

Mean-absolute error in attacker's noisy guess

Based on the same Gaussian approximation of the distribution of the noise in the attacker's guess $\eta$, Abe can, instead of testing a list of different $\varepsilon$'s, directly suggest an $\varepsilon$ that is likely to defend against a given attack with attack vector $\vec{a}_i$. If one assumes that $\eta \sim N(0, \sigma_\eta^2)$, the relative mean absolute error in the attacker's guess is $$\frac{E[|\tilde{v}_i - v_i|]}{|v_i|} = |a|_2 \cdot \frac{GS}{\sqrt{\pi}\,\varepsilon |v_i|}$$

Abe can now calculate the maximum E at which the average error in the attacker's guess is expected to deviate more than a % from the true value $$|a|_2 \cdot \frac{GS}{\sqrt{\pi}\,\varepsilon |v_i|} \geq \alpha$$

$$|a|_2 \cdot \frac{GS}{\sqrt{\pi}\,|v_i|\alpha} \geq \varepsilon$$

This $\varepsilon$ serves as an upper bound on how high $\varepsilon$ can be set before the attack is likely to succeed.

Root-mean squared error in attacker's noisy guess

If one doesn't want to rely on the Gaussian assumption, Abe can still analytically derive an $\varepsilon$ that is expected to defend against a given attack $|a_i|$. This solution is based on calculating the relative root-mean-square-error (rRMSE) in the attacker's noisy guess $$\sqrt{E\left[\frac{(\tilde{v}_i - v_i)^2}{v_i^2}\right]} = \frac{\sqrt{2}\,|a|_2 GS}{\varepsilon \cdot v}$$

As with the relative mean absolute error, Abe uses this measure of the expected error in the attacker's guess given an ε to derive an upper bound on the ε that still preserves privacy $$\varepsilon \geq \frac{\sqrt{2}\,|a|_2 GS}{\alpha \cdot v}$$

Translating One Type of Risk Measure to Another

Under the assumption of attacks guesses being Normally distributed (i.e. Gaussian), the three metrics can be translated to one another. This is so because all there parameters depend only on the norm of the attack vector, the secret value and the sensitivity. Therefore, algebraic manipulations allow to express one as a function of another.

From a user perspective this means that if the user would rather apprehend her risk through a root mean squared error threshold, we can compute the threshold which corresponds to the probability of attack success provided. Conversely, given a root mean squared error, we can suggest probabilities of attack success that would lead to that threshold.

This ability to move between metrics is key to enabling proper grasp of the risk for a wider range of users. Depending of the technicality of the user's background, or the nature of the private values, different metric will become more relevant.

The Case of COUNT Queries

When attacking COUNT queries, we have two main types of attackers. One uses the pseudoinverse, as the attacks on SUM queries. In that case the same approach as described above can be used to produce an upper bound on ε; i.e., a value ε above which the attack succeeds in producing a good guess of an entity's private value. The second type of attack for COUNTS use advanced constrained solvers. In that later case, the analytical approaches described above fail to produce an upper bound for ε. The iterative approach still performs very well however, and is a valid option in that case. In what follows we present an analytical version that does not need to perform the attack multiple times, as the iterative approach must do, so as to produce a scalable method to determine an appropriate value of ε.

To produce an upper bound for ε in the case where the attacker uses a solver we proceed in two steps. First, we define the success of the attacker as the fraction of guesses that are accurate. Call this quantity p, as it can be interpreted as the marginal probability of a guess being right. Note here that p is not observed by the attacker, but instead is a measure of the damage such an attacker could cause. Unfortunately, there is no closed form formula allowing to compute p in general. So, as a second step, we produce an approximation of p which we call p'. To produce this approximation we use that our attacker implicitly performs a Maximum Likelihood estimate of the private values. Then, each estimate of the private value, before thresholding, is close to Normally distributed with known mean and variance. This enables us to produce a mean-field-approximation of p using the average guesses and variances, yielding:

$$p'(\epsilon) = p'(0) e^{-\frac{\epsilon^2}{\alpha\epsilon^2 + \beta}},$$

where p'(0)=1/d, with possible adjustment if one category is dominant, ais such that in the limit of Every large we recover the same fraction of guesses as one would obtain when attacking the statistical release without noise addition, while β is the variance and is equal to $$\frac{8 \cdot g}{\varepsilon^2 \tilde{\sigma} \sqrt{n \cdot d}},$$

where g is the number of GROUPBY-s in the release, $\tilde{\sigma}$ is the average of the square of the singular values of A, n is the number of records, and d is the number of possible values for the discrete private value. Then, using p' allows us to measure how good, approximately, our attacker is.

All of the different attack testing mechanisms result in a measure of whether at a given ε an attack is likely to succeed or can be defended against. Which method is appropriate depends on the specific privacy attack and the risk scenario the user is worried about.

1.7.1.5 An Approach to Defining Attack Success Based on Distinguishing a Minimum Value from a Maximum Value Differential privacy relies on the basic idea of making it indistinguishable whether someone is in the dataset or not, which is also equivalent to making minimum values and maximum values indistinguishable. However, using this concept to measure the success of specific attackers has not been achieved yet.

Another way to define attack success, for continuous sensitive values, is the ability to determine whether someone's value lies at the minimum or maximum of the permissible range. This definition of attack success also does not depend on the sensitive values of any specific individuals (in contrast to other definitions of attack success described above such as "within 10% of the true value").

The system makes the assumption that, to determine this, the attacker will take the range of the variable, and if their estimate of someone's value is reported to be in the top half of the range, the attacker will guess that it is the maximum, and if it is reported to be in the bottom half of the range, the attacker will guess that it is the minimum. The system can then measure, for a value that actually was the minimum, what the likelihood is of this attack guessing correctly that it was the minimum (or, similarly, for a value that actually was the maximum, the likelihood of guessing correctly that it was the maximum). It can calculate this likelihood by analysing the probability distribution of the guess (as dictated by the noise addition levels used), and looking at the probability that the guess will fall on either half of the range. The optimal case for privacy is that the attack will succeed 50% of the time (equivalent to a random guess). The worst case for privacy is that the attack will succeed 100% of the time.

The user can configure what percentage of the time they would allow such an attack to succeed. Abe can then work with this percentage to determine how much noise must be added.

1.7.2 Reports Generated by Abe

Abe produces different summarising reports that help the user to understand the privacy-utility trade-off of privacy-preserving mechanisms such as differential privacy.

Results of variable-focused attack testing

Figure 18:
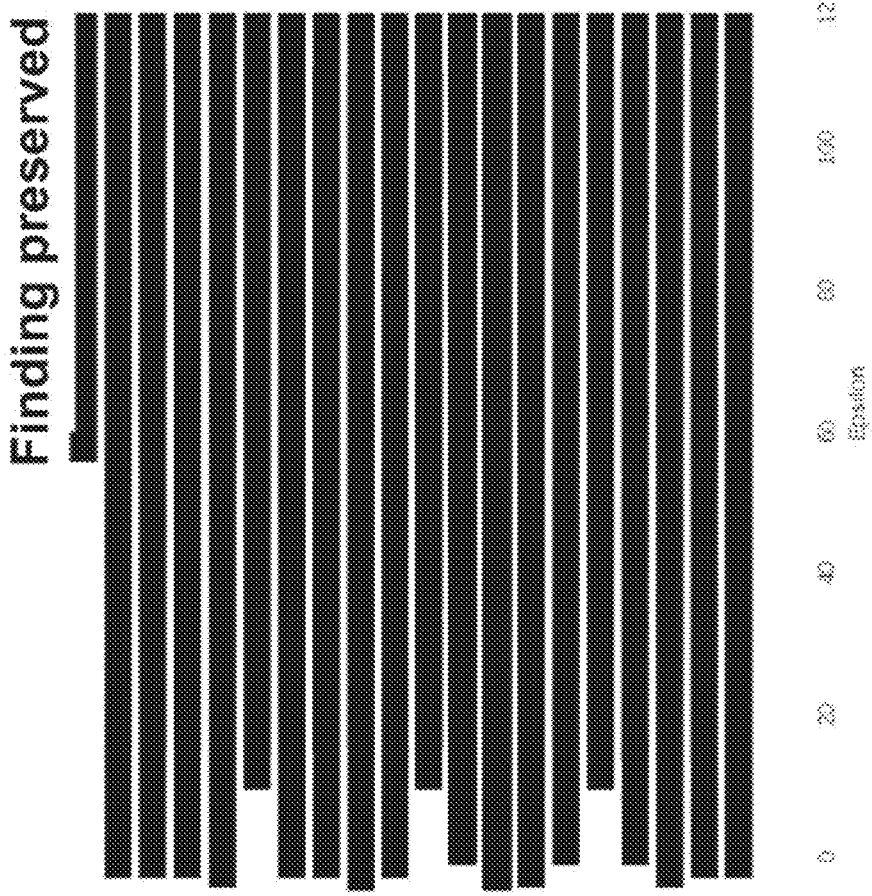
FIG. 18 shows an horizontal bar chart with the findings generated by Eagle.
Figure 19:
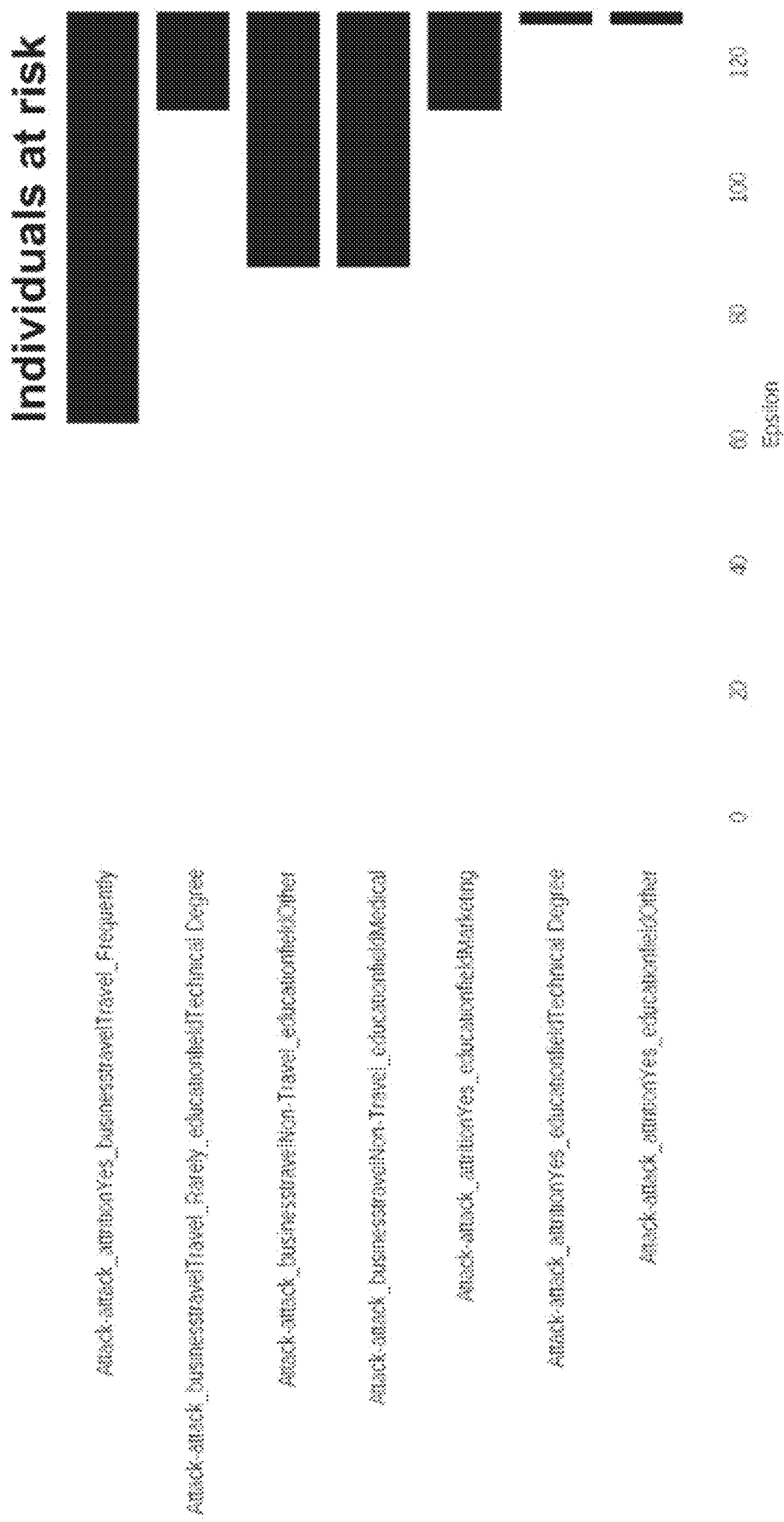
FIG. 19 shows an horizontal bar chart with the individuals at risk found by Canary.

Some of the privacy attacks produce a guess for each row in the dataset and Abe tests each of these attacks individually. Abe produces the following report for these attacks FIG. 18 shows an horizontal bar chart with the findings generated by Eagle, illustrating where the information is preserved as a function of values of E. FIG. 19 shows an horizontal bar chart with the individuals at risk found by Canary for the different attacks as a function of values of E. Sliding a vertical line across the chart helps understand immediately which attacks will be stopped and which findings will no longer be preserved.

Differentially private noise addition has been used as a privacy mechanism and epsilon (the parameter of DP noise addition) has been varied. For each epsilon, it has been tested which findings are preserved and which individuals are protected. The bars represent the best-fit threshold of what epsilon range allows the findings to be preserved, or the individuals to be protected, respectively. Larger epsilon (further right) means less noise, and less privacy.

This image illustrates how ABE can be used to assist the decision of selecting parameters for a privacy mechanism. A good parameter choice is one where no attacks succeed, but most of the findings are preserved.

1.7.3 Abe on Periodic Statistical Releases on Changing Datasets

When many data releases are planned over time, privacy protection parameters need to not only take into account the parameters of the current release but also any subsequent releases, and any updates on the sensitive dataset or data product specifications.

Several techniques are proposed which first extrapolate the strength of attacks as the number of releases increase, and then adjust the required privacy enhancing noise addition accordingly.

Canary and Abe, as described so far, run on a given dataset and a list of statistical queries. However, in many cases the data from which the aggregates are produced changes over time and new statistics about the same individuals are published periodically. The more statistics are released, the higher the risk for private information leakage. This needs to be taken into account when the output from Abe is used to select an appropriate level of privacy protection, such as for example a value of epsilon for noise addition for the first private data release.

To understand why changing data is important, consider the following example scenario: a company decides to publish average salary each quarter. In Q1, the average salary is $56 k. In Q2, only one new person has joined the company—a new salesman. The Q2 average salary is $58.27 k. Knowing the number of people in the company, one can calculate the exact salary of this new salesman, a privacy breach.

Abe can be used to extrapolate the risk for future data releases. The user needs to tell Abe:
1. which queries will be run on the data repeatedly,
2. at which frequency the results will be published. Call this frequency F.
3. how long any given user will stay in the dataset being analysed (e.g. if it is a school enrollment dataset, this is roughly 12 years). Call this duration D.

In cases where D years of historical data are available, Abe extrapolates risk with the following process:
1. splits up the historical data into snapshots at frequency F over duration D.
2. produces all statistics that would have been published on each of those snapshots,
3. runs Canary and Eagle on the set of statistics to extract vulnerabilities and insights,
4. and produces a comprehensive risk analysis for the historical data.

If one assumes that the changes in historical data are approximately representative of future data, then the privacy parameters that were effective for the past D years will be about as effective for the future D years. As an example, think of a database for pupil performance where a pupil will be in the dataset for 12 consecutive year and each year four different reports with a set of summary statistics about student performance will be published. Historical data from pupils who have left school already can be used to set the right level of privacy parameters for current students.

In cases where no, or not enough, historical data is available, Abe simulates database change over D years with frequency F. Several key dataset characteristics—such as, for example, average rate at which users enter and leave the database, typical changes in individuals' private attributes, or patterns of users changing between segment group—are needed to simulate database change.

Another approach, one that does not depend on real or simulated historical data, is to use theorems about data privacy techniques, such as differential privacy theorems, to extrapolate future risk. For example, one can predict how existing linear correlations in one individual's data will decrease privacy protection through noise addition for continuous data releases. Composition theorems allow one to compute the total privacy level ($\varepsilon$) ensuing from making p releases each at privacy level $\varepsilon'$. Such theorems can then be used to extrapolate an individual's risk from future statistics.

Furthermore, following Section 1.7.1.4, we can evaluate the required privacy level $\varepsilon$ by knowing the attack vector a. We there observe that if the data product queries and GROUPBY variables remain unchanged, then the attack on the first release of the data product will also be a valid attack on the second release of the data product. Further, the two attacks may be merged into one single more powerful attack simply by taking the average of the two attacks outcomes. Using the same argument it is possible to see that after p releases one can attack each release using the original attack vector a and then pool the attacks together to obtain a more powerful attack. There, we see that the resulting attack vector from pooling the p attacks has an L2 norm equal to that of the original vector a divided by $\sqrt{p}$, so that if $\varepsilon'$ was sufficient to protect the first release against the attack vector a, then $\varepsilon=\sqrt{p}\varepsilon'$ is needed the protect the p releases together.

In some cases, in addition to theorems, empirically observed characteristics of the data privacy mechanisms can be used to extrapolate future risk.

In some cases, it may help the privacy-utility trade-off to lower D. This can be accomplished by:
Removing users from the analytics database after they have been present for D years.
Subsampling users for each release such that each user is not always included in releases, so they are ultimately included in (a non-contiguous) D years' worth of releases.

1.7.4 Setting Epsilon Based on Canary and Eagle

Canary can include multiple attacks. It runs all attacks on a prospective release of statistics and recommends the epsilon low enough (i.e. noise high enough) such that all attacks are thwarted. For the variable-focused attacks, it suggests the minimum epsilon of the epsilons required to defend each variable. The bulk attacks behave differently, with no different epsilons for different variables. As the overall epsilon goes down (i.e. as noise goes up), a bulk attack should perform worse (i.e. make less accurate guesses). Note that this number may depend on the specific noise that was added—so we may want the average percentage of variables the real attack gets correct, across many noise draws.

Abe uses this functionality to recommend an epsilon to use in Lens. It brings together the output of the row-based and the bulk method attack testing. Abe may recommend the highest epsilon that is low enough to thwart all attacks, or it may leave an extra safety buffer (e.g. a further reduction of epsilon by 20%) for a more conservative configuration.

To find the highest epsilon that is low enough to thwart all attacks, Abe can iterate through a list of candidate epsilons (e.g. "[1, 5, 10, 20, 50, 100]"), add noise to the statistics in accordance with that epsilon, and then attack the noisy statistics with Canary attacks and see if the attacks succeed. Averaging over many noise trials may be required. Abe would then pick the highest epsilon such that no attacks succeed. Alternatively, Abe could use the formulas from Section 1.7.1.4 above to calculate the desired epsilon directly. Hence, by testing out a range of different epsilons, simulating adding noise in accordance with each epsilon, and attempting to attack the noisy statistics associated with each epsilon, the highest epsilon (i.e. lowest noise level) can be selected such that all of the attacks fail.

Abe can also include utility in its decision of setting epsilon. For instance, it can set epsilon as low as possible with the constraint that all the important findings (as determined by Eagle) are preserved, or the constraint that certain distortion metrics (e.g. root mean square error) are sufficiently low.

1.7.4.1 Setting Epsilon when There are No Differencing Attacks in a Single Release As described in section 1.7.3, Abe can be used to periodically release a set of statistics about a dataset that is changing over time. Abe aims to split the total amount of noise needed to defend against an attack on all statistics released evenly across releases. For this to work, in a case where no historical data is available, the attacks on the first periodic release need to be a good representation of future risk.

As an example, imagine a user wants to release statistics about pupil characteristics, such as special educational needs broken down by local authority and school type, each year and a student will remain in the database for 12 years. For the first release, Abe takes the epsilon suggested by Canary and assumes that over time, as more and more information about the same pupils is released, this attack will become stronger. Rather than just adding the minimum amount of noise needed to defend against the current attack, Abe will suggest a time-adjusted epsilon that helps to avoid that later on a larger, unequal, amount of noise needs to be added to compensate for the fact that the attack has become more accurate.

This means that in a case where in the first release there are no row-based attacks found and the bulk attacks are thwarted by the highest epsilon tested, there is a risk that Abe underestimates future risk. It is likely that over time new attacks emerge because people change their quasi-identifiers or drop out of the dataset which makes them vulnerable to differencing attacks.

To avoid a scenario where we release highly accurate information about people in the beginning and have to add a lot of noise later on, Canary can generate a synthetic attack on the first release. Abe takes the resulting epsilon and applies its budget splitting rules to get an epsilon for the first release which avoids needing major adjustments later on.

In the Canary system, adding a synthetic diff-of-two attack can be done by adding a row to the query matrix which differs by one entry from an existing row. An efficient way of doing this that also ensures that the added information does not lead to any inconsistencies in the query matrix is to add one more column to the query matrix which is all 0 except for a 1 in the added query row. The added query row will be a copy of the last row in the query matrix with the only modification being the entry in the artificial column set to 1. This corresponds to an extra record in the dataset, which does only have one quasi attribute and a secret.

There are different strategies for crafting a synthetic differencing attack that is useful for calibrating risk:
- An attack with the smallest possible L2 norm
- An attack on a sensitive value from extreme ends of the sensitive range
- An attack on a sensitive value with the lowest baseline guess rate Canary uses one of these strategies to create a synthetic attack on the first release in a series of releases and Abe, considering the attack real, finds the appropriate amount of noise to add to the release.

Creating a synthetic differencing attack when there are no vulnerable in the first release helps to avoid that a larger, unequal, amount of noise needs to be added to later releases because ABE needs to compensate for the fact that the information released initially has been highly accurate and now an attack has emerged.

1.7.5 Factoring in Compute Power Available to the Attacker

Some of the attacks described in the Canary section take considerable compute power to run in a feasible amount of time. Because compute power has a cost, some attacks may be too expensive for certain attackers to run.

Abe can take this limitation into account. The user provides information about how much compute power the attacker has available. Abe then runs only the Canary attacks that can be carried out with that compute power.

The user can provide information about the attacker's available compute power in several ways:
- Lens may have pre-loaded profiles of various types of attacker (nosy neighbor, disgruntled data scientist, malicious insurance company, nation state) and encode an estimate of compute power available to each of these attackers. For instance, Lens may assume that a nosy neighbor can run an attack for 3 days on a personal computer while a nation state can avail themselves of supercomputers and enormous clusters for weeks.
- Lens may ask directly for compute power (e.g. in the metric of core-hours) available to the attacker.
- Lens may ask for the amount of money an attacker is willing to spend, and convert this to compute power at market rates on cloud service providers (e.g. by looking up rates on Amazon Web Services).

Having obtained a limit on compute power, Abe then runs only the attacks that can be executed with compute power equal or less than that limit. It can do this, for instance, by trying to run every attack and cutting attacks off when they exceed the compute power limit. It can also include preconfigured models of how much compute power each attack takes to run based on factors such as data size and data shape and, using these models, run only the attacks whose models indicate that they will complete with the allowed compute power.

Models may also include, for instance, expressing the expected runtime as a function of compute cores, dataset size, and data release size. Computer power can be expressed either as pre-loaded profiles or as a user input (expressed as time or money). Attacks that exceed the compute power constraints are not run. In addition, if ABE is run in an environment with computing resource constraints, it may not be able to run all attacks. A further improvement is that Abe can run the attacks in order from fastest to slowest. In this way, if it discovers that one of the earlier attackers is successfully attacking a certain release with a certain amount of noise, it can cease attacking and not run the later, slower attackers, saving computing time overall.

1.7.6 Attacking Subsets of the Dataset

In cases where it is too computationally expensive to run an attack (see previous section), Abe can run an attack on a subset of the dataset instead. Running on a subset instead of the entire dataset reduces processing time. The subset is chosen such that the attack would give similar results if ran on the entire product.

If Abe finds that the attack succeeds on the subset of the dataset, it can infer that the attack would succeed on the full dataset. (The converse reasoning would not be true.)

Methods of choosing subsets include, but are not limited to:
- Taking a random subsample of people, regenerating the statistics on that subsample, and attacking those statistics.
- Taking the people who have a certain attribute (e.g. married people)—and attacking only the statistics that apply to that subgroup.
- Assuming that a random subsample of people's sensitive attributes are already known, and using this information to calculate the statistics for the unknown people only (e.g. if the sum of person A, B, and C's value is 37, and you know C's value is 6, the sum of A and B's value is 31), and attacking those statistics.
- Use the singular value decomposition of the equation matrix to determine which queries are most useful in attacking (namely, keeping the queries with large weight in the singular vector of singular value of smallest magnitude).

1.8 Abe and Canary's Standalone Use Cases

Abe, powered with Canary attacks, is also useful as a standalone system. The following use cases are examples of how it can be used.

1.8.1 Produce "Risk Functions" for a Dataset

A user can use Abe to understand the amount of aggregate statistics she can publish about the dataset before it becomes vulnerable to reconstruction. Reconstruction is a severe risk: when too many aggregate statistics have been released, it becomes possible to determine all or most of the individual private variables accurately.

Abe allows one to simulate the risk for different numbers of tables of stats and measure the number of variable vulnerable to attack. These experiments can be run on the particular private dataset in question for dataset-specific results, leading to an approximate function that outputs the amount of risk given the number of tables released.

1.8.2 Replace Manual Output Checking with Automated Risk Detection (Risk Monitoring)

A user might be considering releasing a set of summary statistics, in the form of contingency tables, about his private data. Abe can determine if the statistics leave any individuals vulnerable to privacy attack. If any of the Canary attacks locate vulnerable variables, the user knows not to release these statistics.

2. Handling Datasets with Multiple Private Attributes

Lens usually aims to protect the privacy of an individual, but it can also be of any another defined private data entity (e.g. a family, a company, etc.). In many cases, a database contains several records about one entity and often there is more than one column in the whole dataset which is considered private information. When Lens is used to release differentially private statistics about this data, this poses a challenge: the differential privacy protection given for one secret and one entity might be compromised by statistics released about other related private attributes that belong to the same entity. Protecting a dataset with related sensitive variables may be tricky because there is the need to take into account how much learning something about one secret may leak about all the related sensitive variables.

There are three different scenarios that need to be considered:
1. Releasing statistics about two (or more) different private attributes that are uncorrelated or where the relationship between the private values is unknown
2. Releasing statistics about two (or more) different private attributes that are highly correlated and knowing one is enough information to deduce all related secrets.
3. Releasing statistics about two (or more) different private attributes that are partially correlated.

An example of the first scenario would be a database that contains various different demographics, including private attributes such as a person's blood type, plus this person's salary. Because these secrets are uncorrelated, Lens can run Abe on each of these attributes separately to determine how much noise needs to be added (and—in cases where the noise suggested for the same table conflicts from each separate run—take the maximum noise). When determining epsilon for one of the private attributes, Lens can assume that the other private attributes may be available to the attacker as background knowledge, a conservative assumption.

An example of the second case would be a healthcare database that contains medical data such as the diagnosis for a certain cancer type but also data about drug usage for cancer treatment. Calculating the joint privacy risk of releasing statistics about both cancer diagnosis and drug usage is tricky because information released about one needs to be considered as useful for inferring the other. If the relationship between the two secrets is ignored, one likely underestimates the privacy risk of releasing these statistics.

Imagine that two different tables are released about this dataset: one has the count of patients with a certain cancer type and the other table contains counts of patients that take a certain cancer drug to treat their condition. The statistics in the two tables are highly correlated and information about an individual learned from one of them can facilitate deriving the second private value. Say an adversary has figured out that person X has cancer type A from the first table, when trying to learn which patients take which cancer drug in the second table, she already can guess with high probability that person X takes the drug to treat cancer type A. This not only puts person X at risk of both secrets being disclosed but potentially also has a snowball effect on which other patients are vulnerable in the second table.

To correctly model risk in all scenarios described above, Lens derives and detects relationships between groups of private attributes based both on user input and automated processing. The inferred relationships can be of different types:

- Parent-child relationship: One private column contains child categories of another private column. Example: The column "Cancer type" with categories {"Acute Lymphoblastic Leukemia", "Acute Myeloid Leukemia", "Gastrointestinal Carcinoid Tumor", "Gastrointestinal Stromal Tumors"} is a child column of "Cancer class" with categories {"Leukemia","Gastrointestinal Tumor"}. These relationships are automatically detected by scanning pairs of categorical columns for co-occurrences of words and uses the cardinality of columns with a high matching score to suggest a hierarchical ordering.
- Linear relationship: There exists a simple linear model that predicts the value of one private column from the value of a second or set of related private columns. Example: An individual's "Net worth" y can be predicted from the individual's "Liabilities" x1 and "Assets" x2 as y=x2−x1. These relationships are automatically detected by statistical tests for linear correlations, such as Chi-squared tests.
- Non-linear relationship: There exists a non-linear model that predicts the value of one private column from the value of a second or a set of related private columns. Example: A person's "CD4+ cell count" can be predicted with a known non-linear equation from the gene expression levels of different HIV genes such as "gag expression level", "pol expression level" or "env expression level". All of these attributes are considered private themselves.
- Semantic relationship: Two private columns can be known to be semantically related without the explicit relationship between them being known. Example: A medical diagnosis might be known to be related to symptoms such as migraine attacks or high blood pressure but it is not yet known how one can be predicted from the other.

In Lens, the user can define relationships between private columns and provide explanations for the various types of relationships and Lens can also detect some relationships automatically.

Lens' attack-based evaluation system uses the output of this process to inform its risk estimation process. First, "groups of secrets" are formed. It then depends on the type of relationship between private columns in a "secrets group", how they fit into the attack modelling part of Abe. For instance:

- Parent-child relationships: If there exists a parent-child relationship between columns in a group of secrets, the Canary equations in Abe for the parent class can include additional equations or inequalities that express this relationship. For instance, consider the secrets "is someone on painkillers" and then "are they on opiate painkillers". There is a parent child relationship between the two attributes, because opiate painkillers are a subcategory of painkillers. Let the variables expressing the first attribute be $P\_i$ for individual i, the second $O\_i$ for individual i. The constraints, for each i, can be added: $O\_i <= P\_i$.
- Linear relationships: Linear relationships between variables can be directly incorporated into the linear Canary equations as additional equations.

Hence by encoding the information on the relationship between sensitive variables into the set of linear equations, ABE is able to model the multiple sensitive variables together. When there are no relationships between the sensitive variables, ABE run separately the independent sensitive variables and the maximum noise recommended is applied on each statistic.

3. Handling Time-Series or Longitudinal Datasets

Databases often have more than one table. For instance, a common way to represent data about payments is to have one table for people, and another for payments. In the first table, each row represents a person. In the second, each row represents a single payment (it will likely include identifiers of the payer and the payee, who can then be looked up in the people table). There can be many payments associated with a person.

Figure 20:
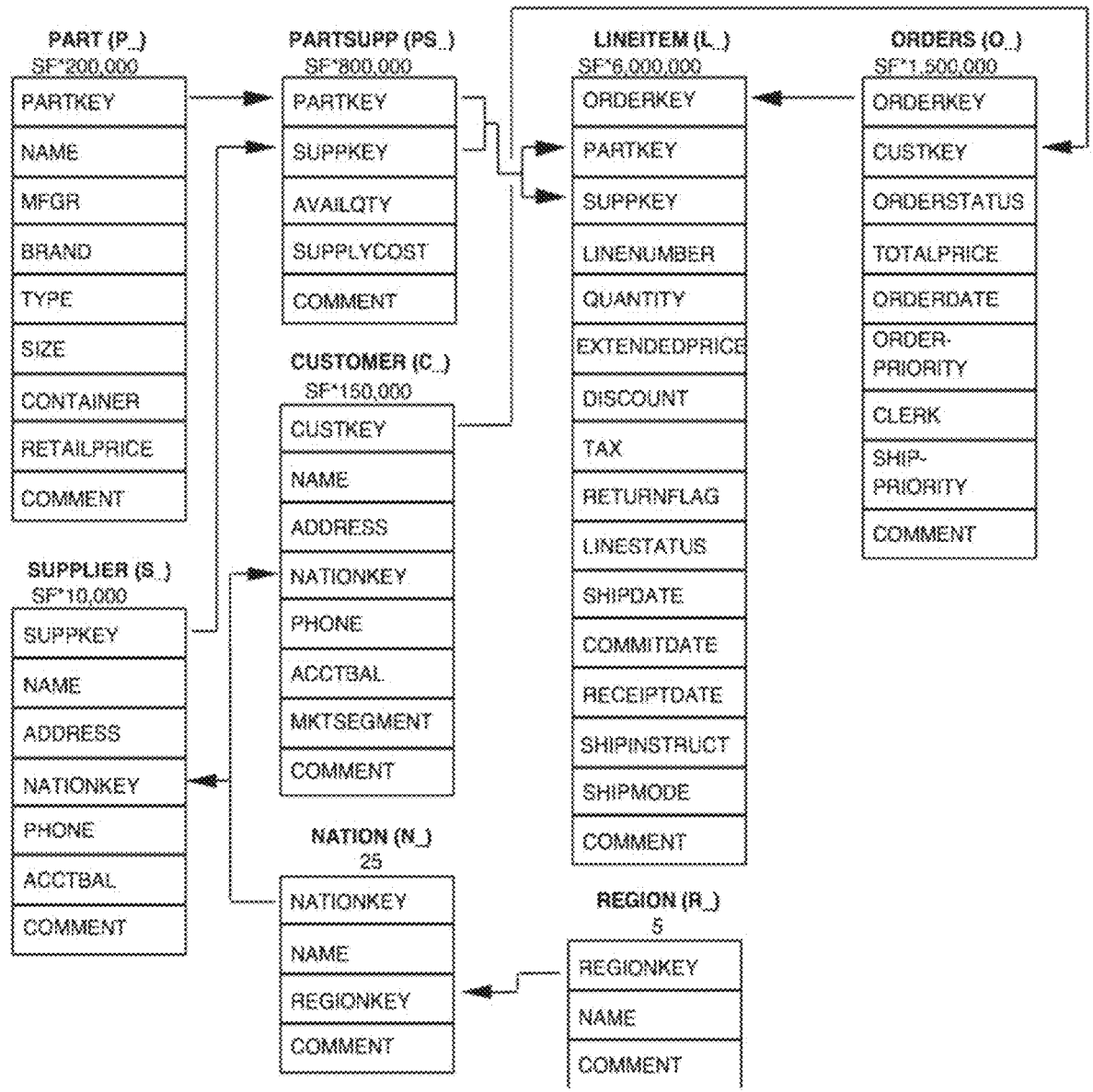
FIG. 20 shows an example of a transactional data schema.

We call data of this type transactional data. Transactional data contrasts with rectangular data, which consists of a single table where one row represents one person. FIG. 20 shows an example of a transactional data schema.

Lens publishes differentially private aggregate queries. To calculate how much noise to add to each aggregate query result, using for instance the Laplace mechanism, Lens must know: a) the sensitivity of the query ("sensitivity" in the sense found in the differential privacy literature) and b) what the appropriate epsilon is. Achieving both of these becomes more difficult with transactional data.

Both can be made easier by applying a "rectangularising" process for each query.

3.1 Rectangularising Transactional Data Queries

Rectangularising transactional data queries means transforming queries about a transactional dataset into queries about a rectangular dataset. The rectangular dataset we care about has one row per person—and our goal is to protect the privacy of each person.

The system uses a rectangularisation process for expressing queries on transactional data (one row per event, may rows per person) as queries on an intermediate rectangular table. SQL rules have been developed that transform a SQL-like query on transactional data into a SQL-like query on the rectangular data.

Our starting point for a rectangular dataset is the table in the dataset that has one row per person. Say we are protecting customers in the example transactional database above—the "CUSTOMER" table is our starting point for a rectangular dataset.

Now, say the user wants to publish results of the query "SUM (TOTALPRICE) FROM ORDERS". This concerns the ORDERS table. However, we can create a new column in the CUSTOMER table that allows this query to be answered: the sum total price per customer.

We call this process the GROUP BY rule because it is accomplished by grouping the query by person. The full example of the GROUP BY rule in action on the query "SUM (TOTALPRICE) FROM ORDERS" is below:

1. Execute SUM (TOTALPRICE) FROM ORDERS GROUP BY CUSTKEY.
2. Make the result of this query a new column in the rectangular dataset (which is CUSTOMER). Call it INTERMEDIATE_SUM.
3. Execute SUM(INTERMEDIATE_SUM) FROM CUSTOMER.

The dataset we have created in step 2 is a rectangular dataset, and the query that we've asked in step 3 yields the exact same answer that the original query would have. We have created an intermediate rectangular table to give an answer to a query about a transactional dataset.

Sums can be calculated as sums of intermediate sums—in other words, we sum person-wise to get the intermediate feature, and then we sum that feature. With counts, we count person-wise, and then sum the feature.

Notice that in step 1 we could group by CUSTKEY because it happened to represent individual people and be included in the ORDERS table. However, what if we were querying about LINEITEM, for instance "SUM (QUANTITY) FROM LINEITEM"? No reference to customers is found in this table.

In this case, we must join with another table to get a reference to customers. This process is the JOIN rule. For instance, we can join LINEITEM with ORDERS on ORDERKEY in order to be able to reference CUSTKEY. The full example of the JOIN rule and the GROUP BY rule on the query "SUM (QUANTITY) FROM LINEITEM" is below:
1. Create a new table: LINEITEM OIN ORDERS ON (L_ORDERKEY=O_ORDERKEY)
2. Execute SUM(QUANTITY) FROM LINEITEM JOIN ORDERS ON (L_ORDERKEY=O_ORDERKEY) GROUP BY CUSTKEY.
3. Make the result of this query a new column in the rectangular dataset (which is CUSTOMER). Call it INTERMEDIATE_SUM.
4. Execute SUM(INTERMEDIATE_SUM) FROM CUSTOMER.

Step 1 enables a reference to CUSTKEY. Then the GROUP BY rule can work in steps 2-4 as before.

With these two rules, Lens can transform many queries on transactional data into queries about an intermediate rectangular dataset. The transformed versions of the queries can be assessed for sensitivity and epsilon can be set for them as rectangular queries. In this way, Lens can support releasing statistics about transactional datasets.

To perform this rectangularisation, Lens needs to know the database schema and the table in the schema that is rectangular (i.e. contains one row per person). It also needs to know which column in this rectangular table is the identifier.

4. Determining "Sensitivity," an Important Concept in Differential Privacy

Knowing the range of sensitive variables in the data is necessary to guarantee differential privacy.

Lens publishes differentially private versions of aggregate statistics using the Laplace mechanism (it can also similarly use the Gaussian mechanism but the Laplace mechanism is discussed here). The Laplace mechanism adds Laplace noise to the query result. It calculates how much noise to add as sensitivity/epsilon, so it is important to know the sensitivity of the query.

Pulling the range directly from the original dataset is a potential privacy risk because it can give away the minimum or maximum value in the data. So instead, the range is pulled out and displayed to the data holder. The system asks what the theoretical biggest possible range of the data could be and warns the data holder that whatever they type in will be made public. Therefore heading off the possibility that the data holder just reports the actual range of the current data in the original dataset.

COUNT queries have a sensitivity of 1. SUM queries have a sensitivity equal to the size of the range of the variable. Importantly, this does not mean the range of the variable at any point in time, but rather the maximum range that the variable could conceivably have. For instance, a variable that represents the age of humans may have a range of about 0-135.

Lens asks the user to input the range of any column that is being SUM'ed. Left to their own devices, users may be tempted to just look up the range of the variable in the data they have available and use that. There are privacy risks to doing this, and the variable may exceed those bounds in future releases. So, to dissuade users from doing this, Lens calculates the current range of the data for them and displays this range, with a dialog that asks them to alter the numbers to the maximal conceivable range. The dialog also informs the user that whatever they put as the range of the variable should be considered public.

As an example, let's say a user has a database of employee clock-in and clock-out times and they want to publish statistics about it. One feature they are interested is the average work day. They compute this as an average ("final average work day") of each employee's average work day ("per-employee average work day"). Lens needs to know the sensitivity of this feature: per-employee average work day. So the user must input the range. Lens queries the data and finds that the current minimum is 3.5 hours while the maximum is 11.5 hours. Lens presents to the user this information, with the aforementioned warning about the inputs being public. The user, thinking about what might practically happen in the future, decides to input 2 and 12 as the bounds of the range. Lens can then compute a sensitivity of 10 (12 minus 2) and use that to calibrate the noise it adds to the average statistics.

Lens can also then clamp or suppress future data points that fall outside this configured range. For instance, if an unanticipated sensitive value of 13 is collected, and the range is 2-12, that data point can either be dropped or converted to a 12.

5. Outputting Synthetic Microdata Instead of Aggregate Statistics

In some situations, outputting aggregate statistics may not be appropriate. For instance, if an existing data mining pipeline exists, then outputting synthetic microdata copy of the true data would enable the use of the said pipeline while protecting privacy with minimal changes to the pipeline.

Lens makes it easy to output synthetic microdata or aggregate statistics in the same setup by considering synthetic microdata as another way of conveying aggregate statistics. This is done by embedding the patterns of the aggregate statistics in the synthetic microdata.

For this reason, Lens includes the option to output a dataset of privacy protected synthetic microdata in response to user-defined queries, rather than outputting a set of perturbed aggregate statistics. Lens allows the data holder to release DP aggregates and/or DP synthetic data, with epsilon centrally managed and set by the same automated analytics in either case.

Synthetic microdata is constructed in such a manner as to allow a close, but not exact, match between answers of user-defined queries on the original data set and the same queries on the synthetic dataset. The closeness of this match is parameterised. This allows simultaneously capturing of the relevant insights of interest from the protected dataset whilst the closeness of these answers provides a formal limit on the amount of disclosure of individual information from the original data.

Lens offers several options to output synthetic microdata. One option within Lens is to employ a methodology based on the Multiplicative Weights Exponential (MWEM) algorithm (Hardt, Ligett and McSherry (2012) A Simple and Practical Algorithm for Differentially Private Data Release, NIPS Proceedings). This method releases synthetic microdata with differential privacy.

The algorithm consists of several steps:

An initial synthetic dataset drawn uniformly in the domain of the original dataset is constructed.

The user defined queries are computed on the original dataset in a differentially private way using the Laplace mechanism (Dwork (2006) Differential privacy. In Proceedings of the International Colloquium on Automata, Languages and Programming (ICALP)(2), pages 1-12). The original statistics, and their differentially private counterparts, are kept secret.

The user defined queries are computed on the initial synthetic data.

This initial synthetic dataset is then refined iteratively by minimising the error between the perturbed statistics generated on the original dataset, and those generated on the synthetic dataset. Specifically, the algorithm selects the maximum-error statistic using another differentially-private mechanism, the Exponential Mechanism (McSherry and Talwar. (2007). Mechanism Design via Differential Privacy. Proceedings of the 48th Annual IEEE Symposium on Foundations of Computer Science. Pages 94-103), and then the synthetics data is modified to reduce this error.

The combined usage of these two differentially private mechanisms allows a synthetic dataset to be constructed which has a mathematically quantifiable amount of disclosure about a given individual variable within the original dataset.

6. Privacy Protection for Multiple Entities

Usually, data privacy mechanisms are designed to protect the privacy of people in a dataset—in other words, to make sure that no secret about an individual is disclosed. However, this does not address the real-world possibility that there is some other entity whose privacy needs to be protected. Think for instance of a dataset of purchases at stores. Of course, it is desirable to protect the purchase histories of each individual. But it may additionally be desirable to protect the sale histories of each store.

This is called "protection for multiple entities" because there are more than one entity (in this case, people are one entity and stores another) who need privacy protection.

These two entities may relate to each other or not. We consider two cases: where one entity is 'nested' inside another and when it is not. For instance, in the census, people and households are nested entities—each person is in exactly one household, and every household has at least one person. People and stores in the purchases dataset example above are not nested entities—each person may shop at more than one store, and each store has more than one customer.

6.1 Differential Privacy Protection for Two (or more) Nested Entities

If entity A is nested inside entity B, then protecting A with a certain differential privacy level requires less noise than protecting B. For example, since people are nested inside households, protecting people requires less noise than protecting households. So, if we provide B with epsilon-differential privacy, then we have provided A with epsilon-differential privacy.

To protect nested entities, the system needs to learn which entities are nested by checking for many-to-one relationships between columns. This information can be provided by a user or learned automatically. To learn it automatically, the system can use metadata describing the data and can also analyse the data itself. Assuming there is a column in the dataset that represents an identifier for A and another for B, the system checks whether there is a one-to-many relationship from A to B (if so, B is nested inside A).

To set epsilon, ABE sets epsilon based on the harder-to-protect entity (the outer entity). The outer entity is harder protect because it makes a bigger imprint in statistics—e.g. a six person household affects counts more than a single individual. Lens can then report the level of epsilon-differential privacy provided to each entity.

After epsilon is set, Canary can also be run on the inner entity to double-check that this epsilon sufficiently protects this entity.

Note that this method extends to more than two entities, as long as there is a nesting relationship between every pair of entities.

6.2 Differential Privacy Protection for Two Non-Nested Entities—the Max Noise Approach If entities are not nested, ABE can set epsilon by calculating how much noise is required for each entity independently, and then choosing the maximum of the resulting noise levels. Lens can then report on the level of epsilon-differential privacy provided to each entity.

After epsilon is set, Canary can be run on the other entities to double-check that it is sufficient to protect those entities. Note That This Method Extends to More Than Two Entities.

7. Heuristic methods to quickly assess safety of a data product

Lens contains a number of heuristics that help determine privacy risk associated with a statistical release. These can all be assessed within Lens prior to any adversarial testing itself and provide a fast way to approximate privacy risk of releasing aggregate statistics.

There are combinations of a dataset and a set of user-defined queries for which it is obvious that there is a privacy risk, and this can be detected via these heuristics without the need for full adversarial testing. Following query setup and before adversarial testing, Lens can provide feedback with these quick heuristics, telling the user if any of them indicate a data product configuration that poses an obvious privacy risk. In this manner, users have the option of re-configuring their data product before adversarial testing suggests an level that is likely to result in poor utility.

Number of aggregate statistics released vs number of variables within a dataset

Consistent with existing privacy research, the number of aggregate statistics released relative to the number of people (or other entity) in a dataset is a good indicator of risk. The ratio between number of statistics released and number of people in the dataset relates to how likely it is that reconstruction attacks will occur (for example if it's too high, e.g. more than 1.5, it's risky). Therefore it can be used as a quick indication of privacy risk of releasing aggregate statistics.

For instance, Lens can calculate the ratio of the number of statistics to the number of people and warn the user when this ratio is too high.

This heuristic can be refined further by considering on a per variable level the number of statistics in which a given individual participates, and warning when any one variable is present in too many statistics.

Number of uniquely-identified individuals within the statistical release

Another heuristic for privacy risk is the number of individuals who have unique known attributes (considering only the attributes that are relevant in the statistics).

For example, when more than one person share the same quasi-identifiers (within the attributes used in the data release), they cannot be subject to differencing attack in aggregate statistics. These individuals have an intrinsic protection against attack. Therefore, the number of people who are uniquely identified (i.e. do not share quasi-identifiers with anyone) is a good representation of how many people might be attackable. If no one is attackable, for instance, then we know there's no risk.

For instance, if there is one table being produced—average income by gender and age—the heuristic would calculate how many individuals have a unique gender-age combination in the dataset.

Presence of Difference of One Attacks

As mentioned previously (section 1.5.2), difference of one attacks returned by the difference of one attack scanner can be a fast heuristic indicator of whether a particular statistical release reveals individual private values.

Small Query Set Sizes

The distribution of the number of variables contributing to each statistic, known as query set size (QSS), is another heuristic indicator of risk. If there are few statistics with low query set sizes, there is less likely to be an attack The risk of releasing QSS=1 aggregate statistics comes from the self-evident fact that this statistic is not an aggregate but instead discloses an individual variable. However, QSS=2 aggregate statistics also pose a significant risk of disclosure, due to the intuition that, for each QSS=2 aggregate statistic, only one variable need be discovered to reveal both the value of both variables. For this reason, the number of smaller QSS statistics can be a valuable measure of the risk of disclosure inherent in a set of aggregate statistics.

COUNT peg saturation

For a set of aggregate statistics that consider COUNT of some private categorical variable (e.g. COUNT of individuals where HIV Status is positive), saturated queries act as a quick heuristic assessment of risk.

Saturated queries are those in which the number of variables contributing to a given COUNT statistic match the count itself. For example, if the COUNT of HIV positive individuals for a particular subset of the data is equal to the size of the subset, it is clear all members of that subset are HIV positive. Similarly, if the COUNT is 0 for this subset, we know that all members of that subset are HIV negative. This approach extends to non-binary categorical variables.

8. Lens Use Cases

This section describes ways to use the Lens system.

8.1 Set Up a Differentially Private Data Product without Data Privacy Expertise 8.1.1 A Payments Data Product One use case for the Lens system is to create a data product about payments. A payment processor company or a credit card company possesses a dataset of millions of transactions and customers. This data contains rich patterns that could be useful to the company, the consumers, and third parties. However, the data is sensitive because it consists of people's purchase histories, which are private.

Using Lens, the credit card company can create a data product consisting of useful payment breakdowns—how much people are spending on average on groceries, at restaurants, and on ordering delivery, for example. It can capture these statistics every quarter, and provide them to customers, for example, so that they can understand how they stack up against average.

Lens would ensure the company released all statistics with a properly calibrated differential privacy guarantee. The workflow proceeds thus:

1. The company configures in Lens the statistics they are interested in publishing
2. Abe runs on these statistics to determine how much noise is required to stop the Canary attacks.
3. Lens asks the user whether they would like to apply this noise to their release—the user either approves it or adjusts it.
4. The noisy release is generated.

This use case relies on a few of the innovative elements discussed above. For instance:

There are periodic releases over time;
The data is longitudinal (one row per transaction, though it's people we want to protect).

8.1.2 A Government Statistics Data Product

Another use case for Lens is publishing socio-economic and demographic statistics, in institutions such as the census. The government, who orchestrates the census, wants to publish these statistics for the public good, but they do not want to reveal sensitive information about any one person or family.

Using Lens, the census bureau configures the releases they want to make about the data. Lens—using the same process described in the previous use case—parametrizes a noise addition mechanism such that the release is well protected with differential privacy. The census then publishes the noisy release generated by Lens.

This use case relies on protecting the privacy of multiple entities: people and households.

Now, say that the census had legacy aggregation software (software that calculates aggregate statistics from raw data) that takes as input a raw data file (i.e. not yet aggregated). They don't want to change the legacy software. But they wanted the data to be anonymized before being fed into this legacy software. In this case, Lens can output synthetic data instead of noisy statistics, and this synthetic data can be fed into the legacy software. Because the synthetic data contains approximately the same patterns as the noisy statistics, the legacy software would calculate approximately accurate aggregate statistics.

8.2 Quickly Estimate Whether a Data Release is Possible with Good Privacy and Utility Lens can give users a quick idea of whether the statistics they want to release are feasible to release with a good privacy-utility trade-off or not. For instance, releasing 500 statistics about the same 10 people's incomes every day is likely impossible to achieve with any meaningful privacy and utility. If a user tests this release in Lens, Lens's quick heuristics can signal to the user quickly that this attempt has too many statistics per person and will not succeed. The user can then reduce the number of statistics accordingly and try again.

If the heuristics indicate that the release is likely to succeed, then the user can continue onto releasing the data product as discussed in the previous use case.

Appendix 1

Summary of Key Concepts and Features

This appendix is a summary of the key concepts or features (C1 to C82) that are implemented in the Lens platform. Note that each feature can be combined with any other feature; any sub-features described as 'optional' can be combined with any other feature or sub-feature.

C1. Data Product Platform with Features for Calibrating the Proper Amount of Noise Addition Needed to Prevent Privacy Leakage Computer implemented data product release method and system in which the data product release is a bounded or fixed set of statistics that is predefined by a data holder and derived from a sensitive dataset using a privacy protection system such as a differentially private system; and in which the privacy protection parameters, are configurable as part of the data product release method or system to alter the balance between maintaining privacy of the sensitive dataset and making the data product release useful.

Optional features:

Privacy parameters include one or more of the following: a distribution of noise values, noise addition magnitude, epsilon, delta, or fraction of rows of the sensitive dataset that are subsampled.

Usefulness of the data product is assessed by determining if conclusions that could be drawn from the sensitive dataset, or from a non-privacy protected data product release, can still be drawn from the data product release.

Conclusions include any information or insight that can be extracted from the sensitive dataset, or from a non-privacy protected data product release, such as: maximum value, correlated variable, difference of group means, and temporal pattern.

Privacy of the sensitive dataset is assessed by applying multiple different attacks to the data product release.

A distribution of noise values is added to the statistics in the data product release.

The distribution of noise is a Gaussian noise distribution or a Laplace noise distribution.

C2. The Workflow of Gathering a Data Product Specification

Computer implemented data product release method and system in which the data product release is a bounded or fixed set of statistics that is predefined by a data holder and derived from a sensitive dataset using a privacy protection system such as a differentially private system; and in which one or more privacy protection parameters, are automatically chosen, generated, determined or set, and in which the privacy protection parameters define a balance between maintaining privacy of the sensitive dataset and making the data product release useful.

Optional features:

Data product release is configured by the data holder.

User configurable data product related parameters are input by the data holder.

Sensitive dataset is input by the data holder.

A graphical user interface for the data-holder is implemented as a software application.

Data product related parameters include:
  range of sensitive data attributes;
  query parameters such as: query, query sensitivity, query type, query set size restriction;
  outlier range outside of which values are suppressed or truncated;
  pre-processing transformation to be performed, such as rectangularisation or generalisation parameters;
  sensitive dataset schema;
  description of aggregate statistics required in the data product release;
  prioritisation of statistics in the data product release;
  data product description.

Data product release is in the form of an API or synthetic microdata file.

Data product release includes one or more of the following: aggregate statistics report, infographic or dashboard, machine learning model.

C3. Automatic PUT Evaluation

Computer implemented data product release method and system in which the data product release is a bounded or fixed set of statistics that is predefined by a data holder and derived from a sensitive dataset using a privacy protection system such as a differentially private system; and in which a privacy-utility tradeoff (PUT) is automatically evaluated.

C4. The Detailed Report

Computer implemented data product release method and system in which the data product release is a bounded or fixed set of statistics that is predefined by a data holder and derived from a sensitive dataset using a privacy protection system such as a differentially private system; in which a privacy-utility tradeoff (PUT) is automatically evaluated and in which the data product release method and system generates a report or other information that describes the characteristics of the intended data product release that relate to the balance or trade-off between (i) maintaining privacy of the sensitive dataset, including whether attacks succeed and/or fail, and (ii) making the data product release useful.

C5. Guidance for How to Modify a Data Product to Have a Better PUT

Computer implemented data product release method and system in which the data product release is a bounded or fixed set of statistics that is predefined by a data holder and derived from a sensitive dataset using a privacy protection system such as a differentially private system; and in which a privacy-utility tradeoff (PUT) is automatically evaluated and recommendations for improving that PUT are subsequently automatically generated.

Optional feature:

Recommendations include modifying one or more of the following: dimensionality of one or more of the table in the data product, frequency of the release of the data product, statistical generalisation to be performed, suppressing outliers, noise distribution values, or any data product related parameters.

C6. Repeated Releases

Computer implemented data product release method and system in which the data product release is a bounded or fixed set of statistics that is predefined by a data holder and derived from a sensitive dataset using a privacy protection system such as a differentially private system; and in which the method or system is configured to generate multiple, refreshed or updated versions of the data product release and is configured to display how the privacy-utility tradeoff changes for each refreshed or updated version of the data product release.

C7. Repeated Releases Take into Account Any Updated Version of the Sensitive Dataset Computer implemented data product release method and system in which the data product release is a bounded or fixed set of statistics that is predefined by a data holder and derived from a sensitive dataset using a privacy protection system such as a differentially private system; and in which the method or system is configured to generate multiple, refreshed or updated versions of the data product release and is configured to display how the privacy-utility tradeoff changes for each refreshed or updated version of the data product release;

and in which each generated data product release takes into account any updated version of the sensitive dataset.

C8. Repeated Releases with Re-Evaluation of the Privacy Parameters

Computer implemented data product release method and system in which the data product release is a bounded or fixed set of statistics that is predefined by a data holder and derived from a sensitive dataset using a privacy protection system such as a differentially private system; and in which the method or system is configured to generate multiple, refreshed or updated versions of the data product release and is configured to display how the privacy-utility tradeoff changes for each refreshed or updated version of the data product release;

and in which for each generated data product release, protection parameters are automatically updated by taking into account any updated version of the sensitive dataset, any updated version of the data product release or any user configurable parameters.

C9. Comparing Distortion to Sampling Error

Computer implemented data product release method and system in which the data product release is a bounded or fixed set of statistics that is predefined by a data holder and derived from a sensitive dataset using a privacy protection system such as a differentially private system; and in which one or more privacy protection parameters, are automatically generated, and the method or system is configured to automatically generate a comparison between the effect of (i) the privacy protection parameters and (ii) sampling errors.

C10. System to Automatically Perform Adversarial Testing on a Data Release

Computer implemented data product release method and system in which the data product release is a bounded or fixed set of statistics that is predefined by a data holder and derived from a sensitive dataset using a privacy protection system such as a differentially private system; and in which one or more privacy protection parameters, are applied and the method or system is configured to automatically apply multiple different attacks to the data product release and to automatically determine whether the privacy of the sensitive dataset is compromised by any attack.

Optional features:
Attacks are stored in an attack library.
The privacy protection system evaluates whether the multiple different attacks are likely to succeed.
Each attack estimates if any sensitive variables from the sensitive dataset are at risk of being determined from the data product release.
Each attack outputs the sensitive variables that are determined to be vulnerable with respect to the attack.
Each attack outputs a guessed value for each sensitive variable determined vulnerable.

C11. System to Automatically Perform Adversarial Testing on a Set of Aggregate Statistics Computer implemented method of managing the privacy of a set of aggregate statistics derived from a sensitive dataset, in which the method uses a penetration testing system that is configured to automatically apply multiple different attacks to the set of aggregate statistics to automatically determine if the privacy of the sensitive dataset is compromised by any attack.

Optional features:
Aggregate statistics include machine learning models.
The penetration testing system implements any of the methods implemented by the privacy protection system.

C12. Use Adversarial Testing to Directly Calculate Epsilon

Computer implemented data product release method and system in which the data product release is a bounded or fixed set of statistics that is predefined by a data holder and derived from a sensitive dataset using a differentially private system; and the method or system is configured to apply multiple different attacks to the data product release and to determine the substantially highest epsilon consistent with defeating all the attacks.

C13. Calculating epsilon directly from the attacks

Computer implemented data product release method and system in which the data product release is a bounded or fixed set of statistics that is predefined by a data holder and derived from a sensitive dataset using a privacy protection system such as a differentially private system; and in which epsilon is directly calculated from attack characteristics to get the desired attack success.

Optional feature:
Attack characteristics include a probability density function.

C14. Use Adversarial Testing to Measure Whether a Certain Epsilon Will Defeat Privacy Attacks; Then, Use That Adversarial Testing to Set Epsilon Low Enough That No Attacks Succeed Computer implemented data product release method and system in which the data product release is a bounded or fixed set of statistics that is predefined by a data holder and derived from a sensitive dataset using a differentially private system; and in which a value of privacy protection parameter epsilon is applied and the method or system is configured to apply multiple different attacks to the data product release and to determine whether the privacy of the sensitive dataset is compromised by any attack for that epsilon value; and to then determine the substantially highest epsilon consistent with maintaining the privacy of the sensitive dataset.

Optional feature:
The privacy of the sensitive dataset is maintained when all of the multiple different attacks applied to the data product release are likely to fail.

C15. Epsilon Scanning

Computer implemented data product release method and system in which the data product release is a bounded or fixed set of statistics that is predefined by a data holder and derived from a sensitive dataset using a differentially private system; and in which values of privacy protection parameter epsilon are iteratively applied and the method or system is configured for each epsilon value to automatically apply multiple different attacks to the data product release and to automatically determine whether the privacy of the sensitive dataset is compromised by any attack and to determine the substantially highest epsilon consistent with maintaining the privacy of the sensitive dataset.

C16. Use Automated Adversarial Testing to Set Epsilon

Computer implemented data product release method and system in which the data product release is a bounded or fixed set of statistics that is predefined by a data holder and derived from a sensitive dataset using a differentially private system; and in which a value of privacy protection parameter epsilon is applied and the method or system is configured to automatically apply multiple different attacks to the data product release and to automatically determine whether the privacy of the sensitive dataset is compromised by any attack for that epsilon value and to then automatically determine the substantially highest epsilon consistent with maintaining the privacy of the sensitive dataset.

Optional features:
A user configurable safety buffer value is subtracted from the determined highest epsilon in order to increase the privacy of the sensitive dataset.
A user configurable safety buffer value is added to the determined highest epsilon in order to increase the utility of the data product release.

C17. Encoding Statistics as Linear Equations

Computer implemented method for querying a dataset that contains sensitive data, in which the method comprises the steps of encoding statistics that are a linear function of values in the dataset, such as sums and counts, using a system of linear equations.

Optional features:

The method comprises the steps of: (i) receiving a linear query specification; (ii) aggregating the data in the sensitive dataset based on the query specification; and (iii) encoding the aggregated data with a set of linear equations.

When the query received is a SUM, relating to m sums about n variables contained in the dataset, the set of linear equations is defined by:

$$A \cdot v = d$$

where

A is a m×n matrix of 0 s and 1 s, where each row represents a sum and marks the variables who are included in the sum as 1 and other variables as 0;

v is an n-dimensional column vector that represents the sensitive value of each variable in the sensitive dataset; and d is vector of length m having the values of the sum statistics as its entries.

C18. Encoding AVERAGE Tables as SUM Tables

Computer implemented method for querying a dataset that contains sensitive data, in which the method comprises the step of using the size of a query set to encode an AVERAGE table as a SUM table for that query set.

C19. Encode COUNT Tables

Computer implemented method for querying a dataset that contains sensitive data, in which the method comprises the steps of encoding COUNT tables into a system of linear equations.

Optional feature:

One-hot encoding is used to split a sensitive variable into several binary variables.

C20. Handling a Mix of Sensitive and Public Groupbys

Computer implemented method for querying a dataset that contains multiple sensitive data columns, in which the method comprises the steps of encoding the multiple sensitive data attributes as a single sensitive data attribute.

Optional features:

One hot encoding is used to encode every possible combination of the variables in sensitive data columns.

Continuous variables are generalised before performing the one hot encoding step.

C21. Displaying Distortion Metrics About the Noise

Computer implemented method for querying a dataset that contains sensitive data, in which the method comprises the step of using a privacy protection system such as a differentially private system; and in which one or more privacy protection parameters, are automatically generated, together with distortion metrics describing the noise addition associated with the privacy protection parameter.

Optional feature:

Distortion metrics include root mean squared error, mean average error or percentiles of the noise value distribution C22. Determine Whether Utility Has Been Preserved in Perturbed Statistics by Assessing Whether the Same High-Level Conclusions Will be Drawn from Them Computer implemented data product release method and system in which the data product release is a bounded or fixed set of statistics that is predefined by a data holder and derived from a sensitive dataset using a privacy protection system such as a differentially private system; and in which one or more privacy protection parameters, are applied and the method or system is configured to automatically determine if conclusions that could be drawn from a non-privacy protected data product release dataset can still be drawn from the privacy protected data product release.

Optional features:

The method includes the step of encoding the conclusions into a program.

The method includes the step of encoding maximum value conclusions.

The method includes the step of encoding correlated variable conclusions.

The method includes the step of encoding difference of group means conclusions.

The method includes the step of encoding temporal pattern conclusions.

C23. Allowing Users to Specify Their Own Bespoke Conclusions

Computer implemented data product release method and system in which the data product release a bounded or fixed set of statistics that is predefined by a data holder and is derived from a sensitive dataset using a privacy protection system such as a differentially private system; and in which a user defined conclusion is input and the method and system automatically determines if the data product release preserves the user defined conclusion.

C24. A Suite of Attacks that Process Aggregate Statistics and Output Guesses about Individual Values Computer implemented data product release method and system in which the data product release is a bounded or fixed set of statistics that is predefined by a data holder and derived from a sensitive dataset using a privacy protection system such as a differentially private system; and in which a suite or collection of different attacks that seek to recover information about an individual from the data product release is automatically accessed and deployed.

C25. Differencing Attack Scanner

Computer implemented data product release method and system in which the data product release is a bounded or fixed set of statistics that is predefined by a data holder and derived from a sensitive dataset using a privacy protection system such as a differentially private system; and in which differencing attacks are automatically searched for.

Optional features:

The differencing attacks are automatically applied to the data product release;

The searching method comprises the steps of:
(a) ordering the statistics in the data product release by query set size;
(b) checking each pair of statistics whose query set sizes differ by one for a difference-of-one attack;
(c) for each difference-of-one attack that is found:
the query sets are updated by removing the vulnerable variable corresponding to the difference of one,
repeat steps (a) to (c); and
(d) outputting the privacy risk of releasing the data product with respect of differencing attacks.

A difference of one attack is found when a pair of query sets with query set sizes differing by one that includes identical variables except for one is found.

C26. Iterative Least Squares Based Attack on SUM Tables

Computer implemented data product release method and system in which the data product release is a bounded or fixed set of statistics that is predefined by a data holder and derived from a sensitive dataset using a privacy protection system such as a differentially private system; and in which an iterative least squares attack on aggregate statistics is performed.

Optional features:

A least squares based attack comprises the steps of:
- a) generating a solution to the set of linear equations of equations: $\hat{v}=\min_v \|A \cdot v - d\|^2$, in which $\hat{v}$ is a one dimensional vector with calculated variable values for each variable in the sensitive dataset.
- b) comparing the calculated variable value with the original variable value for each calculated variable;
- c) outputting the privacy risk of releasing the data product with respect of least squares based attack.

If the comparison of step (b) is less than a pre-defined threshold value, the original variable in the dataset is considered vulnerable.

C27. Alternative to the Above Using the Orthogonality Equation

Computer implemented data product release method and system in which the data product release is a bounded or fixed set of statistics that is predefined by a data holder and derived from a sensitive dataset using a privacy protection system such as a differentially private system; and in which an attack on aggregate statistics is performed using an orthogonality equation.

Optional features:

The least squares based attack comprises the step of solving the following equation:

$$(A^T \cdot A) \cdot v = A^T \cdot d; \text{ where } A^T \text{ is the transpose of } A.$$

The data product release includes m statistics about n individual variables and m>n.

C28. Pseudoinverse-Based Attack on SUM Tables

Computer implemented data product release method and system in which the data product release is a bounded or fixed set of statistics that is predefined by a data holder and derived from a sensitive dataset using a privacy protection system such as a differentially private system; and in which an attack on aggregate statistics is performed using a pseudoinverse-based approach.

Optional features:

The pseudoinverse-based attack comprises the steps of:
- a) computing the Moore-Penrose pseudo-inverse of the matrix A, denoted as A+;
- b) computing the matrix product $B=A^+ \cdot A$ and finding the diagonal entries in B that are 1 corresponding to the indices of the variables that can be determined by the set of linear equations,
- c) outputting the privacy risk of releasing the data product with respect of a pseudoinverse-based attack.

Multiplying the attack matrix $A^+$ with the vector of statistics d to get a potential solution for all variables;

C29. Pseudoinverse-Based Attack Using SVD

Computer implemented data product release method and system in which the data product release is a bounded or fixed set of statistics that is predefined by a data holder and derived from a sensitive dataset using a privacy protection system such as a differentially private system; and in which an attack on aggregate statistics is performed using a pseudoinverse-based approach using a singular value decomposition.

Optional features:

In which performing the pseudoinverse-based attack includes the step of computing the singular value decomposition (SVD) of A and obtaining the matrices U, S and V such that $A = U \, S \, V^T$ in order to only compute the rows of $A^+$ that uniquely determine a variable in v;

The pseudoinverse-based attack using SVD includes the further steps of:
- a) observing that row sum(V*V) recovers the diagonal of B locating vulnerable variables, and generating Z a vector of indices of vulnerable variable;
- b) recalling that the rows of $A^+$ that uniquely determine a variable in v are indexed in Z, and computing $A^+[Z]=V[Z]S^{-1}U^T$ to output the vulnerable variables;
- c) outputting the privacy risk of releasing the data product with respect of a pseudoinverse-based attack using SVD.

C30. Pseudoinverse-Based Attack Using the Groupby Structure and SVD

Computer implemented data product release method and system in which the data product release is a bounded or fixed set of statistics that is predefined by a data holder and derived from a sensitive dataset using a privacy protection system such as a differentially private system; and in which an attack on aggregate statistics is performed by using the underlying structure of a query to break down a large statistics system into sub-systems that can be solved separately, and the solutions then merged.

Optional features:

The pseudoinverse-based attack using SVD algorithm makes use of the GROUPBY structure of A and comprises the steps of:
- a) performing the SVD for each GROUPBY query result, and
- b) merging the SVD sequentially.

Merging the SVDs includes: producing a QR decomposition of the stacked right singular vectors to produce an orthogonal matrix Q, a right triangular matrix R and a rank r of the system.

In which by keeping the r first singular values and vectors of R, the SVD of the stacked singular vectors is reconstructed as well as the SVD of A.

Stacking is performed in parallel, recursively or in bulk.

Outputting the privacy risk of releasing the data product with respect to a pseudoinverse-based attack approach using SVD.

C31. Pseudoinverse-Based Attack Using QR Decomposition

Computer implemented data product release method and system in which the data product release is a bounded or fixed set of statistics that is predefined by a data holder and derived from a sensitive dataset using a privacy protection system such as a differentially private system; and in which an attack on aggregate statistics is performed using a pseudoinverse-based attack using QR decomposition.

Optional features:

The pseudoinverse-based attack using QR decomposition uses the knowledge of the secret v, where v is the n-dimensional column vector that represents the value of each variable in the sensitive dataset.

The algorithm comprises the steps of:
- (a) performing a QR decomposition of the equation matrix A;
- (b) using backward substitution, through the triangular component of the QR decomposition, to get v', the least square solution of the equation Av=d;
- (c) Comparing v' to the secret v, in which any matching variable is determined to be vulnerable;
- (d) For each vulnerable variable corresponding to row i, using backward substitution to solve the equation aA=$e_i$, where $e_i$ is the vector equal to 0 everywhere except at index i where it is equal to 1, where $a_i$ is the attack vector.

(e) Outputting the privacy risk of releasing the data product with respect to a pseudoinverse-based attack approach using QR.

C32. Find Most Accurate Minimum Variance Differencing Attack

Computer implemented data product release method and system in which the data product release is a bounded or fixed set of statistics that is predefined by a data holder and derived from a sensitive dataset using a privacy protection system such as a differentially private system; and in which a differencing attack with the least variance is automatically identified.

Optional feature:

The attack with the minimum variance is identified by:
  a) Find a vulnerable row fusing a pseudo-inverse based approach. Call $e_i$ the associated one-hot vector (with entries equal to zero everywhere but at index i, where it has value one.)
  b) Minimize in $a_i$ var($a_i \cdot d$) under the constraint that $a_i \cdot A = e_i$ and where d is the noisy vector of statistics.
  c) Return the optimal attack $a_i$.

C33. Use Rank Revealing QR Factorization to Efficiently Find Minimum Variance Attacks Computer implemented data product release method and system in which the data product release is a bounded or fixed set of statistics that is predefined by a data holder and derived from a sensitive dataset using a privacy protection system such as a differentially private system; and in which a differencing attack with the least variance is automatically identified using rank revealing QR factorization.

Optional feature:

The attack with the least variance is identified by:
  a) Produce rank revealing QR decomposition of the equation matrix A.
  b) Find a vulnerable row i using a pseudo-inverse based approach
  c) Produce base attack a using a pseudo-inverse based approach.
  d) Produce, using the rank revealing QR decomposition, the projector onto the kernel of A. Call it P.
  e) Call V the variance-covariance matrix of d. Then our problem may be restated as finding z that minimizes $f(z)=(a+Pz)V(a+Pz)^T$. This is achieved by solving for the first derivative of f(z) being 0, which consists in solving a linear system, and can be achieved using the QR decomposition of PVP.

C34. Symbolic Solver Attack on SUM Tables

Computer implemented data product release method and system in which the data product release is derived from a sensitive dataset using a privacy protection system such as a differentially private system; and in which an attack on aggregate statistics is automatically performed using a symbolic solver.

Optional features:

A symbolic solver attack algorithm comprises the steps of:
  a) turning sum tables into system of symbolic equations;
  b) solving the system of symbolic equations by Gauss-Jordan elimination;
  c) checking if variables are determined within a small predefined interval.

The algorithm returns if the variables determined vulnerable are guessed correctly within a predefined interval.

C35. Attacks on COUNT Tables as Constrained Optimization Problem

Computer implemented data product release method and system in which the data product release is a bounded or fixed set of statistics that is predefined by a data holder and derived from a sensitive dataset using a privacy protection system such as a differentially private system; and in which count tables are expressed as linear equations and an attack on the count tables is achieved by automatically solving a constrained optimisation problem.

Optional features:

The attack on COUNT table algorithm comprises the step of solving the following set of equations:

$$\arg \min_{v \in \{0,1\}^{n \times c}, s \cdot f \cdot v \cdot 1 = 1} \|Av - d\|,$$

where c is the number of possible category of the categorical variable.

C36. Pseudoinverse-Based Attack on COUNT Tables

Computer implemented data product release method and system in which the data product release is a bounded or fixed set of statistics that is predefined by a data holder and derived from a sensitive dataset using a privacy protection system such as a differentially private system; and in which count tables are expressed as linear equations and an attack on the count tables is achieved by using a pseudo-inverse based attack.

Optional features:

The pseudo-inverse based attack is any of the pseudo-inverse based attack as defined above.

A pseudoinverse-based attack on COUNT tables comprises the steps of:
  (a) multiplying the attack matrix $A^+$ by the vector of statistics d described by the set of contingency tables to get a potential solution for all variables;
  (b) For all variables found vulnerable, the guesses are rounded to closest value in $\{0,1\}$.

C37. Saturated Rows Attack on COUNT Tables

Computer implemented data product release method and system in which the data product release is a bounded or fixed set of statistics that is predefined by a data holder and derived from a sensitive dataset using a privacy protection system such as a differentially private system; and in which count tables are expressed as linear equations and an attack on the count tables is achieved using a saturated rows approach.

Optional features:

The saturated rows attack algorithm comprises the steps of:
  (a) parsing A and detecting the positively and negatively saturated cells;
  (b) If saturated entries are found:
    a. Subtracting from d the contribution of the deduced private values through the saturated cells;
    b. Removing from A the rows and columns corresponding to the cells and private values that were found to be saturated, yielding A'.
    c. Looking for vulnerable variables using the pseudoinverse of A'.
    d. If new vulnerables are found, return to step (a) otherwise terminate.

A cell is positively saturated when the count it contains equals the query set size and a cell is negatively saturated when the count it contains equals to 0.

C38. Consistency-Check Based Attack on COUNT Tables

Computer implemented data product release method and system in which the data product release is a bounded or fixed set of statistics that is predefined by a data holder and derived from a sensitive dataset using a privacy protection system such as a differentially private system; and in which an attack on the count tables is achieved by a consistency-check based attack.

Optional features:
The consistency-check based attack algorithm comprises the steps of:
For each variable i and putative solution s, test whether other solutions possible; and if only one solution s is possible for any variable i, deduce that the private value of variable i must be s, and update the system accordingly:
  subtract from d the contribution of the deduced private values.
  remove from A the rows and columns corresponding to the cells and private values saturated respectively, yielding A'.
Combining the saturated-rows based attack and the consistency-check attack as follows:
(a) Performing the Saturated-rows attack on count tables algorithm on A;
(b) Perform the consistency-check based algorithm, generating A'
(c) return to step (a), with A' replacing A.
(d) If no solution can be determined for any variable, terminate.
The consistency-check based attack algorithm returns a list of all vulnerable variables which can be guessed accurately and their corresponding private values.

C39. Linearly-Constrained Solver Based Attack on COUNT Tables

Computer implemented data product release method and system in which the data product release is a bounded or fixed set of statistics that is predefined by a data holder and derived from a sensitive dataset using a privacy protection system such as a differentially private system; and in which count tables are expressed as linear equations and an attack on the count tables is achieved using a linearly-constrained solver.

Optional feature:
The Linearly-constrained solver based attack on COUNT tables comprises the steps of:
a) Encode set of COUNT tables as a system of equations.
b) If the system is small, solve the full system; minimise $\|A \cdot v - d\|$ under the constraint that $v \in [0,1]^{n \times c}$, $v \cdot 1 = 1$.
c) If the system is too large to be handled by the first case, solve for each column separately; i.e., denoting by a subscript the columns, independently for each j=1, 2, ..., c minimise $\|A \cdot v_j - d_j\|$ under the constraint that $v_j \in [0,1]^n$.
d) In both cases we obtain an estimate $\tilde{v} \in [0,1]^{n \times c}$. Then, for each record (i.e., each row in $\tilde{v}$), guess the sensitive category whose associated one-hot-encoding is closest (in L1 norm) to the said row.

C40. Measuring Accuracy of the COUNT Attacker's Guess by Changing the Available Information Computer implemented data product release method and system in which the data product release is a bounded or fixed set of statistics that is predefined by a data holder and derived from a sensitive dataset using a privacy protection system such as a differentially private system; and in which a measure of the accuracy of an attack on count tables is achieved by repeating the attack on different subsets of the data product release.

Optional features:
The method also estimates the stability of the COUNT attack.
The method takes into account the uncertainty of an attacker.

C41. Measuring Accuracy of the COUNT Attacker's Guess with Gradient

Computer implemented data product release method and system in which the data product release is a bounded or fixed set of statistics that is predefined by a data holder and derived from a sensitive dataset using a privacy protection system such as a differentially private system; and in which a measure of the accuracy of an attack on count tables is achieved by analysing the gradient that defines by how much the overall ability of a guess to replicate the observed release changes with perturbing a given entry of the guess.

Optional feature:
If the guessed value is 1 and the gradient is negative, the guess is deemed as stable and if the guessed value is 0 and the gradient is positive, the guess is deemed as stable.

C42. False Positive Checking

Computer implemented data product release method and system in which the data product release is a bounded or fixed set of statistics that is predefined by a data holder and derived from a sensitive dataset using a privacy protection system such as a differentially private system; and in which false positives attacks are automatically checked for.

Optional features:
The method to detect false positive comprises a first step of adding an equation to the linear system of equations that sets a variable to an incorrect value and determining whether the system of equations is consistent.
Two different methods to determine whether the system of equations is consistent after an additional equation with an incorrect variable value has been added
  a) Re-computing a solution to the system of linear equations including the incorrect equation and checking whether a solution exists.
  b) Calculating the rank of the system including and excluding the incorrect equation and comparing the rank of the two matrices.

C43. Multi-Objective Optimisation Attacks

Computer implemented data product release method and system in which the data product release is a bounded or fixed set of statistics that is predefined by a data holder and derived from a sensitive dataset using a privacy protection system such as a differentially private system; and in which an optimisation attack is used.

Optional features:
The optimisation attack is based on creating a synthetic statistical release $\hat{d}$ derived from an estimated vector $\hat{v}$, in which $\hat{v}$ contains estimates of each individual variable values from the original dataset.
The optimisation attack comprises the steps of:
  initialising $\hat{v}$ with estimated individual variable values
  iteratively updating the vector $\hat{v}$ of estimates based on error between the statistical release and the synthetic statistical release $\hat{d}$ calculated with the vector of estimates;
in which the per-statistic errors of the statistical release—synthetic statistical release pair is treated as a set of objectives to be minimised.

A threshold is applied for any estimates in v̂ that falls below the minimum or above the maximum of the original private values.

Initial estimated vector takes into account knowledge or background information an attacker is likely to know;

Initial estimated vector has a uniform distribution on the average of true private values;

Random Gaussian noise is added to the initial estimated vector.

Optimisation attack outputs estimated guess values for each individual variable.

The optimised attack is flexible and includes the possibility to incorporate: gradient descent based on different types of statistics separately, more heuristic update rules, and initialisation strategies;

C44. Batch Updating with SUM Statistics

Computer implemented data product release method and system in which the data product release is a bounded or fixed set of statistics that is predefined by a data holder and derived from a sensitive dataset using a privacy protection system such as a differentially private system; and in which an optimisation attack is used, in which batch updating with SUM statistics is used.

Optional features:

In which the vector v̂ is updated using batch updating

In which the vector v̂ is updated by the average scaled errors across all released statistics;

For SUM statistics, the batch update rule with batch size B=m is implemented as:

$$\hat{v}_i = \hat{v}_i + \sum_j \left( \frac{\hat{d}_j - d_j}{\hat{d}_j} \right) A_i / \sum_j A_i$$

where indexes the m, aggregate statistics, i indexes n private variables, and $A_i$ indicates a vector slice of the equation matrix for private variable i.

C45. Batch Updating for AVG Statistics

Computer implemented data product release method and system in which the data product release is a bounded or fixed set of statistics that is predefined by a data holder and derived from a sensitive dataset using a privacy protection system such as a differentially private system; and in which an optimisation attack is used, in which batch updating with SUM statistics is used and the AVG of a set of variables of known size is recast as SUM by multiplying the AVG by set size.

C46. Batch Updating for Median Statistics

Computer implemented data product release method and system in which the data product release is a bounded or fixed set of statistics that is predefined by a data holder derived from a sensitive dataset using a privacy protection system such as a differentially private system; and in which an optimisation attack is used, in which batch updating with MEDIAN statistics is used.

Optional feature:

Only the central value is updated for odd sets of variables in a sensitive data column or the two central values are updated for even sets of variables in a sensitive data column.

C47. Noisy Gradient Descent

Computer implemented data product release method and system in which the data product release is a bounded or fixed set of statistics that is predefined by a data holder and derived from a sensitive dataset using a privacy protection system such as a differentially private system; and in which an optimisation attack is used, in which a cooling factor proportional to the noise added to released statistics is incorporated into a gradient descent, to help prevent noise from dominating the gradient descent process.

C48. The Median Snapper

Computer implemented data product release method and system in which the data product release is a bounded or fixed set of statistics that is predefined by a data holder and derived from a sensitive dataset using a privacy protection system such as a differentially private system; in which an optimisation attack is used, and in which, where an estimate for the values of each variable in an odd query set is given, the variable that is the median of the estimates is changed to the value of the median published in the data product release.

C49. Multiple Query Types—the 'Grab Bag' Approach

Computer implemented data product release method and system in which the data product release is a bounded or fixed set of statistics that is predefined by a data holder and derived from a sensitive dataset using a privacy protection system such as a differentially private system; in which an optimisation attack is used, and in which update rules are given for each statistic type in the release, and v̂ is iteratively updated based on error between the statistical release and the synthetic statistical release d̂ calculated with the vector of estimates.

C50. Combination of Attacks Using Canary-MOO

Computer implemented data product release method and system in which the data product release is a bounded or fixed set of statistics that is predefined by a data holder and derived from a sensitive dataset using a privacy protection system such as a differentially private system; in which an optimisation attack is used, and in which a combination of attacks is used and the optimiser's starting state is initialised to include known variables from other attacks.

C51. Modelling Background Information

Computer implemented data product release method and system in which the data product release is a bounded or fixed set of statistics that is predefined by a data holder and derived from a sensitive dataset using a privacy protection system such as a differentially private system; in which examples of an attacker's assumed knowledge is encoded directly in the system of equations that the statistics for the data product release are encoded into.

Optional features:

The attacker's assumed knowledge is a percentage of known sensitive variable values in the sensitive dataset.

The attacker's assumed knowledge is a random selection of a percentage of known sensitive variable values in the sensitive dataset.

The attacker's assumed knowledge is one or more of the following:
a variable value in the sensitive dataset;
range of a variable value in the sensitive dataset;
whether a variable value in the sensitive dataset is less than or greater than a predefined value.
whether a variable value in the sensitive dataset is less than or greater than another variable value.

The attacker's assumed knowledge is user configurable.

The attacker's assumed knowledge is encoded as an additional set of linear equations.

The attacker's assumed knowledge is encoded as a set of linear and non-linear constraints.

C52. Presenting Privacy-Utility Trade-Off Information to Inform the Setting of Epsilon Computer implemented data product release method and system in which the data product release is is a bounded or fixed set of statistics that is predefined by a data holder and derived from a sensitive dataset using a privacy protection system such as a differentially private system; and in which a privacy-utility tradeoff (PUT) is automatically evaluated and displayed to an end-user to enable the end-user to control their levels of privacy and utility.

Optional features:
Method includes the step of displaying to the data holder the highest epsilon that stops all the attacks.
Method includes the step of displaying to the data controller the lowest epsilon that preserves a set of user-configured conclusions or a user-configured percentage of statistics within a user-configured threshold.
The privacy impact as a function of epsilon is displayed.
The utility impact as a function of epsilon is displayed.
The sensitive variables at risk of being reconstructed are displayed as a function of epsilon.
The one or more attacks that are likely to succeed are displayed as a function of epsilon.

C53. Setting Epsilon by Some Rule of The Privacy/Utility Information—For Instance, Highest Epsilon to Stop All Attacks, Lowest Epsilon That Preserves Utility Computer implemented data product release method and system in which the data product release is a bounded or fixed set of statistics that is predefined by a data holder and derived from a sensitive dataset using a privacy protection system such as a differentially private system; and in which a privacy-utility trade-off (PUT) is automatically evaluated and a rule is used to automatically recommend the privacy protection system parameter, such as epsilon, based on the PUT.

C54. Determining Whether an Attack Has Succeeded in a Variable Focused Method

Computer implemented data product release method and system in which the data product release is a bounded or fixed set of statistics that is predefined by a data holder and derived from a sensitive dataset using a privacy protection system such as a differentially private system; and in which likelihood of success of an attack on a specific individual is determined by analysing an absolute confidence in the success of the attack as well as a relative or change in an attacker's confidence.

C55. Determining Whether an Attack Has Succeeded in a Bulk Method

Computer implemented data product release method and system in which the data product release is a bounded or fixed set of statistics that is predefined by a data holder and derived from a sensitive dataset using a privacy protection system such as a differentially private system; and in which likelihood of success of an attack on a group of individuals is determined by analysing an absolute confidence in the success of the attack as well as a relative or change in an attacker's confidence.

C56. Baseline Approaches for Guessing Private Values

Computer implemented data product release method and system in which the data product release is a bounded or fixed set of statistics that is predefined by a data holder and derived from a sensitive dataset using a privacy protection system such as a differentially private system; and in which likelihood of success of an attack is determined by analysing a relative or change in confidence against a baseline.

Optional feature:
One way of establishing a baseline is to uniformly sample from the sensitive column in the original dataset i times and measure how often out of the i samples the guess would have been correct.

C57. Sampling-Based Method for Determining Probability of Attack Success

Computer implemented data product release method and system in which the data product release is a bounded or fixed set of statistics that is predefined by a data holder and derived from a sensitive dataset using a privacy protection system such as a differentially private system; and in which random noise is regenerated many times and the noisy statistics are then attacked each time, with the percentage of attacks that guess correctly representing the confidence in the attack.

C58. Computing the Relationship Between Noise and Attack Success

Computer implemented data product release method and system in which the data product release is a bounded or fixed set of statistics that is predefined by a data holder and derived from a sensitive dataset using a privacy protection system such as a differentially private system; and in which an attack is modelled as a linear combination of random variables, and the probability that it will be successful is then calculated.

C59. The Case of Count Queries

Computer implemented data product release method and system in which the data product release is a bounded or fixed set of statistics that is predefined by a data holder and derived from a sensitive dataset using a privacy protection system such as a differentially private system; in which an attack solver is applied to the data product release; and an approximation of the marginal probability that the attack solver will be successful is calculated.

Optional feature:
The approximation takes into account the average of correct guesses and the variance of the fraction of correct guesses produced by the attack solver.

C60. Defining Attack Success as Distinguishing a Minimum Value from a Maximum Value Computer implemented data product release method and system in which the data product release is a bounded or fixed set of statistics that is predefined by a data holder and derived from a sensitive dataset using a privacy protection system such as a differentially private system; and in which an attack is considered to be successful if an attack is able to distinguish whether a given individual has the lowest or highest value within a range of sensitive attribute held in the sensitive dataset.

C61. Sideways Bar Chart Representation of the Results of the Attack-Based Evaluation Computer implemented data product release method and system in which the data product release is a bounded or fixed set of statistics that is predefined by a data holder and derived from a sensitive dataset using a privacy protection system such as a differentially private system; and in which the data holder can move a indicator on a GUI that shows privacy and utility levels as a function of altering epsilon.

Optional feature:
A sideway bar chart representation is used to display the results.

C62. Abe on Changing Data

Computer implemented data product release method and system in which the data product release is a bounded or fixed set of statistics that is predefined by a data holder and derived from a sensitive dataset using a privacy protection system such as a differentially private system; and in which there are multiple planned releases and the privacy protection system is configured to ensure that privacy is preserved to a sufficient level across all of the planned releases.

C63. Calculating How to Account for Excess Risk When There Will be Multiple Releases Over Time Computer implemented data product release method and system in which the data product release is a bounded or fixed set of statistics that is predefined by a data holder and derived from a sensitive dataset using a privacy protection system such as a differentially private system; and in which there are multiple planned releases and the privacy protection system is configured to ensure that privacy is preserved to a sufficient level across all of the planned releases, taking into account increasing attack strength over future releases.

Optional features:
The method takes into account one or more of the following: (a) queries that are likely to be received repeatedly, (b) frequency F of the planned releases, (c) the likely duration D of each individual within the sensitive dataset A total privacy level ($\in$) is calculated for p planned releases each at privacy level $\in'$.

The total privacy level epsilon is calculated using the following equation: $\in = \sqrt{p}\in'$.

Individuals that have been present in the sensitive dataset for at least a pre-defined duration or for at least a pre-defined number of releases are removed from the original dataset.

Individuals are sub-sampled for each release such that each individual is not always included in the release.

C64. Craft a Synthetic Differencing Attack When There are No Vulnerable in the First Release Computer implemented data product release method and system in which the data product release is a bounded or fixed set of statistics that is predefined by a data holder and derived from a sensitive dataset using a privacy protection system such as a differentially private system; and in which there are multiple planned releases and the privacy protection system is configured to apply privacy parameters, such as noise, to the first data product release even when there are no data privacy vulnerabilities in that first data product release.

Optional feature:
The privacy parameters applied to the first data product release take into account the multiple planned releases.

A synthetic differencing attack is generated and inserted into to the first data product release for the purpose of recommending epsilon.

The synthetic differencing attack is one or more of:
An attack with the smallest possible L2 norm;
An attack on a sensitive value from extreme ends of the sensitive range;
An attack on a sensitive value with the lowest baseline guess rate.

C65. Cheapest Attacks First

Computer implemented data product release method and system in which the data product release is a bounded or fixed set of statistics that is predefined by a data holder and derived from a sensitive dataset using a privacy protection system such as a differentially private system; and in which the privacy protection system is configured to apply multiple attacks, with the fastest or lowest computational overhead attacks being used first.

C66. Factoring in Compute Power

Computer implemented data product release method and system in which the data product release is a bounded or fixed set of statistics that is predefined by a data holder and derived from a sensitive dataset using a privacy protection system such as a differentially private system; and in which the privacy protection system is configured to model the compute resources needed for the attacks it is programmed to run.

Optional feature:
An attack is automatically not attempted if the privacy protection system determines the attack will not complete in a specified time C67. Attacking Subsets of the Dataset Computer implemented data product release method and system in which the data product release is a bounded or fixed set of statistics that is predefined by a data holder and derived from a sensitive dataset using a privacy protection system such as a differentially private system; and in which the privacy protection system is configured to run attacks on subsets of the dataset in the data product release.

Optional feature:
Attacks on subsets of the dataset are run in a way that reduces computational overhead without significantly underestimating privacy risk.

C68. Datasets with Multiple Sensitive Attributes

Computer implemented data product release method and system in which the data product release is a bounded or fixed set of statistics that is predefined by a data holder and derived from a sensitive dataset using a privacy protection system such as a differentially private system; and in which the privacy protection system is configured to search for relationships between sensitive variables.

Optional feature:
If linear relationships are found, new equations expressing these relationships are added to the system of equations C69. Rectangularizing Longitudinal or Time-Series Datasets Computer implemented data product release method and system in which the data product release is a bounded or fixed set of statistics that is predefined by a data holder and derived from a sensitive dataset using a privacy protection system such as a differentially private system; and in which the privacy protection system is configured to rectangularize longitudinal or time-series datasets.

Optional features:
A rectangular dataset is generated from the longitudinal or time-series dataset.
SQL rules are used to automatically transform a SQL-like query on transactional data into a SQL-like query on the rectangular data such that query results are equivalent.

C70. Determining Sensitivity

Computer implemented data product release method and system in which the data product release is a bounded or fixed set of statistics that is predefined by a data holder and derived from a sensitive dataset using a privacy protection system such as a differentially private system; and in which the privacy protection system is configured to ask a user what the theoretical biggest possible range of the values of sensitive variables could be.

C71. Outputting Synthetic Microdata/Row Level

Computer implemented data product release method and system in which the data product release is a bounded or fixed set of statistics that is predefined by a data holder and derived from a sensitive dataset using a privacy protection system such as a differentially private system; and in which the privacy protection system is configured to output synthetic data as an alternative to aggregate statistics, or in addition to aggregate statistics.

C72. Multiple Entities

Computer implemented data product release method and system in which the data product release is a bounded or fixed set of statistics that is predefined by a data holder and derived from a sensitive dataset using a privacy protection system such as a differentially private system; and in which the privacy protection system is configured to automatically detect nested entities and protect the privacy of the outermost.

Optional feature:
Protecting the privacy of the outermost also protects the privacy of the innermost.

C73. Protecting the Privacy of Multiple Entities (Non-Nested Entities)

Computer implemented data product release method and system in which the data product release is a bounded or fixed set of statistics that is predefined by a data holder and derived from a sensitive dataset using a privacy protection system such as a differentially private system; and in which the privacy protection system is configured to protect the privacy of multiple non-nested entities.

Optional feature:
The privacy protection system determines the noise level required to protect each entity independently, and then takes the maximum of these noise levels.

C74. Heuristic Methods to Quickly Assess Safety of a Data Product

Computer implemented data product release method and system in which the data product release is a bounded or fixed set of statistics that is predefined by a data holder and derived from a sensitive dataset using a privacy protection system such as a differentially private system; and in which the privacy protection system is configured to use heuristic calculations to quickly approximate the risk or safety of the data product release.

C75. Via # Stats Released Vs # Variables within Dataset

Computer implemented data product release method and system in which the data product release is a bounded or fixed set of statistics that is predefined by a data holder and derived from a sensitive dataset using a privacy protection system such as a differentially private system; and in which the privacy protection system is configured to determine the ratio between the number of statistics released and number of individual variables or people in the dataset.

C76. Via # Uniquely-Identified Individuals

Computer implemented data product release method and system in which the data product release is a bounded or fixed set of statistics that is predefined by a data holder and derived from a sensitive dataset using a privacy protection system such as a differentially private system; and in which the privacy protection system is configured to use the number of individual variables or people who are uniquely identified (i.e. do not share quasi-identifiers with anyone) as a representation of how many people might be attackable.

C77. Via Presence of Diff of One Attacks

Computer implemented data product release method and system in which the data product release is a bounded or fixed set of statistics that is predefined by a data holder and derived from a sensitive dataset using a privacy protection system such as a differentially private system; and in which the privacy protection system is configured to use a differencing attack scanner to reveal variables from the sensitive dataset that are likely to be vulnerable of a differencing attack.

C78. Via Query Set Size

Computer implemented data product release method and system in which the data product release is a bounded or fixed set of statistics that is predefined by a data holder and derived from a sensitive dataset using a privacy protection system such as a differentially private system; and in which the privacy protection system is configured to use the distribution of the query set sizes as a measure of how likely attacks will be.

C79. Via Count Query Saturation

Computer implemented data product release method and system in which the data product release is a bounded or fixed set of statistics that is predefined by a data holder and derived from a sensitive dataset using a privacy protection system such as a differentially private system; and in which the privacy protection system is configured to calculate the number of count query saturation attacks.

C80. Improving Utility of Truncation or Clamping Outlier Variables

Computer implemented data product release method and system in which the data product release is a bounded or fixed set of statistics that is predefined by a data holder and derived from a sensitive dataset using a privacy protection system such as a differentially private system; and in which the privacy protection system is configured to improve utility by truncating or clamping outlier variables.

C81. Improving Utility by Generalizing Variables

Computer implemented data product release method and system in which the data product release is a bounded or fixed set of statistics that is predefined by a data holder and derived from a sensitive dataset using a privacy protection system such as a differentially private system; and in which the privacy protection system is configured to generalise variables.

C82. Setting a Query Set Size Restriction (QSSR) Threshold

Computer implemented data product release method and system in which the data product release is a bounded or fixed set of statistics that is predefined by a data holder and derived from a sensitive dataset using a privacy protection system such as a differentially private system; and in which the privacy protection system is configured to set a query set size restriction threshold.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A computer implemented data product release method, the method comprising the steps of:
   deriving a data product release from a sensitive dataset using a differentially private system, wherein the data product release is a bounded or fixed set of statistics that is (a) predefined by a data holder and (b) derived from the sensitive dataset using the differentially private system, wherein the sensitive dataset includes raw data;
   configuring, by the data holder, a prioritization of statistics in the set of statistics, wherein the statistics comprise one or more of a sum, count, average, median, min, or max;

configuring privacy protection parameters of the differentially private system as part of the data product release method to alter the balance between maintaining privacy of the sensitive dataset and making the data product release useful;

wherein the privacy protection parameters comprise a privacy protection parameter epsilon;

automatically determining a distribution of noise values to be added to the set of statistics by applying multiple different attacks to the set of statistics and by taking into account the prioritization of statistics configured by the data holder;

deriving the set of statistics from the sensitive dataset without providing access to any one or more of the raw data or raw data values within the sensitive dataset; and directly calculating the privacy protection parameter epsilon from attack characteristics to get the desired attack success.

2. The method of claim 1 in which privacy protection parameters of the differentially private system include one or more of the following: a distribution of noise values, noise addition magnitude, epsilon, delta, bid widths, generalisation parameters or fraction of rows of the sensitive dataset that are subsampled.

3. The method of claim 1, in which usefulness of the data product is assessed by determining if conclusions that could be drawn from the sensitive dataset or from a non-privacy protected data product release, can still be drawn from the data product release.

4. The method of claim 3, in which conclusions include any information or insight that can be extracted from the sensitive dataset or from a non-privacy protected data product release, such as: maximum values, correlated variables, difference of group means, and temporal patterns.

5. The method of claim 1, in which privacy of the sensitive dataset is assessed by applying multiple different attacks to the data product release.

6. The method of claim 5, in which an optimisation attack is used that is based on creating a synthetic statistical release derived from an estimated vector, in which the estimated vector contains estimates of each individual variable value from the original dataset, and in which update rules are given for each statistic type in the release, and the estimated vector is iteratively updated based on an error between an observed statistical release from the original dataset and the synthetic statistical release calculated with the vector of estimates.

7. The method of claim 1, in which the distribution of noise is a Gaussian noise distribution or a Laplace noise distribution.

8. The method of claim 1, in which one or more privacy protection parameters of the differentially private system, are automatically chosen, generated, determined or set, and in which the privacy protection parameters define a balance between maintaining privacy of the sensitive dataset and making the data product release useful.

9. The method of claim 1, in which the data product release is configured by the data holder that configures data product related parameters, and in which the data product related parameters include one or more of the following: range of sensitive data attributes; query parameters; outlier range outside of which values are suppressed or truncated; pre-processing transformation to be performed; sensitive dataset schema; description of aggregate statistics required in the data product release; prioritisation of statistics in the data product release; data product description.

10. The method of claim 1, in which the sensitive dataset is input by the data holder.

11. The method of claim 1, in which a graphical user interface for the data-holder is implemented as a software application.

12. The method of claim 1, in which the data product release is in the form of an API or in the form of a synthetic microdata file.

13. The method of claim 1, in which the data product release includes one or more of the following: aggregate statistics report, infographic or dashboard, or machine learning model.

14. The method of claim 1, in which a privacy-utility tradeoff (PUT) of the data product release is automatically evaluated.

15. The method of claim 1, in which a privacy-utility tradeoff (PUT) of the data product release is automatically evaluated and in which the data product release method generates a report or other information that describes the characteristics of the intended data product release that relate to the balance or trade-off between (i) maintaining privacy of the sensitive dataset, including whether attacks succeed and/or fail, and (ii) making the data product release useful.

16. The method of claim 1, in which a privacy-utility tradeoff (PUT) of the data product release is automatically evaluated and recommendations for improving that PUT are subsequently automatically generated.

17. The method of claim 16, in which recommendations include modifying one or more of the following: dimensionality of one or more of the tables in the data product, frequency of the release of the data product, statistical generalisation to be performed, suppressing outliers, noise distribution values, or any data product related parameters.

18. The method of claim 1, in which the method includes the steps of generating multiple, refreshed or updated versions of the data product release and displaying how the privacy-utility tradeoff changes for each refreshed or updated version of the data product release.

19. The method of claim 1, in which the differentially private system is configured to automatically generate a comparison of sampling errors relating to the inherent uncertainty in the statistics of the data product release prior to being perturbed and a distribution of noise values added to the statistics to provide privacy protection.

20. The method of claim 1, in which one or more privacy protection parameters of the differentially private system are applied and the differentially private system is configured to automatically apply multiple different attacks to the data product release and to automatically determine whether sensitive information from the sensitive dataset can be revealed by any attack.

21. The method of claim 20, in which the differentially private system evaluates whether the multiple different attacks are likely to succeed.

22. The method of claim 20, in which each attack estimates if any sensitive variables from the sensitive dataset are at risk of being determined from the data product release.

23. The method of claim 20, in which each attack outputs sensitive variables from the sensitive dataset that are determined to be vulnerable with respect to the attack.

24. The method of claim 20, in which each attack outputs a guessed value for each sensitive variable determined vulnerable.

25. The method of claim 1, in which attack characteristics include a probability density function.

26. The method of claim 1, in which the method comprises the steps of encoding statistics that are a linear function of values in the dataset, using a system of linear equations.

27. The method of claim 26, in which the method comprises the steps of: (i) receiving a linear query specification; (ii) aggregating the data in the sensitive dataset based on the query specification; and (iii) encoding the aggregated data with a set of linear equations.

28. The method of claim 1, in which one or more of the differentially private system privacy protection parameters are automatically generated, together with distortion metrics describing the distribution of noise values.

29. The method of claim 28, in which distortion metrics include root mean squared error, mean average error or percentiles of noise value distribution.

30. The method of claim 1, in which one or more privacy protection parameters of the differentially private system are applied and the differentially private system is configured to automatically determine if conclusions that could be drawn from a non-privacy protected data product release can still be drawn from the privacy protected data product release.

31. The method of claim 30, in which the method includes the step of encoding the conclusions into a program, in which the conclusions are one or more of the following: maximum value conclusions, correlated variable conclusions, difference of group means conclusions or temporal pattern conclusions.

32. The method of claim 1, in which a user defined conclusion is input and the method automatically determines if the data product release preserves the user defined conclusion.

33. The method of claim 1, in which a suite or collection of different attacks that seeks to recover information about an individual from the data product release is automatically accessed and deployed.

34. The method of claim 1, in which an attack on aggregate statistics is performed using a pseudoinverse-based approach.

35. The method of claim 1, in which a differencing attack with the least variance is automatically identified using rank revealing QR factorization.

36. The method of claim 1, in which count tables are expressed as linear equations and an attack on the count tables is achieved by using a pseudo-inverse based attack.

37. The method of claim 1, in which an optimisation attack is used, and in which a combination of attacks is used and the optimiser's starting state is initialised to include known variables from other attacks.

38. The method of claim 1, in which a privacy-utility tradeoff (PUT) of the data product release is automatically evaluated and displayed to an end-user to enable the end-user to control their levels of privacy and utility.

39. The method of claim 38, in which a privacy protection parameter is epsilon, and in which the method includes the step of displaying to the data holder the highest epsilon that stops all the attacks.

40. The method of claim 38, in which a privacy protection parameter is epsilon, and in which the method includes the step of displaying to the data controller the lowest epsilon that preserves a set of user-configured conclusions or a user-configured percentage of statistics within a user-configured threshold.

41. The method of claim 38, in which one or more of the following parameters of the data product release are displayed as a function of epsilon: privacy impact, utility impact, sensitive variables at risk of being reconstructed, one or more attacks that are likely to succeed.

42. The method of claim 1, in which a privacy-utility trade-off (PUT) of the data product release is automatically evaluated and a rule is used to automatically recommend the privacy protection parameter based on the PUT.

43. The method of claim 1, in which random noise is regenerated many times and added to the statistics, and in which the statistics are then attacked each time, with the percentage of attacks that guess correctly representing the confidence in the attack.

44. The method of claim 1, in which an attack on a sensitive variable is modelled as a linear combination of noisy random variables, in which distribution of the noisy random variables is determined by randomised noise added to the statistics, and in which the probability that the attack will be successful is then calculated, with attack success being a configurable definition.

45. The method of claim 1, in which there are multiple planned releases and the differentially private system is configured to ensure that privacy is preserved to a sufficient level across all of the planned releases, taking into account increasing attack strength over future releases.

46. The method of claim 45, in which the method takes into account one or more of the following: (a) queries that are likely to be received repeatedly, (b) frequency of the planned releases, (c) the likely duration of each individual within the sensitive dataset.

47. The method of claim 1, in which there is a single or multiple planned releases and the differentially private system is configured to apply privacy parameters, such as noise, to the first data product release even when there are no data privacy vulnerabilities in that first data product release.

48. The method of claim 47, in which the privacy parameters applied to the first data product release take into account the multiple planned releases.

49. The method of claim 1, in which the differentially private system is configured to search for relationships between sensitive variables.

50. The method of claim 49, in which if linear relationships are found, new equations expressing these relationships are added to the system of equations.

51. The method of claim 1, in which the differentially private system is configured to rectangularize longitudinal or time-series datasets by converting the longitudinal or time-series dataset into a single table, and in which the single table includes one row for each sensitive variable that requires privacy.

52. The method of claim 51, in which SQL rules are used to automatically transform a SQL-like query on transactional data into a SQL-like query on the rectangular data such that query results are equivalent.

53. The method of claim 1, in which the differentially private system is configured to ask a user what a theoretical biggest possible range of the values of sensitive variables could be.

54. The method of claim 1, in which the differentially private system is configured to (a) automatically detect nested entities, in which one or more entities are nested in an outermost entity, and (b) to protect the privacy of the outermost.

55. The method of claim 54, in which protecting the privacy of the outermost also protects the privacy of the nested entities.

56. The method of claim 1, in which the differentially private system is configured to protect the privacy of multiple non-nested entities.

57. The method of claim 1, in which the differentially private system determines the noise level required to protect each entity independently, and then takes the maximum of these noise levels.

58. The method of claim 1, in which the differentially private system is configured to use a differencing attack scanner to reveal variables from the sensitive dataset that are likely to be vulnerable to a differencing attack.

59. The method of claim 1, in which the differentially private system is configured to generalise non-sensitive variables in order to improve the privacy-utility trade-off of the data product release by producing fewer or less granular statistics.

60. The method of claim 1, wherein the method is performed by a computer implemented system.

61. The method of claim 1, wherein the method generates a data product.

62. The method of claim 1, in which the distribution of noise values is varied until a user-configured percentage of the multiple different attacks are defeated.

\* \* \* \* \*